(12) United States Patent
Allan et al.

(10) Patent No.: US 12,330,405 B2
(45) Date of Patent: Jun. 17, 2025

(54) BAMBOO-HYBRID STRUCTURAL PANELS AND STRUCTURAL SECTION

(71) Applicant: Global Bamboo Technologies Inc., Windsor, CA (US)

(72) Inventors: Nicholas Taylor Allan, Santa Rosa, CA (US); William H. Hinkle, Geyserville, CA (US)

(73) Assignee: Global Bamboo Technologies Inc., Ocala, FL (US)

( * ) Notice: Subject to any disclaimer, the term of this patent is extended or adjusted under 35 U.S.C. 154(b) by 0 days.

(21) Appl. No.: 18/007,467

(22) PCT Filed: Jul. 30, 2021

(86) PCT No.: PCT/US2021/044014
§ 371 (c)(1),
(2) Date: Jan. 30, 2023

(87) PCT Pub. No.: WO2022/026898
PCT Pub. Date: Feb. 3, 2022

(65) Prior Publication Data
US 2023/0271399 A1 Aug. 31, 2023

Related U.S. Application Data

(60) Provisional application No. 63/059,464, filed on Jul. 31, 2020.

(51) Int. Cl.
B32B 3/14 (2006.01)
B32B 3/18 (2006.01)
(Continued)

(52) U.S. Cl.
CPC ............ B32B 3/18 (2013.01); B32B 7/03 (2019.01); B32B 21/042 (2013.01);
(Continued)

(58) Field of Classification Search
None
See application file for complete search history.

(56) References Cited

U.S. PATENT DOCUMENTS 2,565,251 A 8/1951 Malmstom
2007/0048542 A1 3/2007 Ou
(Continued)

FOREIGN PATENT DOCUMENTS

CN 202106614 U 1/2012
CN 105235022 A 1/2016
(Continued)

OTHER PUBLICATIONS

International Search Report and Written Opinion mailed Dec. 15, 2021, issued in corresponding International Application No. PCT/US2021/044014, filed Jul. 30, 2021, 17 pages.
(Continued)

Primary Examiner — Alexander S Thomas
(74) Attorney, Agent, or Firm — Christensen O'Connor Johnson Kindness PLLC

(57) ABSTRACT

Structural panels include a plurality of structural layers adhered together in a laminate, including a plurality of bamboo structural layers and at least one non-bamboo structural layer disposed between a first bamboo structural layer and a second bamboo structural layer of the plurality of bamboo structural layers. The first bamboo structural layer and the second bamboo structural layer of the plurality of bamboo structural layers are spaced apart by the at least one non-bamboo structural layer on opposite sides of a neutral plane extending through a center of the structural panel and parallel to the plurality of bamboo structural layers. Structural sections including wall sections, roof sections, and floor sections include one or more structural panels.

19 Claims, 39 Drawing Sheets

(51) Int. Cl.
    *B32B 7/03*      (2019.01)
    *B32B 21/04*     (2006.01)
    *B32B 37/12*     (2006.01)

(52) U.S. Cl.
    CPC ............ *B32B 37/1284* (2013.01); *B32B 3/14* (2013.01); *B32B 2260/026* (2013.01); *B32B 2307/712* (2013.01); *B32B 2307/732* (2013.01)

(56) References Cited

U.S. PATENT DOCUMENTS

| | | |
|---|---|---|
| 2007/0049152 A1 | 3/2007 | Ou |
| 2007/0267102 A1 | 11/2007 | Sullivan |
| 2009/0263617 A1 | 10/2009 | Ou et al. |
| 2012/0180964 A1 | 7/2012 | Heinricher |
| 2013/0316127 A1 | 11/2013 | Yako |

FOREIGN PATENT DOCUMENTS

| | | |
|---|---|---|
| CN | 105291210 A | 2/2016 |
| GB | 392470 A | 5/1933 |
| JP | 2001182180 A | 7/2001 |

OTHER PUBLICATIONS

Extended European Search Report mailed Jun. 17, 2024, issued in corresponding European Application No. EP21849312, filed Jul. 30, 2021, 7 pages.

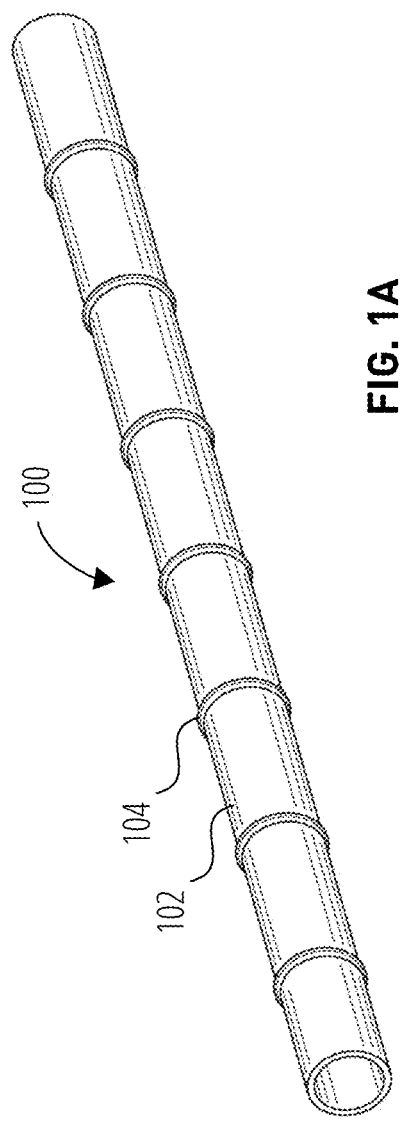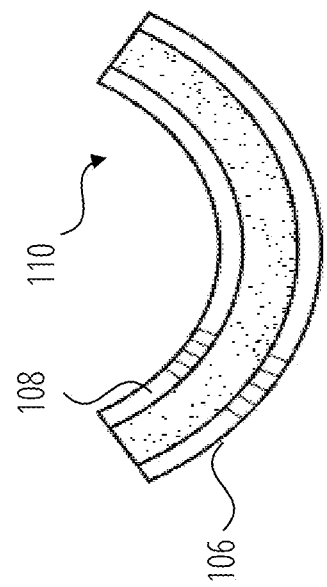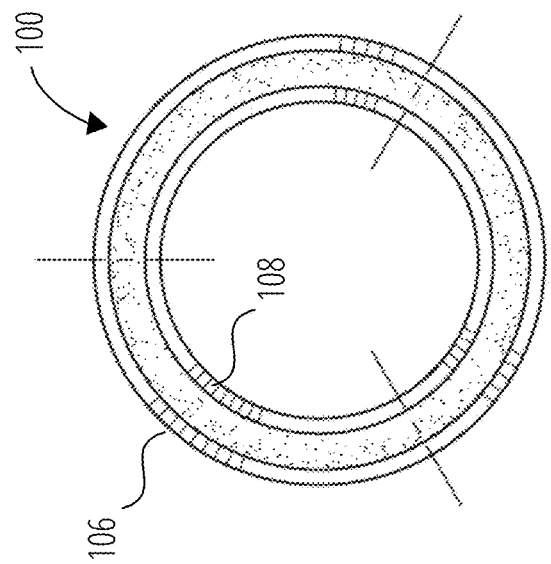

Legend

| Layer type | Bamboo Vertical | Bamboo Horizontal | Vertical Skewed | Veneer Vertical | Veneer Horizontal | Lumber Vertical | Lumber Horizontal |
|---|---|---|---|---|---|---|---|
| Code | V | H | S | VV | VH | LV | LH |
| Icon | | | | | | | |
| | 702 | 704 | 706 | 708 | 710 | 712 | 714 |

FIG. 7A

Legend

| Layer type | Bamboo Vertical with Gaps | Bamboo Horizontal with Gaps | Hard Side Out Cup Orientation | Soft Side Out Cup Orientation | Scrimber Vertical | Scrimber Horizontal |
|---|---|---|---|---|---|---|
| Code | 3V | 3H | ∩ | ∪ | SCV | SCH |
| Icon | | | | | | |
| | 716 | 718 | 720 | 722 | 724 | 726 |

FIG. 7B

| | 802 | | 804 | | 806 | |
|---|---|---|---|---|---|---|
| | Layer 1 | | Layer 2 | | Layer 3 | |
| 816 | V ⊂ | 0.2500 | LH | 0.750 | V ⊃ | 0.250 |
| 818 | V ⊂ | 0.5000 | LH | 1.250 | V ⊃ | 0.500 |
| 820 | V ⊂ | 0.5000 | LH | 0.625 | V ⊃ | 0.500 |
| 822 | V ⊂ | 0.6250 | LH | 0.625 | V ⊃ | 0.625 |
| 824 | V ⊂ | 0.6250 | LH | 1.375 | V ⊃ | 0.625 |

|     | Layer 1 |        | Layer 2 |        | Layer 3 |        | Layer 4 |        | Layer 5 |        |
|-----|---------|--------|---------|--------|---------|--------|---------|--------|---------|--------|
|     | 902     |        | 904     |        | 906     |        | 908     |        | 910     |        |
| 924 | V⊂      | 0.6250 | LH      | 0.6250 | LV      | 1.3750 | LH      | 0.6250 | V⊃      | 0.6250 |
| 926 | V⊂      | 0.6250 | LH      | 1.3750 | LV      | 1.3750 | LH      | 1.3750 | V⊃      | 0.6250 |
| 928 | V⊂      | 1.0000 | LH      | 1.3750 | LV      | 1.3750 | LH      | 1.3750 | V⊃      | 1.0000 |
| 930 | V⊃      | 1.2500 | LH      | 1.3750 | V⊂⊃     | 1.2500 | LH      | 1.3750 | V⊂      | 1.2500 |
| 932 | V⊂      | 0.2813 | V⊃      | 0.2813 | VH      | 0.1250 | V⊂      | 0.2813 | V⊃      | 0.2813 |
| 934 | VH      | 0.1250 | V⊂      | 0.3333 | 3H⊃⊂    | 0.3333 | V⊃      | 0.3333 | VH      | 0.1250 |
| 936 | VH      | 0.1250 | V⊂      | 0.3333 | S⊃⊂     | 0.3333 | V⊃      | 0.3333 | VH      | 0.1250 |
| 938 | VH      | 0.1250 | V⊂      | 0.3333 | V⊃⊂     | 0.3333 | V⊃      | 0.3333 | VH      | 0.1250 |
| 940 | VV      | 0.1250 | V⊂      | 0.3333 | H⊃⊂     | 0.3333 | V⊃      | 0.3333 | VV      | 0.1250 |
| 942 | VH      | 0.1250 | V⊂      | 0.3333 | H⊃⊂     | 0.3333 | V⊃      | 0.3333 | VH      | 0.1250 |

| | Layer 1 1102 | | Layer 2 1104 | | Layer 3 1106 | | Layer 4 1108 | | Layer 5 1110 | | Layer 6 1112 | | Layer 7 1114 | |
|---|---|---|---|---|---|---|---|---|---|---|---|---|---|---|
| 1132 | V c | 0.25000 | W | 0.15000 | VH | 0.15000 | W | 0.15000 | VH | 0.15000 | W | 0.15000 | V □ | 0.25000 |
| 1134 | V c | 0.25000 | W | 0.15000 | VH | 0.15000 | W | 0.15000 | VH | 0.15000 | W | 0.15000 | V □ | 0.25000 |
| 1136 | V c | 0.25000 | W | 0.12500 | VH | 0.12500 | W | 0.25000 | VH | 0.12500 | W | 0.12500 | V □ | 0.25000 |
| 1138 | V c | 0.31250 | W | 0.12500 | VH | 0.12500 | W | 0.12500 | VH | 0.12500 | W | 0.12500 | V □ | 0.31250 |
| 1140 | V c | 0.31250 | W | 0.10417 | VH | 0.10417 | W | 0.10417 | LV | 0.20833 | LH | 0.10417 | V □ | 0.31250 |
| 1142 | V c | 0.62500 | LH | 0.62500 | LV | 1.37500 | LH | 1.37500 | LV | 0.62500 | LH | 0.62500 | V □ | 0.62500 |
| 1144 | V c | 0.62500 | LH | 1.37500 | LV | 1.37500 | LH | 1.37500 | LV | 1.37500 | LH | 1.37500 | V □ | 0.62500 |
| 1146 | V c | 1.25000 | LH | 1.37500 | LV | 1.37500 | LH | 1.37500 | LV | 1.37500 | LH | 1.37500 | V □ | 1.25000 |

FIG. 11B

| | Layer 1 | | | Layer 2 | | | Layer 3 | | | Layer 4 | | | Layer 5 | | | Layer 6 | | | Layer 7 | | |
|---|---|---|---|---|---|---|---|---|---|---|---|---|---|---|---|---|---|---|---|---|---|
| 1148 | V U | 1.25000 | LH | V U | 1.37500 | LH | V U | 1.25000 | LH | V U | 1.37500 | LH | V U | 1.25000 | LH | V U | 1.37500 | LH | V U | 1.25000 | LH |
| 1150 | V U | 0.21875 | VH | V U | 0.12500 | VH | V U | 0.21875 | VH | V U | 0.12500 | VH | V U | 0.21875 | VH | V U | 0.12500 | VH | V U | 0.21875 | VH |
| 1152 | W | 0.12500 | | S U | 0.21875 | | S U | 0.21875 | VH | V U | 0.12500 | VH | S U | 0.21875 | VH | V U | 0.21875 | VH | W | 0.12500 | |
| 1154 | W | 0.12500 | | W | 0.31250 | VH | W | 0.12500 | VH | W | 0.12500 | W | V U | 0.12500 | VH | V U | 0.31250 | VH | W | 0.12500 | VH |
| 1156 | VH | 0.12500 | | S U | 0.21875 | VH | S U | 0.21875 | VH | W | 0.12500 | VH | S U | 0.21875 | VH | V U | 0.21875 | VH | VH | 0.12500 | |
| 1158 | VH | 0.12500 | | S U | 0.25000 | | S U | 0.21875 | VH | H U | 0.12500 | | V U | 0.12500 | VH | V U | 0.25000 | VH | W | 0.12500 | VH |
| 1160 | W | 0.12500 | | V U | 0.25000 | | V U | 0.12500 | VH | H U | 0.25000 | | V U | 0.12500 | VH | V U | 0.25000 | VH | W | 0.12500 | |
| 1162 | W | 0.12500 | | V U | 0.21875 | | H U | 0.21875 | | W | 0.12500 | VH | H U | 0.21875 | VH | V U | 0.21875 | VH | W | 0.12500 | VH |

FIG. 11C

| | Layer 1 1302 | Layer 2 1304 | Layer 3 1306 | Layer 4 1308 | Layer 5 1310 | Layer 6 1312 | Layer 7 1314 | Layer 8 1316 | Layer 9 1318 |
|---|---|---|---|---|---|---|---|---|---|
| 1340 | 0.2500 Vc | 0.107 W | 0.107 VH | 0.107 W | 0.107 VH | 0.107 W | 0.107 VH | 0.107 W | 0.2500 Vc |
| 1342 | 0.1875 Vc | 0.125 W | 0.125 VH | 0.125 W | 0.125 VH | 0.125 W | 0.125 VH | 0.125 W | 0.1875 Vc |
| 1344 | 0.1875 Vc | 0.109 W | 0.109 VH | 0.109 W | 0.219 W | 0.109 W | 0.109 VH | 0.109 W | 0.1875 Vc |
| 1346 | 0.3125 Vc | 0.089 W | 0.089 VH | 0.089 W | 0.089 W | 0.089 W | 0.089 VH | 0.089 W | 0.3125 Vc |
| 1348 | 0.0625 VH | 0.250 Vc | 0.125 VH | 0.125 W | 0.250 W | 0.125 W | 0.125 VH | 0.250 Vc | 0.0625 VH |
| 1350 | 1.2500 Vc | 1.375 LH | 1.375 LV | 1.375 LH | 1.375 LV | 1.375 LH | 1.375 LV | 1.375 LH | 1.2500 Vc |

BAMBOO-HYBRID STRUCTURAL PANELS AND STRUCTURAL SECTION

CROSS-REFERENCE TO RELATED APPLICATIONS

This application is a National Stage of International Application No. PCT/US2021/044014, filed Jul. 30, 2021, which claims priority to U.S. Provisional Patent Application Ser. No. 63/059,464, filed Jul. 31, 2020, the entirety of which is are hereby incorporated by reference for all purposes.

BACKGROUND

Traditional wood based home building techniques typically include the use of stick lumber, sheeting, beams, trusses, engineered lumber products, and other components fashioned from wood in the form of lumber or laminated elements. Consequently, the demand for wood is high, requiring harvesting rates often exceeding the replenishment rates. Timber bamboo—a grass—is prolific throughout the world and as a construction material has many advantages over wood, including compression strength, rapid growth, high carbon sequestration and sustainability.

Despite its advantages over wood, the dimensional format of timber bamboo limits its use as a substitute for wood products. For example, bamboo culm is typically thin-walled, thereby limiting the opportunities for cutting dimension construction elements directly from the bamboo culm. Additionally, the parallel orientation of fibers running along the culm of a bamboo cane limit its longitudinal sheer load performance. Therefore, failure modes of bamboo cane in sheer typically include splitting along the length of the culm wherein the parallel fibers separate. Such a failure mode is also evident when fasteners such as bolts are disposed through the culm resulting in poor pull out performance in sheer along the grain, making the use of nature bamboo a poor substitute for wood in that sense. Additionally, known bamboo processing methods disrupt or destroy the natural fiber orientation and lignin bonds and therefore the natural strength advantages provided by bamboo.

One known bamboo hybrid structural panel, referred to herein as the "2.0 panel" or "Gen. 2 panel" includes (4) bamboo structural layers in the middle (i.e., along a neutral plane and without any non-bamboo structural layers therebetween) and (2) layers of wood veneer—one on each face. Two of the bamboo structural layers have a vertical grain orientation, while the two middle bamboo structural layers have an approximate 5 degree skew from vertical. In the 2.0 panel, the bamboo structural layers were placed along the neutral plane without any non-bamboo layers therebetween for a number of reasons. For example, the two bamboo structural layers formed a "starter board" upon which the remainder of the structural panel was constructed. The neutral plane coincided with the interface between two bamboo structural layers forming the starter board. Also, placing the bamboo structural layers in the center of the structural panel enabled users to countersink fasteners through the wood veneer, which is easier to countersink than bamboo. Further, the wood veneers presented a more familiar and easier-to-finish surface to users accustomed to non-bamboo structural panels.

While the 2.0 panel represented an improvement over traditional wood products, there is a need for improved bamboo hybrid structural panels and structural sections comprising such structural panels.

BRIEF DESCRIPTION OF THE SEVERAL VIEWS OF THE DRAWINGS

Non-limiting and non-exhaustive embodiments of the present invention are described with reference to the following figures, wherein like reference numerals refer to like parts throughout the various views unless otherwise specified.

FIG. 1A illustrates a perspective view of a bamboo cane.

FIG. 1B illustrates a cross section of the bamboo cane of FIG. 1A.

FIG. 1C illustrates a secant of the bamboo cane of FIG. 1A.

FIG. 7A illustrates a legend for use with layup diagrams of the present disclosure.

FIG. 7B illustrates a legend for use with layup diagrams of the present disclosure.

FIG. 9B is a diagram of representative layups of the structural panel of FIG. 9A, according to the present disclosure.

FIG. 10B is a diagram of representative layups of the structural panel of FIG. 10A, according to the present disclosure.

FIG. 11B is a diagram of representative layups of the structural panel of FIG. 11A, according to the present disclosure.

FIG. 11C is a diagram of additional representative layups of the structural panel of FIG. 11A, according to the present disclosure.

FIG. 13B is a diagram of representative layups of the structural panel of FIG. 13A, according to the present disclosure.

FIG. 26 is a chart comparing MOE of Gen. 2 bamboo hybrid structural panels, third party structural panels, and representative structural panels of the present disclosure.

Figure 2:
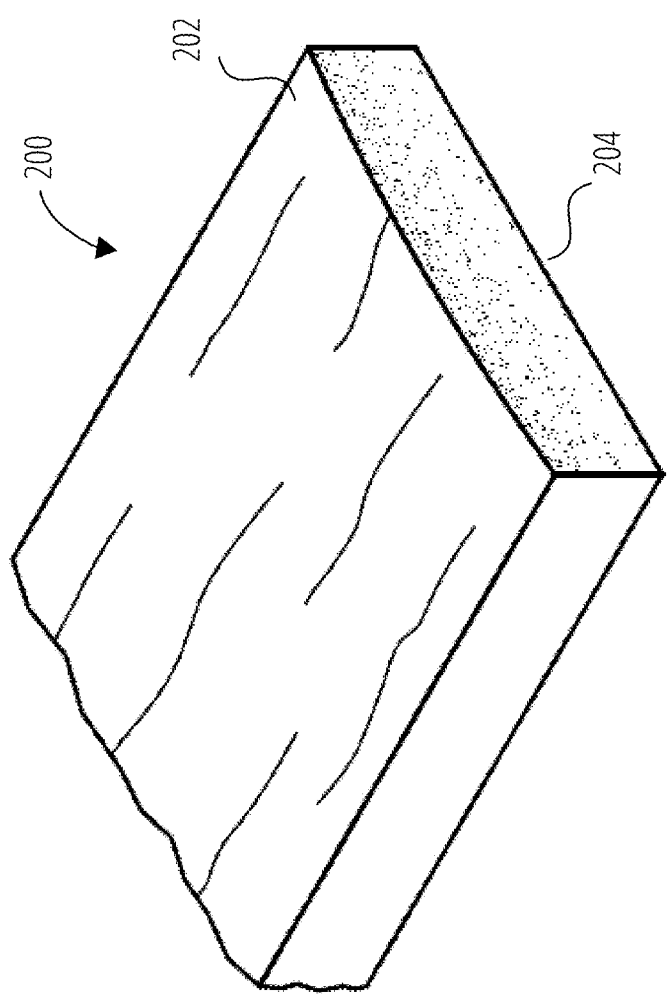
FIG. 2 illustrates a partial perspective view of a bamboo section formed from a secant of a bamboo cane, according to the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present inventions. In addition, common but well-understood elements that are useful or necessary in a commercially feasible embodiment are often not depicted in order to facilitate a less obstructed view of these various embodiments of the present invention.

DETAILED DESCRIPTION

The present disclosure provides structural panels at least partially formed from bamboo and non-bamboo materials (i.e., bamboo-hybrid structural panels), structural sections constructed from at least one such bamboo-hybrid structural panel (such as wall sections, floor sections, and roof sections), and methods for constructing the same.

The structural panels described herein are engineered laminates comprising layers (or plies) of bamboo and non-bamboo materials. The layers are generally adhered together, such as by passing each layer through an adhesive curtain and then pressing the layers together while the adhesive cures (such as through chemical reaction, sometimes accelerated and/or initiated by radiofrequency and/or heat treatment).

The structural panels of the present disclosure are occasionally referred to herein as Generation 3 (or Gen. 3) structural panels, particularly when describing the advantages of said structural panels relative to known panels such as the 2.0 panel. The present disclosure describes many variations of the Gen. 3 structural panels, which can be utilized as standalone construction elements (e.g., structural panels) in a variety of applications, including walls, ceilings, roofs, and floors.

Any of the Gen. 3 structural panels described herein may form part of a structural section, for example part of a wall section, roof section, and floor section. As described below, the superior structural properties of the Gen. 3 structural panels, both alone and in combination with unique features of the structural sections, enable structural sections to have superior structural properties as compared to known structural sections constructed of known structural panels.

FIG. 1A illustrates a representative timber bamboo cane 100 cut from timber bamboo culms, for example of dendrocalamus barbatus, bambusa blumeana, bambusa vulgaris, dendrocalamus sericeus, yushania alpina, bambusa oldhamii, bambusa balcooa, bambusa tulda, dendrocalamus scortechinii, p. pubescens, guadua angustifolia, bambusa bambos, and dendrocalamus asper. Bamboo canes form the basis of the bamboo layers of the structural panels described herein. As shown, the bamboo cane 100 includes a plurality of culm portions 102 disposed between nodes 104. The bamboo cane 100 may have a length of about 1 foot to about 20 feet or greater and a diameter of at least about two inches, e.g., 3-5 inches.

FIG. 1B shows a cross section of a bamboo cane 100, which forms the basis of the bamboo structural layers of the structural panels of the present disclosure. The bamboo cane 100 has an outer cutaneous hard cortex surface 106 (alternately referred to as the "hard side") and an inner relatively soft pith surface 108 (alternatively referred to as the "soft side"). The hard cortex surface 106 is described herein as radially outer and/or convex, and the soft pith surface 108 is described herein as radially inner and concave, although as a result of the processing steps described below, the hard cortex surface 106 and/or soft pith surface 108 may lose their convex and concave shapes. The hard cortex surface 106 contributes much of the longitudinal compression strength of the bamboo cane 100 (i.e., compression along a length dimension) due to its relatively high fiber density and parallel fiber orientation.

Referring to FIG. 1C, the bamboo cane 100 is cut longitudinally into two or more secants 110 for further processing. In the representative example shown, the secant 110 is a 120 degree secant cut from the bamboo cane 100 (three such secants would be cut from the bamboo cane 100). In other embodiments, the bamboo cane 100 may be cut or split into a different number of secants, e.g., 2, 3, 4, 5, 6, 7, 8, 9, or 10 secants divided evenly or unevenly about a longitudinal axis of the bamboo cane 100.

Each bamboo secant is then processed by one or more processes in order to produce a roughly rectangular dimensional bamboo section having a relatively uniform width and uniform thickness. In any embodiment of the present disclosure, the length of each bamboo section after processing is 1-18 feet, e.g., 1-13 feet, 1-12 feet, 1-10 feet, 1-9 feet, 1-8 feet, 2-12 feet, 2-10 feet, 2-9 feet, 2-8 feet, 6 feet, 7 feet, 8 feet, 9 feet, 10 feet, 12 feet, or longer lengths. In any embodiment of the present disclosure, the width of each bamboo section after processing is 1-12 inches, 1-8 inches, 1-6 inches, 1-4 inches, 1-2 inches, 2-12 inches, 2-8 inches, 2-6 inches, 2-4 inches, 3-8 inches, 3-6 inches, 3-4 inches, 4-8 inches, 4-6 inches, 1 inch, 2 inches, 3 inches, 4 inches, 5 inches, or 6 inches. In any embodiment of the present disclosure, the thickness of each bamboo section after processing is 0.05 inch-2.0 inches, 0.10-1.50 inches, 0.10-1.3125 inches, 0.10-1.25 inches, 0.10-1.1875 inches, 0.125-1.50 inches, 0.125-1.3125 inches, 0.125-1.25 inches, 0.125 inches-1.1875 inches, 0.0625 inches, 0.125 inches, 0.1875 inches, 0.25 inches, 0.3125 inches, 0.375 inches, 0.4375 inches, 0.5 inches, 0.5625 inches, 0.625 inches, 0.6875 inches, 0.75 inches, 0.8125 inches, 0.875 inches, 0.9375 inches, 1.0 inch, 1.125 inches, 1.25 inches, or 1.375 inches.

Representative process steps utilized to produce a dimensional bamboo section in any embodiment of the present disclosure include splitting, planing, sawing, jointing, sanding, molding, pressing, drying (e.g., to achieve a moisture content of 20% or less), and/or chemical treatment (e.g., insecticide treatment). For example, in an embodiment, a bamboo secant is sawed to any of the target widths above and planed to any of the target thicknesses above. Optionally, the bamboo secant is pressed (as in a mold) in order to achieve the target dimensions.

FIG. 2 shows a portion of a rectangular bamboo section 200 derived from a secant of a bamboo cane and processed according to the sawing and planing processes described above. The structural panels described herein each include a bamboo layer comprising a plurality of alike bamboo sections 200, which impart strength, dimensional stability, and for other advantage.

The resulting dimensional bamboo section 200 is still characterized by its naturally occurring hard cortex surface 202 on one side and soft pith surface 204 on the other side. Notably, due to the processing steps such as sawing and planing, the hard cortex surface 202 and soft pith surface 204 may no longer have the natural convex and concave shapes, respectively. To take advantage of the longitudinal strength of the hard cortex surface 202, some structural panels described below place the hard cortex surface 202 facing "out," i.e., away from a neutral plane of the structural panel. Advantageously, this arrangement increases stiffness of the structural panel as compared to placing the hard cortex surface 202 facing "in," i.e., toward the neutral plane.

Bamboo section 200 is also characterized by its grain orientation, i.e., the predominant orientation of its fibers. Generally, the grain orientation is parallel to the longitudinal dimension of the bamboo section 200, as shown in FIG. 2. In this disclosure, a "vertical" grain orientation of a bamboo structural layer means that the bamboo sections 200 are oriented such that the longitudinal dimension is parallel with a longitudinal dimension of the structural panel. Similarly, a "horizontal" grain orientation of a bamboo structural layer means that the bamboo sections 200 are oriented such that the longitudinal dimension is perpendicular to the longitudinal dimension of the structural panel. A "vertical" grain orientation generally increases compressive strength of the structural panel. Dimensional stability of a structural panel is increased in the direction of the grain orientation (whether vertical or horizontal).

Figure 3:
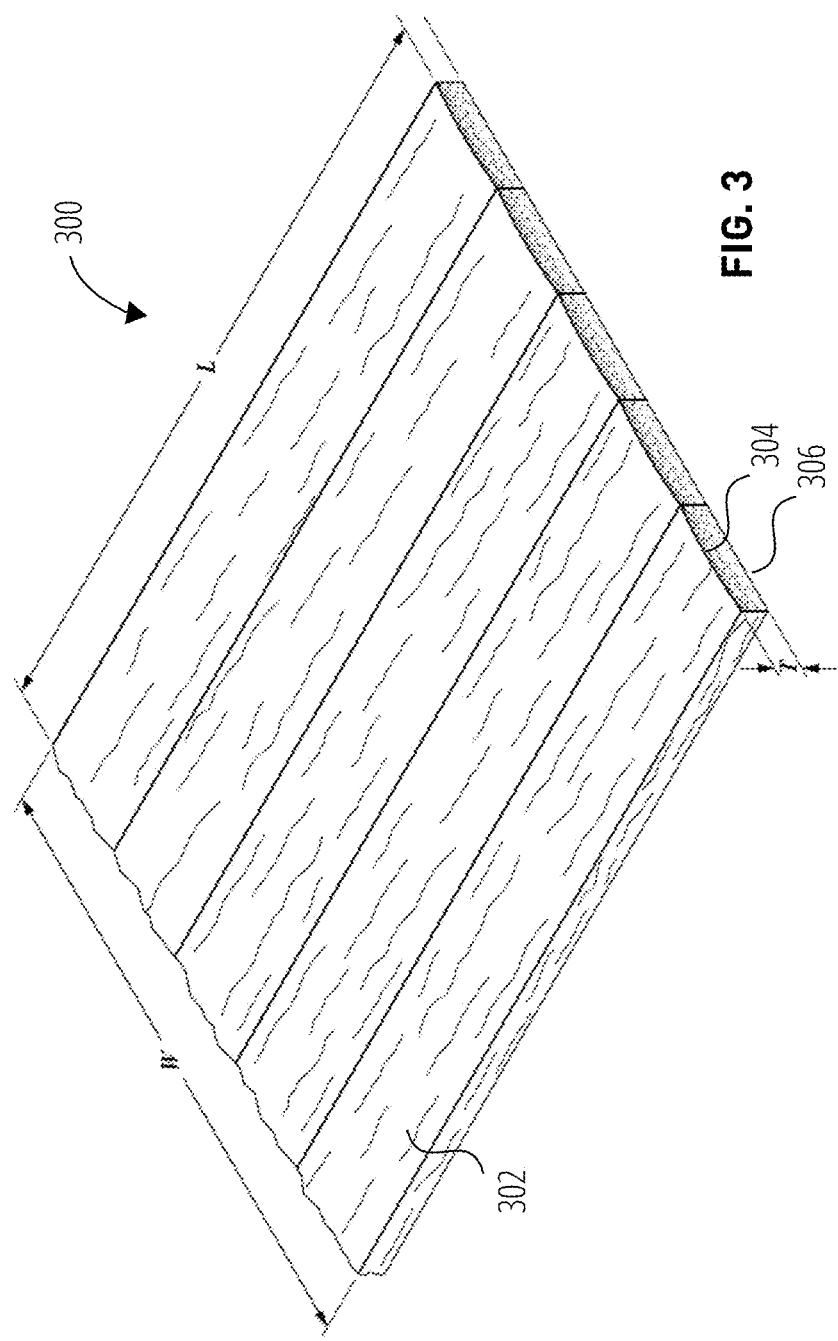
FIG. 3 illustrates a partial perspective view of a bamboo structural layer formed from bamboo sections, according to the present disclosure.

FIG. 3 shows a bamboo layer 300 comprising a plurality of joined bamboo sections 302, each of which is analogous to the bamboo section 200 of FIG. 2. The bamboo sections 302 are joined together and/or to a substrate (e.g., a non-bamboo layer), such as with an adhesive (e.g., such as a melamine formaldehyde adhesive) and/or a fastener (e.g., a nail). The resulting structure provides a bamboo structural layer with comparable or better performance (e.g., vertical compressive capacity and transverse stiffness) as compared to comparable-thickness non-bamboo structural layers, such as parallel strand lumber (PSL), laminated veneer lumber (LVL), oriented strand board (OSB), and laminated strand lumber (LSL), and medium density fiberboard (MDF).

The dimensions of the bamboo layer 300 may differ between embodiments along one or more of a thickness T, a width W, and a length L. In any embodiment of the present disclosure, the thickness of each bamboo layer 300 is substantially the same as the thickness of the bamboo sections which make up the bamboo layer 300, i.e., about 0.05 inch-about 1.5 inch, e.g., 0.05 inch-2.0 inches, 0.10-1.50 inches, 0.10-1.3125 inches, 0.10-1.25 inches, 0.10-1.1875 inches, 0.125-1.50 inches, 0.125-1.3125 inches, 0.125-1.25 inches, 0.125 inches-1.1875 inches, 0.0625 inches, 0.125 inches, 0.1875 inches, 0.25 inches, 0.3125 inches, 0.375 inches, 0.4375 inches, 0.5 inches, 0.5625 inches, 0.625 inches, 0.6875 inches, 0.75 inches, 0.8125 inches, 0.875 inches, 0.9375 inches, 1.0 inch, 1.125 inch, 1.25 inches, or 1.375 inches. In any embodiment of the present disclosure, a width of the bamboo layer 300 is about 12 inches-about 220 inches, e.g., 1-18 feet, e.g., 1-13 feet, 1-12 feet, 1-10 feet, 1-9 feet, 1-8 feet, 2-12 feet, 2-10 feet, 2-9 feet, 2-8 feet, 4 feet, 5 feet, 6 feet, 7 feet, 8 feet, 9 feet, 10 feet, 12 feet, 18 inches, 24 inches, 36 inches, 48 inches, 60 inches, or 120 inches. In any embodiment of the present disclosure, a length of the bamboo layer 300 is 1-18 feet, 1-13 feet, 1-12 feet, 1-10 feet, 1-9 feet, 1-8 feet, 2-12 feet, 2-10 feet, 2-9 feet, 2-8 feet, 6 feet, 7 feet, 8 feet, 9 feet, 10 feet, 11 feet, 12 feet, 96 inches, 108 inches, 120 inches, or 132 inches.

The bamboo layer 300 has a grain orientation corresponding to the grain orientation of the underlying bamboo sections 302. Accordingly, the grain orientation of the bamboo layer 300 is predominantly parallel to the length dimension L (a longest dimension) of the bamboo layer 300. Generally, the bamboo layer 300 has greater strength and dimensional stability along its grain orientation than perpendicular to it. For this reason, the structural panels described herein position each bamboo layer 300 in a manner that utilizes the grain orientation of the bamboo layer 300 for one or both of the foregoing advantages. For example, any of the structural panels of the present disclosure may include at least one bamboo layer 300 having a grain orientation oriented along the longitudinal direction of the structural panel (a "vertical" grain orientation), in order to increase compressive strength and dimensional stability in the longitudinal direction. Similarly, any of the structural panels of the present disclosure may include at least one bamboo layer 300 have a grain orientation oriented perpendicular to the longitudinal direction of the structural panel (a "horizontal" grain orientation) to improve dimensional stability in a width direction of the structural panel.

As described above, each bamboo section 302 of the bamboo layer 300 has a hard cortex surface 304 and a soft pith surface 306, each of which can be utilized for advantage in different ways. For example, placement of the hard cortex surface in a structural panel facing away from the neutral plane of the structural panel generally increases its strength. On the other hand, placement of the soft pith surface facing away from the neutral plane facilitates finishing. Accordingly, in some bamboo layers 300, the bamboo sections 302 are oriented such that the hard cortex surface of each bamboo section 302 faces a common direction; accordingly, in such embodiments, the soft pith surface of each bamboo section 302 faces the same (opposite) direction. This enables the resulting bamboo layer 300 to be utilized in a manner that maximizes the advantages of its hard cortex surface or soft pith surface. In some embodiments of the bamboo layer 300, some bamboo sections have the hard cortex surface facing a first direction, and other bamboo sections have the hard cortex surface facing a second direction.

Bamboo layer 300 may include one or more voids due to holes, longitudinal fissures, or cracks. In some embodiments, these voids are filled with a slurry (comprising a matrix and reinforcement) made of a combination of adhesive matrix and substrate material reinforcement, the nature and composition of which can be adjusted for different applications. The slurry can either be applied on the bamboo layer 300 before it has been pressed into a panel, or it can be applied to the surface of a finished panel if the bamboo layer 300 is on the face of the panel. There are added benefits to filling in holes in the bamboo layer 300 with such a slurry, including (1) improved acoustic attenuation from reduced volume of air gaps and increased layer density, (2) reduced heat transfer from replacing air gaps with a higher thermally-resistive material, (3) increased fire resistance from decreasing surface area and decreasing available oxygen volumes for combustion, (4) increasing bond strength between the slurried sheet and surrounding bamboo or non-bamboo layers by providing a continuous glue line with a greater bonding surface while also preventing the applied glue from migrating into the voids away from the intended bonding plane, and (5) providing a better finish surface without gaps.

Figure 4:
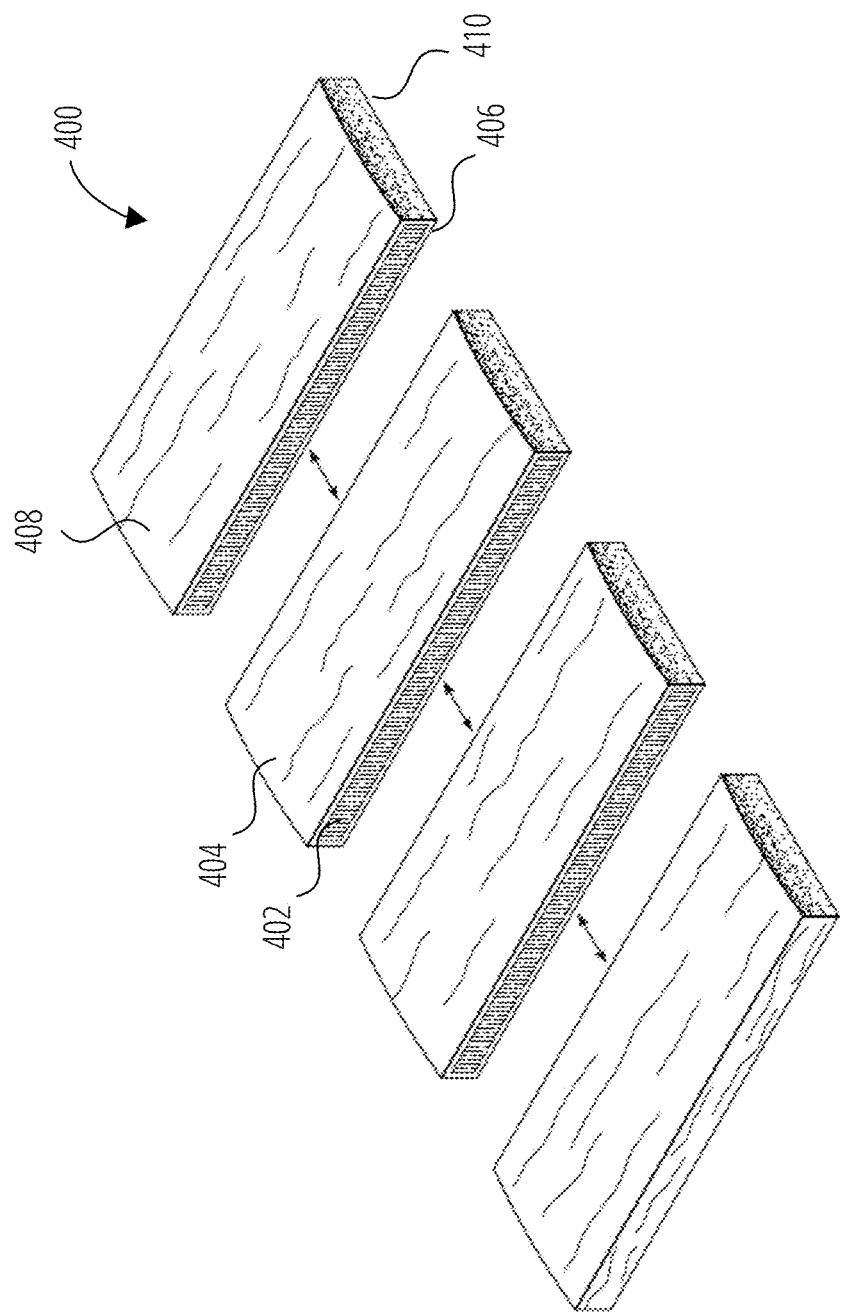
FIG. 4 illustrates a partial exploded view of an edge-adhered bamboo structural layer according to the present disclosure.

FIG. 4 shows an exploded view of an edged-adhered bamboo layer 400 having a plurality of bamboo sections 404 adhered together by an adhesive 402. In particular, adhesive 402 bonds lateral faces 406 the bamboo sections 404 together. In some embodiments, after application of the adhesive 402, the plurality of bamboo sections 404 are pressed together and optionally subjected to heat and/or RF treatment to cure the adhesive 402. Any bamboo layer of the present disclosure may have this construction, which advantageously enables each bamboo layer 400 to be easily manipulated during fabrication of the structural panels.

When the bamboo layer 400 is integrated into a structural panel as described below, one or both of the front face 408 or the rear face 410 are joined (e.g., adhesively or with a fastener) with other layers of the structural panel, e.g., other alike or different bamboo layers or non-bamboo layers.

Figure 5:
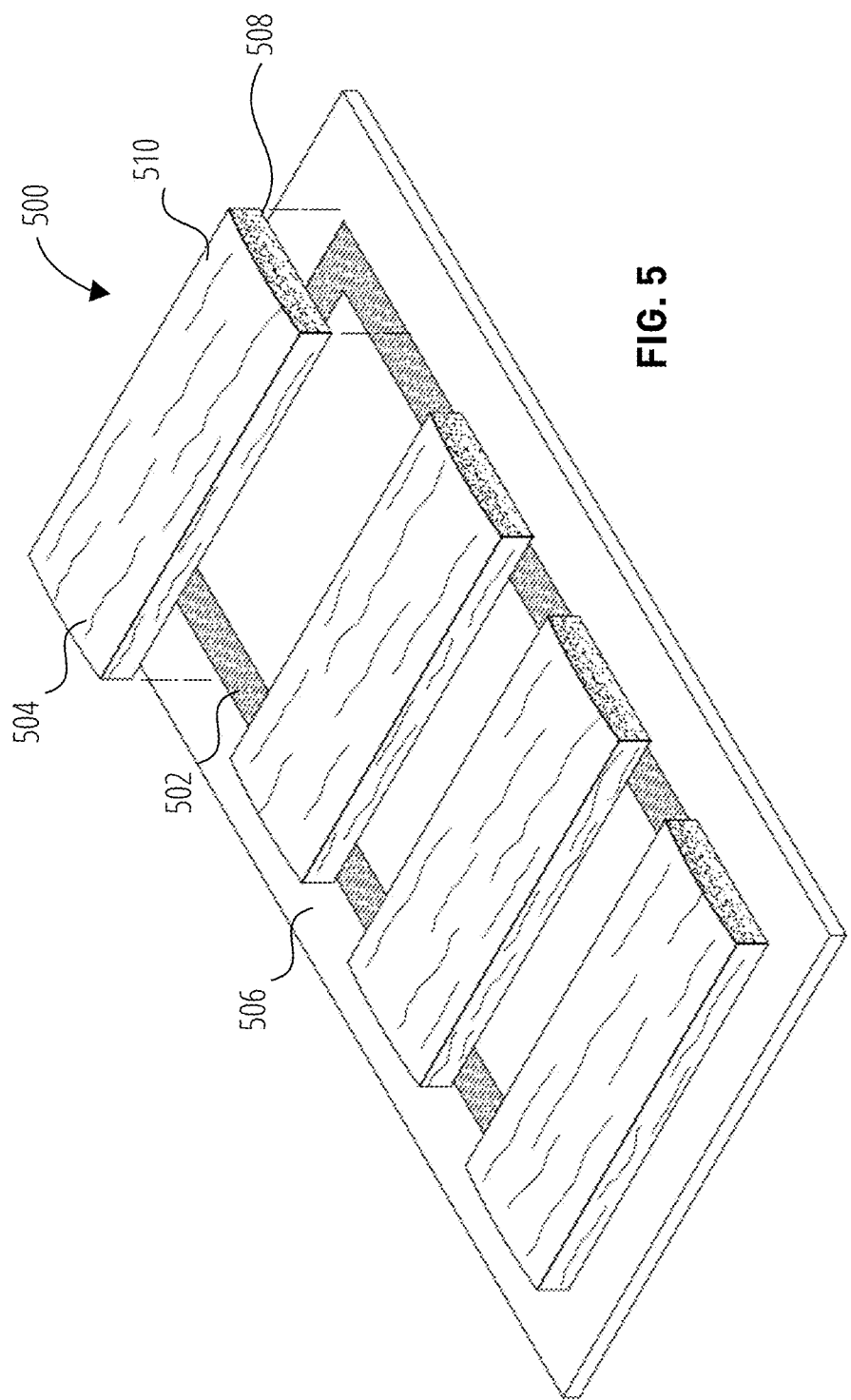
FIG. 5 illustrates a partial exploded view of a face-adhered bamboo structural layer according to the present disclosure.

FIG. 5 shows an exploded view of a face-adhered bamboo layer 500 having a plurality of bamboo sections 504 which are each adhered by an adhesive 502 to a substrate 506 such as another bamboo layer or a non-bamboo layer of a structural panel. In particular, the adhesive 502 bonds the front face 508 and/or rear face 510 of each bamboo section 504 to a substrate 506, but not directly to other bamboo sections 504 of the same bamboo layer 500. Any bamboo layer of the present disclosure may have this construction, which advantageously avoids cross-grain tension forces which would otherwise be caused when the bamboo layer 500 shrinks transversely.

The foregoing bamboo layers are representative, not limiting. In some embodiments, bamboo layers are at least partially formed from adhesively joined bamboo scrimber or strand woven bamboo. In other embodiments, bamboo layers are at least partially formed from bamboo esterilla, i.e., internally scored and flattened bamboo cane sections.

Structural Panels

The bamboo layers described above are utilized as one or more structural layers in bamboo-hybrid structural panels, i.e., engineered laminates formed of non-bamboo layers and at least one bamboo layer. The bamboo-hybrid structural panels described below have many applications, including in structural sections such as wall sections, floor sections, and roof sections. As shown below, the bamboo hybrid structural panels offer significant and unobvious performance benefits over known products, including the Gen. 2 bamboo-hybrid panel and non-bamboo panels.

Representative structural panels will now be described.

Generally speaking, the structural panels of the present disclosure are laminates having a plurality of adhered-together structural lamina, including a plurality of bamboo structural layers and at least one non-bamboo structural layer disposed between the individual bamboo structural layers. A first bamboo structural layer and a second bamboo structural layer of the plurality of bamboo structural layers are spaced apart on opposite sides of a neutral plane extending through a center of the structural panel and parallel to the plurality of bamboo layers. The neutral plane is a reference plane which does not experience stress (either compressive or tensile) or strain when the structural panel is subjected to a bending force.

Because the bamboo structural layers generally have greater stiffness (e.g., Modulus of Elasticity, or MOE) than available non-bamboo structural layers, positioning bamboo structural layers away from the neutral plane increases the composite structural panel stiffness due to the squared relationship between layer centroid distance from the panel neutral plane.

As used herein, the term "bamboo layer" or "bamboo structural layer" includes a structural layer or lamina at least partially formed from bamboo. Representative bamboo layers include the bamboo layer 300 of FIG. 3, the bamboo layer 400 of FIG. 4, the bamboo layer 500 of FIG. 5, and any of the variants described herein, e.g., variations with respect to dimension (thickness, width, length), grain orientation, orientation of a hard cortex surface and/or a soft pith surface, edge-adhered structure, face-adhered structure, and the like. For clarity, unless specified differently, "bamboo layer" includes bamboo structural layers at least partially formed from adhesively joined bamboo scrimber, strand woven bamboo, bamboo esterilla, and other forms of bamboo fiber. Restated, unless stated otherwise, the term "bamboo layer"

is not limited to layers formed of adhesively joined bamboo sections, each bamboo section being formed from a secant of a bamboo cane.

As used herein, the term "non-bamboo structural layer" (used alternatively with the term "non-bamboo layer") refers to structural layers or lamina not containing any bamboo fibers therein. Representative non-bamboo structural layers include parallel strand lumber (PSL), laminated veneer lumber (LVL), oriented strand board (OSB), laminated strand lumber (LSL), medium density fiberboard (MDF), plywood, chipboard, lumber veneer, dimensional lumber (e.g., at least partially formed of a wood species selected from the group consisting of: spruce pine fir, southern yellow pine, douglas fir, or whitewood), and the like. For clarity, the term "non-bamboo structural layer" excludes layers or lamina which, taken alone, have zero or de minimis in-plane vertical or horizontal compressive capacity. For example, the term "non-bamboo structural layer" excludes barrier layers as defined below, and finish layers such as drywall. The term "non-bamboo structural layer" also excludes adhesive layers joining adjacent structural layers because the vertical compressive capacity of said layers is negligible, even though said adhesive layers add structural shear and transverse tension strength between lamina. Embodiments of non-bamboo structural layers may have any of the dimensions as described above with respect to bamboo structural layers. Moreover, a non-bamboo structural layer may have multiple plies and still be a single non-bamboo structural layer when the plies are joined together independently of the composite structural panel of which they form a part, as in the case of a sheet of plywood.

"Adhesive layer" refers to a layer of adhesive disposed between adjacent structural layers which, when cured, joins said adjacent structural layers. Representative adhesives include spray polyurethane foam (SPF) adhesives, phenol formaldehyde (PF) adhesives, phenol resorcinol formaldehyde (PRF) adhesive, polyurethane reactive (PUR) adhesives, melamine formaldehyde (MF) adhesives, and the like. An adhesive layer may also refer to an adhesive that joins a barrier layer or a finish layer to an outermost structural layer of the structural panel.

"Barrier layer" refers to a non-structural layer or layers of material joined to an outermost structural layer of the structural panel, which is weather resistant, water resistant, vapor resistant, and/or air infiltration resistant in order to prevent moisture and optionally air ingress into the structural panel. Representative barrier layers include resin-impregnated paper, asphalt felt, polyolefin house wrap (such as nonwoven spun bond olefin fiber), rigid-foam insulation, liquid-applied compounds (such as asphalt-based compounds), and building paper. In any embodiment, a barrier layer meets or exceeds 1994 Uniform Building Code Section 1402.1 and/or is a building paper as defined in 1994 Uniform Building Code Standard 14-1. In any embodiment, a barrier layer is a water resistive barrier having a water resistance as defined in the 2018 International Residential Code, e.g., one layer of No. 15 asphalt felt, free from holes and breaks, complying with ASTM D226 for Type 1 felt or other approved water-resistive barrier shall be applied over studs or sheathing of all exterior walls. No. 15 asphalt felt shall be applied horizontally, with the upper layer lapped over the lower layer not less than 2 inches (51 mm). Where joints occur, felt shall be lapped not less than 6 inches (152 mm). Other approved materials shall be installed in accordance with the water-resistive barrier manufacturer's installation instructions. The No. 15 asphalt felt or other approved water-resistive barrier material shall be continuous to the top of walls and terminated at penetrations and building appendages in a manner to meet the requirements of the exterior wall envelope as described in Section R703.1. In any embodiment, a barrier layer is vapor permeable, i.e., has a moisture vapor permeance rating of 5 perms (2.9×10-10 kg/Pa·s·m2) or greater, where tested in accordance with the desiccant method using Procedure A of ASTM E96. In any embodiment, a barrier layer is a Class I (≤0.1 perm rating), Class II (>0.1 to ≤1.0 perm rating), or Class III (>1.0 to ≤10 perm rating) vapor retarder as defined in the 2018 International Residential Code. In any embodiment, a barrier layer is a water-resistive vapor-permeable barrier with a performance at least equivalent to two layers of water-resistive barrier complying with ASTM E2556, Type I. In any embodiment, a barrier layer is a weather-resistive barrier as defined in the 1998 Uniform Building Code. The 1994 Uniform Building Code, 1998 Uniform Building Code, and 2018 International Residential Code are hereby incorporated by reference in entirety for all purposes.

"Finish layer" refers to a layer or layers of material joined to a structural layer of the structural panel, and which is configured to form a substrate for an interior finish (e.g., paint). Representative finish layers include a drywall layer, a medium density overlay veneer, a medium density fiberboard veneer having a thickness less than 0.125", a wood veneer or dimensional lumber having a thickness less than 0.125", or a finish paper layer.

Figure 6A:
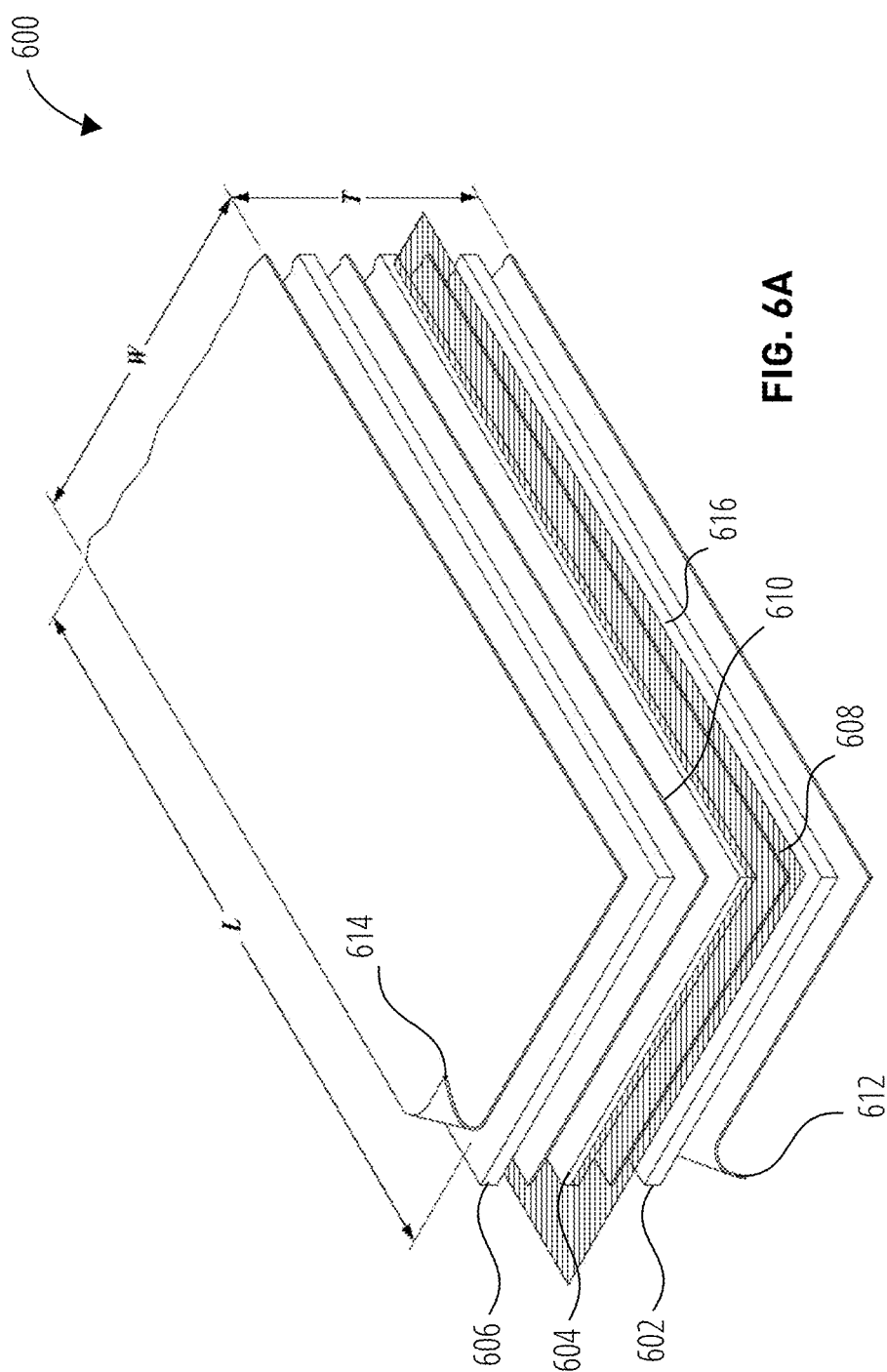
FIG. 6A illustrates an exploded view of a structural panel having at least one bamboo structural layer according to the present disclosure.
Figure 6B:
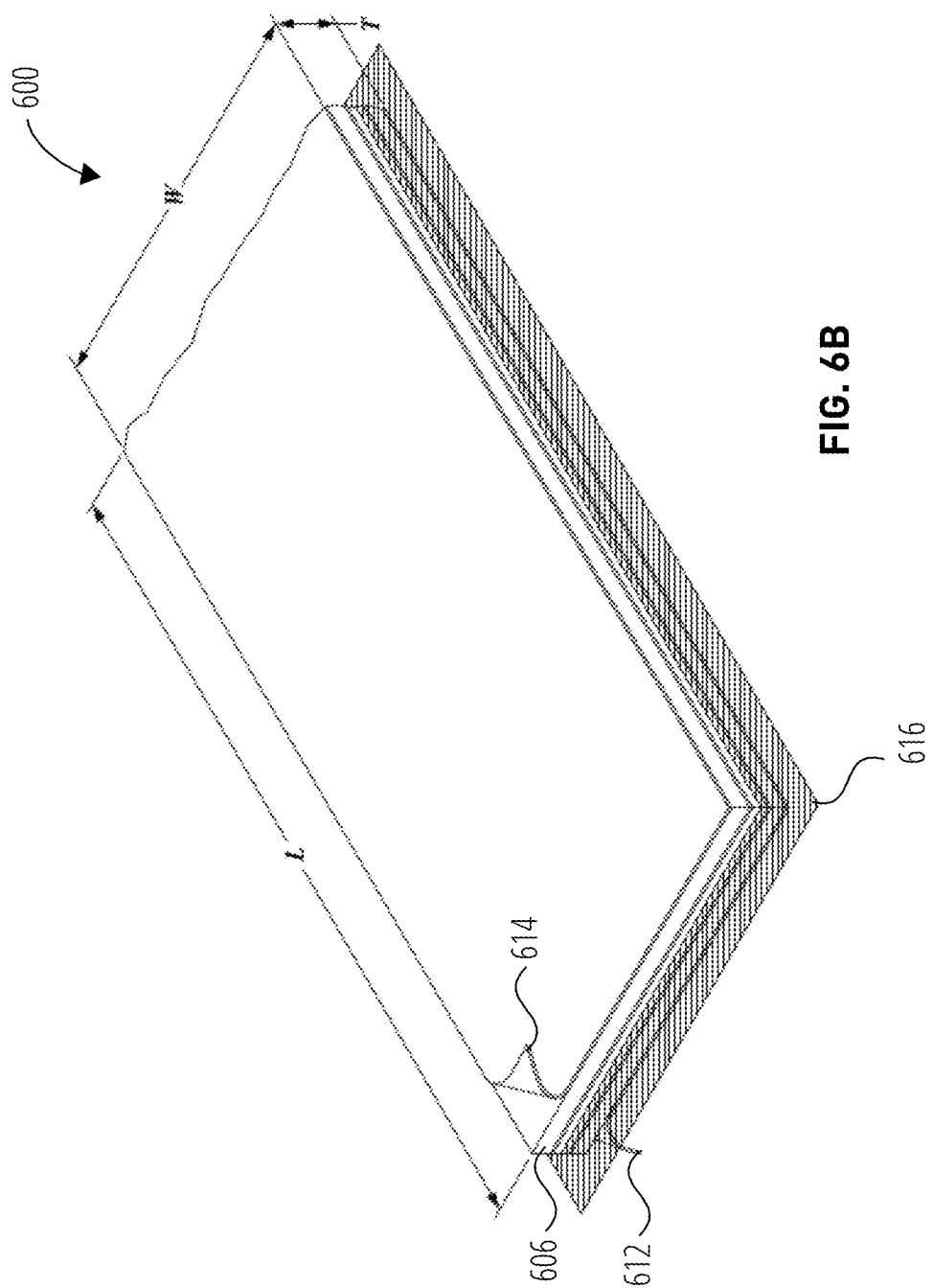
FIG. 6B illustrates a perspective view of the structural panel of FIG. 6A.

FIG. 6A and FIG. 6B show an exploded and unexploded arrangement of a representative laminate structural panel 600, which may have many different specific configurations.

Structural panel 600 is characterized by a length dimension L (a longest dimension of the structural panel 600), a width dimension W perpendicular to the length dimension L, and a thickness T orthogonal to both the length dimension L and the width dimension W. Any structural panel provided herein may have half-lap edges extending along the side edges, to facilitate joining with other structural panels.

Any embodiment of the structural panel 600 and structural panels described herein may have many different length dimensions L, e.g., 1-18 feet, e.g., 1-13 feet, 1-12 feet, 1-10 feet, 1-9 feet, 1-8 feet, 2-12 feet, 2-10 feet, 2-9 feet, 2-8 feet, 6 feet, 7 feet, 8 feet, 9 feet, 10 feet, 11 feet, 12 feet, or longer lengths. Similarly, any embodiment of the structural panel 600 and structural panels described herein may have many different width dimensions W, e.g., 1-18 feet, e.g., 1-13 feet, 1-12 feet, 1-10 feet, 1-9 feet, 1-8 feet, 2-12 feet, 2-10 feet, 2-9 feet, 2-8 feet, 4 feet, 5 feet, 6 feet, 7 feet, 8 feet, 9 feet, 10 feet, 12 feet, or wider widths.

Structural panel 600 includes a plurality of bamboo structural layers having at least a first bamboo structural layer 602 and a second bamboo structural layer 606, and at least one non-bamboo structural layer 604 disposed between the first bamboo structural layer 602 and second bamboo structural layer 606. The first bamboo structural layer 602 is joined with the non-bamboo structural layer 604 by a first adhesive layer 608, and the non-bamboo structural layer 604 is joined with the second bamboo structural layer 606 by a second adhesive layer 610. The structural layers may have many different "layups," i.e., specific combinations of layer compositions, features, arrangements, and configurations which capitalize upon the superior structural properties of bamboo. Representative "layups" are described below.

Any embodiment may have optional first non-structural layer 612 and/or optional second non-structural layer 614, either or both of which can be a barrier layer as defined above (such as a homewrap) or a finish layer as defined above (e.g., a drywall). The first non-structural layer 612 and/or optional second non-structural layer 614 are both disposed on an outer wall surface of an outermost structural layer of the structural panel 600. For reference, a neutral plane 616 extends through a center of the structural panel 600 and parallel to the structural layers 602, 604, and 606. In the embodiment shown, the neutral plane 616 extends through the non-bamboo structural layer 604.

The first bamboo structural layer 602 and second bamboo structural layer 606 each have a composition as described above (e.g., formed of a plurality of adhesively joined bamboo sections and having a thickness of 0.05 inch-1.5 inch) and the non-bamboo structural layer 604 has a composition as described above (e.g., having a thickness of 0.05 inch-1.5 inch). Accordingly, the first bamboo structural layer 602 and second bamboo structural layer 606 are spaced apart by the at least one non-bamboo structural layer 604 on opposite sides of the neutral plane 616. This spaced apart configuration is applicable to embodiments wherein the at least one non-bamboo structural layer 604 includes more than one structural layer, e.g., two, three, four, five, six, seven, or more structural layers. See, e.g., FIG. 8A-FIG. 13B. Note, however, that in some embodiments, at least one additional bamboo structural layer may be disposed between the first bamboo structural layer 602 and the second bamboo structural layer 606 (even along the neutral plane 616).

Any structural panel of the present disclosure may have any one or more of the following features, either alone or in combination with each other. The following features are not limited to structural panels having three structural layers. That is, structural panels having four, five, six, seven, eight, nine, ten, or more structural layers may include one or more of the features below.

In any embodiment, the at least one non-bamboo structural layer 604 has a first grain orientation which differs from a different second grain orientation of the bamboo structural layers 602, 606. For example, in an embodiment, non-bamboo structural layer 604 has a grain orientation which is perpendicular to a length dimension L (a longest dimension) of the structural panel 600 (i.e., a "horizontal" grain orientation), and the first bamboo structural layer 602 and second bamboo structural layer 606 each have a common grain orientation which is parallel to the length dimension L (i.e., a "vertical" grain orientation). That is, the first grain orientation is perpendicular to the second grain orientation. Advantageously, moving horizontal layers (i.e., horizontal grain orientation layers) to the center of the panel and having vertical layers (i.e., vertical grain orientation layers) nearer to the outer faces of the structural panel 600 increases the composite Moment of Inertia of the structural panel 600, which significantly increases its stiffness and bending strength.

In any embodiment, the at least one non-bamboo structural layer 604 includes at least a first non-bamboo structural layer having a first grain orientation and a second non-bamboo structural layer having a different second grain orientation. For example, in some embodiments, the first grain orientation is vertical (parallel to the length dimension L) and the second grain orientation is horizontal. In any embodiment, the at least one non-bamboo structural layer 604 comprises a third non-bamboo structural layer having a third grain orientation, wherein the third grain orientation differs from at least one of the first grain orientation or the second grain orientation. In any embodiment, the at least one non-bamboo structural layer 604 comprises three, four, five, six, or seven non-bamboo structural layers arranged adjacently and having alternating grain orientations, i.e., consecutive non-bamboo structural layers have different grain orientations and every other non-bamboo structural layer shares a common grain orientation (e.g., horizontal-vertical-horizontal-vertical, etc.). In some embodiments, the term "alternating" is applicable to a plurality of layers having different grain orientations even though they are not adjacent layers. The foregoing variations in grain orientation between the non-bamboo structural layers increases dimensional stability of the structural panel 600.

In any embodiment, the first bamboo structural layer 602 and second bamboo structural layer 606 are each formed from a plurality of joined bamboo sections. In any such embodiment, a hard cortex surface of at least some (e.g., all) bamboo sections of each bamboo structural layer face away from the neutral plane 616, for the benefit of increasing composite stiffness of the structural panel 600 by placing the high fiber density portions of the bamboo sections further away from the neutral plane 616. Having the hard cortex surface facing outwards away from the neutral plane gives two additional benefits: fewer and smaller shrinkage fissures in the middle of bamboo sections, because the fissures are larger on the soft pith surface of the bamboo; and a harder finish surface that is more damage resistant.

Alternatively, in some embodiments, a soft pith surface of at least some bamboo sections of each bamboo structural layer face away from the neutral plane 616, e.g., for the benefit of facilitating finishing. In any embodiment, each bamboo section of first bamboo structural layer 602 and/or second bamboo structural layer 606 is at least partially formed of a bamboo species selected from the group consisting of: guadua angustifolia, bambusa bambos, and dendrocalamus asper. In any embodiment, each bamboo section of first bamboo structural layer 602 and/or second bamboo structural layer 606 is at least partially formed of a secant of a bamboo cane. In any embodiment, for the first bamboo structural layer 602 and/or second bamboo structural layer 606, each bamboo section is adhered to another bamboo section. In any embodiment, for the first bamboo structural layer 602 and/or the second bamboo structural layer 606, each bamboo section is adhered to the at least one non-bamboo structural layer 604. In any embodiment, for first bamboo structural layer 602 and/or second bamboo structural layer 606, each bamboo section of the plurality of bamboo sections is adhered to at least one of the non-bamboo structural layer 604 or another bamboo structural layer.

In any embodiment, the structural panel 600 includes a third bamboo structural layer disposed between the first bamboo structural layer 602 and the second bamboo structural layer 606, e.g., along the neutral plane 616. Advantageously, layups of this configuration are resilient against fires, because even if one or first bamboo structural layer 602 or second bamboo structural layer 606 burns, at least two bamboo structural layers remain, i.e., one on each side of the neutral plane 616.

In any embodiment, the structural panel 600 includes a third bamboo structural layer and a fourth bamboo structural layer disposed between the first bamboo structural layer 602 and the second bamboo structural layer 606. In some such embodiments, the first bamboo structural layer 602, the second bamboo structural layer 606, the third bamboo structural layer and the fourth bamboo structural layer have a common grain orientation (e.g., a common vertical grain orientation oriented parallel to the length dimension L of the structural panel). In some such embodiments, the structural panel 600 does not include two consecutive bamboo structural layers. Restated, in such embodiments, bamboo structural layers are spaced apart by at least one non-bamboo structural layer.

In any embodiment, the first bamboo structural layer 602 and second bamboo structural layer 606 are the only bamboo structural layers of the structural panel 600.

In any embodiment, the first bamboo structural layer 602 forms a first outermost structural layer of the structural panel 600 and the second bamboo structural layer 606 forms a second outermost structural layer of the structural panel 600.

In any embodiment, the optional first non-structural layer 612 and/or the optional second non-structural layer 614 is an exterior barrier layer (including any of the barrier layers defined above) or an interior finish layer (including any of the finish layers defined above) disposed on the first bamboo structural layer 602 or the second bamboo structural layer 606, respectively, wherein the first bamboo structural layer 602 and/or the second bamboo structural layer 606 are outermost structural layers of the structural panel 600.

In any embodiment, the structural panel 600 includes at least one additional non-bamboo structural layer disposed on the first bamboo structural layer 602 and/or the second bamboo structural layer 606. In any of such embodiments, the at least one additional non-bamboo structural layer may form an outermost structural layer of the structural panel 600.

In any embodiment, an optional first non-bamboo structural layer is disposed on an outer wall surface of the first bamboo structural layer 602 and/or an optional second non-bamboo structural layer is disposed on an outer wall surface of the second bamboo structural layer 606. In any such embodiment, the first non-bamboo structural layer and/or second non-bamboo structural layer has a perpendicular or parallel grain orientation relative to a grain orientation of the first bamboo structural layer 602 or second bamboo structural layer 606, respectively. Similarly, in any such embodiment, the first non-bamboo structural layer and/or second non-bamboo structural layer has a different or same grain orientation relative to a grain orientation of the first bamboo structural layer 602 or second bamboo structural layer 606, respectively.

In any embodiment, the at least one non-bamboo structural layer 604 is at least partially formed of at least one of a dimensional lumber, parallel strand lumber, a laminated veneer lumber, an oriented strand board, or a laminated strand lumber. In any embodiment, the at least one non-bamboo structural layer 604 is at least partially formed from a wood species selected from the group consisting of: spruce pine fir, southern yellow pine, douglas fir, or whitewood.

Layups

Turning briefly to FIG. 7A and FIG. 7B, specific layups of structural panels will now be described with reference to the legend 700 in connection with the schematics presented in FIG. 8A-FIG. 13B and FIG. 26. That is, the icons used in FIG. 8A-FIG. 13B and FIG. 26 have meanings corresponding to the legend 700 of FIG. 7A and FIG. 7B. Note, dimensions provided in FIG. 8A-FIG. 13B and FIG. 26 are expressed in inches.

Icon 702, having vertical spaced-apart black bars and code "V" means a bamboo structural layer as defined above formed of a plurality of joined bamboo sections and having a vertical grain orientation, i.e., a grain orientation predominantly oriented parallel to a length dimension of the structural panel.

Icon 704, having horizontal spaced-apart black bars and code "H" means a bamboo structural layer as defined above formed of a plurality of joined bamboo sections and having a horizontal grain orientation, i.e., a grain orientation predominantly oriented perpendicular to a length dimension (parallel to a width dimension) of the structural panel.

Icon 706, having off-vertical spaced apart black bars and code "S" means a bamboo structural layer as defined above and having a skewed grain orientation, i.e., a grain orientation that is neither parallel to the length dimension nor parallel to the width dimension. The degree of skew may vary in different embodiments, e.g., 1-15 degrees off-vertical, 15-30 degrees off-vertical, 30-45 degrees off-vertical, 45-60 degrees off-vertical, 60-75 degrees off-vertical, or 75-89 degrees off-vertical.

Icon 708, having vertical spaced-apart equal-length dashes and code "VV" means "veneer vertical," i.e., a non-bamboo structural layer as defined above and having a vertical grain orientation, but excluding dimensional lumber having thickness greater than or equal to about 0.625 inches. Representative VV non-bamboo structural layers include peeled lumber veneers, parallel strand lumber (PSL), laminated veneer lumber (LVL), oriented strand board (OSB), laminated strand lumber (LSL), and medium density fiberboard (MDF).

Icon 710, having a horizontal spaced-apart equal-length dashes and code "VH" means "veneer horizontal," i.e., a non-bamboo structural layer as defined above and having a horizontal grain orientation, but excluding dimensional lumber having thickness greater than or equal to about 0.625 inches. Restated, icon 710 has the same meaning as icon 708 except that the grain orientation is horizontal.

Icon 712, having vertical spaced-apart equal-length dashes and code "LV" means "lumber vertical," i.e., a non-bamboo structural layer comprising dimensional lumber (e.g., sawed lumber) having a vertical grain orientation and a thickness of at least about 0.625 inches. Representative types of dimensional lumber having a thickness of at least about 0.625 inches includes 1×4, 1×6, 2×4, 2×6, and 2×10 pieces.

Icon 714, having horizontal spaced art equal-length dashes and code "LH" means "lumber horizontal," i.e., a non-bamboo structural layer comprising dimensional lumber (e.g., sawed lumber) having a horizontal grain orientation and a thickness of at least about 0.625 inches. Restated, icon 714 has the same meaning as icon 712 except that the grain orientation is horizontal.

Icon 716, having vertical thick spaced-apart lines and code "3V" means a bamboo structural layer as defined above formed of a plurality of joined bamboo sections, and having a vertical grain orientation. However, the plurality of joined bamboo sections have a "hollow vertical" arrangement including at least two full length bamboo sections extending in the length dimension L which are spaced apart along the width dimension by at least two partial length bamboo sections, creating elongate hollow gaps extending in the length dimension. Restated, this structure creates a ladder-like bamboo structural layer, in which the "rungs" are the full length bamboo sections extending in the length dimension L.

Icon 718, having a horizontal thick spaced-apart lines and code "3H" means a bamboo structural layer as defined above formed of a plurality of joined bamboo sections, and having a horizontal grain orientation. However, the plurality of joined bamboo sections have a "hollow horizontal" arrangement including at least two full length bamboo sections extending in the width dimension W which are spaced apart along the length dimension L by at least two partial length bamboo sections, creating elongate hollow gaps extending in the width dimension. Restated, this structure creates a ladder-like bamboo structural layer, in which the "rungs" are the full length bamboo sections extending in the width dimension W.

Icon 720, appearing in connection with any one of icons 702, 704, 716, 718, 724, or 726 as a horizontal U-shape with the open end facing toward the neutral plane of the structural panel with which it corresponds means that the bamboo structural layer to which it corresponds has the hard cortex surface of its bamboo sections facing away from the neutral plane, i.e., "hard side out."

Icon 722, appearing in connection with any one of icons 702, 704, 716, 718, 724, or 726 as a horizontal U-shape with the open end facing away from the neutral plane of the structural panel means that the bamboo structural layer to which it corresponds has the soft pith surface of its bamboo sections facing away from the neutral plane, i.e., "soft side out."

Icon 724, appearing as vertical spaced-apart unequal-length dashes and having code "SCV" means a bamboo structural layer formed of adhered-together bamboo scrimber having a vertical grain orientation.

Icon 726, appearing as horizontal spaced-apart unequal-length dashes and having code "SCH" means a bamboo structural layer formed of adhered-together bamboo scrimber and having a horizontal grain orientation.

The foregoing icons will facilitate understanding of specific layups described below in FIG. 8A-FIG. 13B, any of which may have an overall thickness of 1.0 inches-18.0 inches, 1.0-13.0 inches, 1.0-12.0 inches, 2.0-13.0 inches, 3.0-13.0 inches, 4.0-13.0 inches, 5.0-13.0 inches, 6.0-13.0 inches, 1.0-1.50 inches, 1.0-1.3125 inches, 1.0-1.25 inches, 1.0-1.1875 inches, 1.125-2.0 inches, 1.125-1.875 inches, 1.125-1.75 inches, 1.125-1.50 inches, 1.125-1.3125 inches, 1.125-1.25 inches, 0.0625 inches, 0.125 inches, 0.1875 inches, 0.25 inches, 0.3125 inches, 0.375 inches, 0.4375 inches, 0.5 inches, 0.5625 inches, 0.625 inches, 0.6875 inches, 0.75 inches, 0.8125 inches, 0.875 inches, 0.9375 inches, 1.0 inch, 1.125 inches, 1.25 inches, or 1.375 inches. Further, any structural panels described below with respect to FIG. 8A-FIG. 13B may have a variety of different length dimensions (e.g., 1-18 feet, e.g., 1-13 feet, 1-12 feet, 1-10 feet, 1-9 feet, 1-8 feet, 2-12 feet, 2-10 feet, 2-9 feet, 2-8 feet, 6 feet, 7 feet, 8 feet, 9 feet, 10 feet, or longer lengths) and width dimensions (e.g., 1-18 feet, e.g., 1-13 feet, 1-12 feet, 1-10 feet, 1-9 feet, 1-8 feet, 2-12 feet, 2-10 feet, 2-9 feet, 2-8 feet, 4 feet, 5 feet, 6 feet, 7 feet, 8 feet, 9 feet, 10 feet, 12 feet, or wider widths) as described above.

Figures 8A, 8B:
FIG. 8A illustrates a schematic section view of a three structural layer structural panel according to the present disclosure.
FIG. 8B illustrates a diagram of representative layups of the structural panel of FIG. 8A, according to the present disclosure.

FIG. 8A shows a three-structural layer structural panel 800 having a first structural layer 802, a second structural layer 804, and a third structural layer 806 which are adhesively joined together by adhesive layers 808, 810, and having optional non-structural layers 812, 814. As described below, structural panel 800 may be configured with any of the layups described with respect to FIG. 8B. Neutral plane 826 passes through second structural layer 804.

FIG. 8B shows specific representative layups corresponding to different embodiments of structural panel 800 of FIG. 8A. It shall be appreciated that the present disclosure is not limited the specific layups described below. In embodiments of any of the layups described below, one or both of non-structural layers 812, 814 is a barrier layer as defined above. In embodiments of any of the layups described below, one or both of non-structural layers 812, 814 is a finish layer as defined above. In embodiments of any of the layups described below, one of non-structural layers 812, 814 is a barrier layer and the other of one of non-structural layers 812 or 814 is a finish layer.

In layups 816, 818, 820, 822, and 824, first structural layer 802 and third structural layer 806 are both bamboo structural layers as defined above formed of a plurality of joined bamboo sections and having a vertical grain orientation, with the hard cortex surface of the joined bamboo section facing away from the neutral plane (which extends through second structural layer 804). Second structural layer 804 is a non-bamboo structural layer comprising dimensional lumber, having a horizontal grain orientation. In some embodiments such as layup 816, each of first structural layer 902 and third structural layer 806 have a common thickness, e.g., 0.25 inch, and second structural layer 804 has a different thickness, e.g., 0.75 inches. In some embodiments such as layup 818, each of first structural layer 902 and third structural layer 806 have a common thickness, e.g., 0.50 inch, and second structural layer 804 has a different thickness, e.g., 1.25 inches. In some embodiments such as layup 820, each of first structural layer 802 and third structural layer 806 have a common thickness, e.g., 0.50 inch, and second structural layer 804 has a different thickness, e.g., 0.625 inches. In some embodiments such as layup 822, each of first structural layer 802, second structural layer 804, and third structural layer 806 have a common thickness, e.g., 0.625 inch. In some embodiments such as layup 824, each of first structural layer 802 and third structural layer 806 have a common thickness, e.g., 0.625 inch, and second structural layer 804 has a different thickness, e.g., 1.375 inches.

Figure 9A:
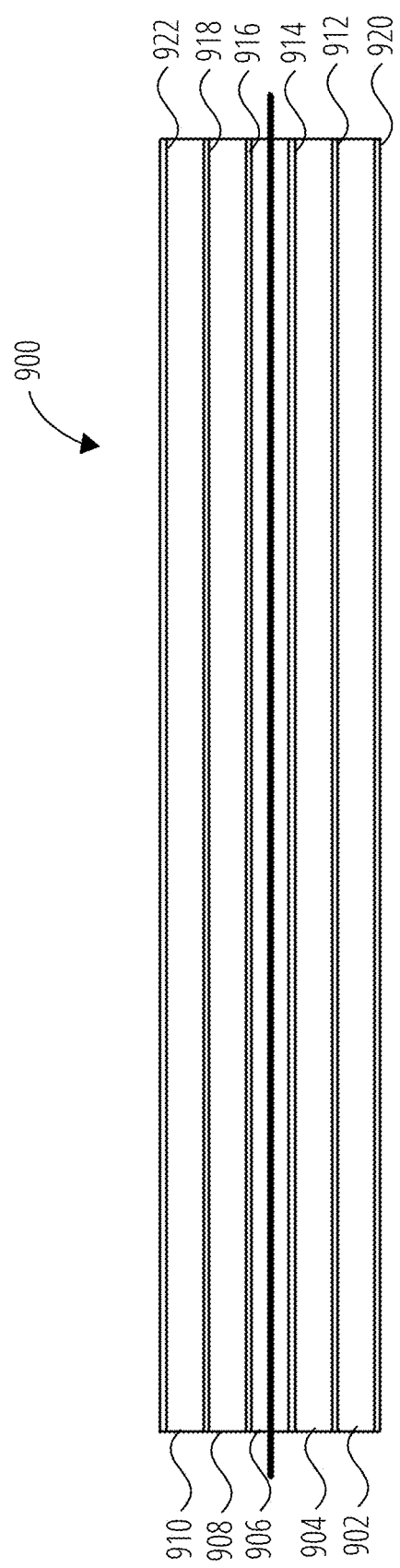
FIG. 9A illustrates a schematic section view of a five structural layer structural panel according to the present disclosure.

FIG. 9A shows a five-structural layer structural panel 900 having a first structural layer 902, a second structural layer 904, a third structural layer 906, a fourth structural layer 908, and a fifth structural layer 910 which are adhesively joined together by adhesive layers 912, 914, 916, and 918, and having optional non-structural layers 920, 922. As described below, structural panel 900 may be configured with any of the layups described with respect to FIG. 9B.

FIG. 9B shows specific representative layups corresponding to different embodiments of structural panel 900 of FIG. 9A. It shall be appreciated that the present disclosure is not limited the specific layups described below. In embodiments of any of the layups described below, one or both of non-structural layers 920, 922 is a barrier layer as defined above. In embodiments of any of the layups described below, one or both of non-structural layers 920, 922 is a finish layer as defined above. In embodiments of any of the layups described below, one of non-structural layers 920, 922 is a barrier layer and the other of one of non-structural layers 920, 922 is a finish layer.

In layups 924, 926, and 928, first structural layer 902 and fifth structural layer 910 are both bamboo structural layers as defined above formed of a plurality of joined bamboo sections and having a vertical grain orientation, with the hard cortex surfaces of the joined bamboo sections facing away from the neutral plane (which extends through third structural layer 906). Second structural layer 904 and fourth structural layer 908 are both non-bamboo structural layers comprising dimensional lumber having a horizontal grain orientation. Third structural layer 906 is a non-bamboo structural layer comprising dimensional lumber having a vertical grain orientation. In some embodiments such as layup 924, first structural layer 902, second structural layer 904, fourth structural layer 908, and fifth structural layer 910 each have a common thickness, e.g., 0.625 inches, and third structural layer 906 has a different thickness, e.g., 1.375 inches. In some embodiments such as layup 926, first structural layer 902 and fifth structural layer 910 each have a common thickness, e.g., 0.625 inch, and second structural layer 904, third structural layer 906, and fourth structural layer 908 each have a common thickness, e.g., 1.375 inches. In some embodiments such as layup 928, first structural layer 902 and fifth structural layer 910 each have a common thickness, e.g., 1.0 inch, and second structural layer 904, third structural layer 906, and fourth structural layer 908 each have a common thickness, e.g., 1.375 inches.

In layup 930, first structural layer 902 and fifth structural layer 910 are both bamboo structural layers as defined above formed of a plurality of joined bamboo sections and having a vertical grain orientation, with the hard cortex surfaces of the joined bamboo sections facing toward the neutral plane. Second structural layer 904 and fourth structural layer 908 are both non-bamboo structural layers comprising dimensional lumber having a horizontal grain orientation. Third structural layer 906 is a bamboo structural layer as defined above formed of a plurality of bamboo sections and having a vertical grain orientation, with the hard cortex surfaces of the joined bamboo sections facing away from the neutral plane. In some embodiments, first structural layer 902, third structural layer 906, and fifth structural layer 910 have a common thickness, e.g., 1.25 inches, and second structural layer 904 and fourth structural layer 908 each have a common thickness, e.g., 1.375 inches. Since the neutral plane passes through third structural layer 906, in some embodiments approximately half of the joined bamboo sections face a first direction with the hard cortex surface facing out, and approximately half of the joined bamboo sections face a second direction with the hard cortex surface facing out. Advantageously, in the event a fire compromises two outer structural layers on one side of the neutral plane, a three-layer structural panel remains with a bamboo structural layer disposed on both sides of the neutral plane.

In layup 932, first structural layer 902 and fifth structural layer 910 are both bamboo structural layers as defined above formed of a plurality of joined bamboo sections and having a vertical grain orientation, with the hard cortex surfaces of the joined bamboo sections facing away from the neutral plane. Second structural layer 904 and fourth structural layer 908 are both bamboo structural layers as defined above formed of a plurality of joined bamboo sections and having a vertical grain orientation, with the hard cortex surfaces of the joined bamboo sections facing toward the neutral plane. Third structural layer 906 is a non-bamboo structural layer comprising dimensional lumber having a horizontal grain orientation. In some embodiments, first structural layer 902, second structural layer 904, fourth structural layer 908, and fifth structural layer 910 each have a common thickness, e.g., 0.28125 inches thickness, and third structural layer 906 has a different thickness, e.g., 0.125 inches.

In layup 934, first structural layer 902 and fifth structural layer 910 are both non-bamboo structural layers as defined above (excluding dimensional lumber having thickness greater than or equal to about 0.625 inches), having a horizontal grain orientation. Second structural layer 904 and fourth structural layer 908 are both bamboo structural layers as defined above formed of a plurality of joined bamboo sections and having a vertical grain orientation, with the hard cortex surface facing away from the neutral plane. Third structural layer 906 is a bamboo structural layer having a "hollow horizontal" arrangement as defined above. In some embodiments, first structural layer 902 and fifth structural layer 910 each have a common thickness, e.g., 0.125 inches, and second structural layer 904, third structural layer 906, and fourth structural layer 908 each have a common thickness, e.g., 0.33 inches.

In layups 936, 938, the first structural layer 902 and fifth structural layer 910 are both non-bamboo structural layers as defined above (excluding dimensional lumber having thickness greater than or equal to about 0.625 inches), having a horizontal grain orientation. Second structural layer 904 and fourth structural layer 908 are both bamboo structural layers as defined above formed of a plurality of joined bamboo sections and having a vertical grain orientation, with the hard cortex surfaces of the joined bamboo sections facing away from the neutral plane. Third structural layer 906 is also a bamboo structural layer as defined above formed of a plurality of joined bamboo sections, having either a vertical grain orientation or a skewed grain orientation (as defined above), with the hard cortex surfaces facing toward the neutral plane. Since the neutral plane passes through third structural layer 906, in some embodiments, approximately half of the joined bamboo sections face a first direction with the hard cortex surface facing in toward the neutral plane, and approximately half of the joined bamboo sections face a second direction with the hard cortex surface facing in toward the neutral plane. In some embodiments, first structural layer 902 and fifth structural layer 910 each have a common thickness, e.g., 0.125 inches, and second structural layer 904, third structural layer 906, and fourth structural layer 908 each have a common thickness, e.g., 0.33 inches.

In layups 940, 942, the first structural layer 902 and fifth structural layer 910 are both non-bamboo structural layers as defined above (excluding dimensional lumber having thickness greater than or equal to about 0.625 inches), having either a horizontal or vertical grain orientation. Second structural layer 904 and fourth structural layer 908 are both bamboo structural layers as defined above formed of a plurality of joined bamboo sections and having a vertical grain orientation, with the hard cortex surfaces of the joined bamboo sections facing away from the neutral plane. Third structural layer 906 is also a bamboo structural layer as defined above formed of a plurality of joined bamboo sections, having a horizontal grain orientation, with the hard cortex surfaces facing toward the neutral plane. Since the neutral plane passes through third structural layer 906, In some embodiments, approximately half of the joined bamboo sections face a first direction with the hard cortex surface facing in toward the neutral plane, and approximately half of the joined bamboo sections face a second direction with the hard cortex surface facing in toward the neutral plane. In some embodiments, first structural layer 902 and fifth structural layer 910 each have a common thickness, e.g., 0.125 inches, and second structural layer 904, third structural layer 906, and fourth structural layer 908 each have a common thickness, e.g., 0.33 inches.

Figure 10A:
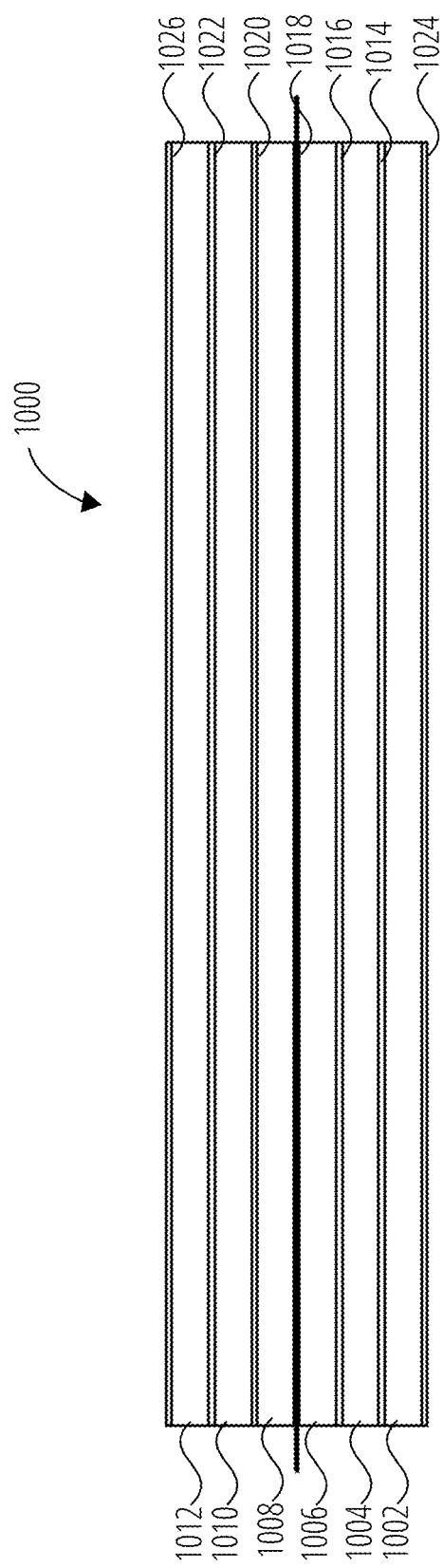
FIG. 10A illustrates a schematic section view of a six structural layer structural panel according to the present disclosure.

FIG. 10A shows a six-structural layer structural panel 1000 having a first structural layer 1002, a second structural layer 1004, a third structural layer 1006, a fourth structural layer 1008, a fifth structural layer 1010, and a sixth structural layer 1012 which are adhesively joined together by adhesive layers 1014, 1016, 1018, 1020, and 1022, and having optional non-structural layers 1024, 1026. As described below, structural panel 1000 may be configured with any of the layups described with respect to FIG. 10B.

Figure 10B:
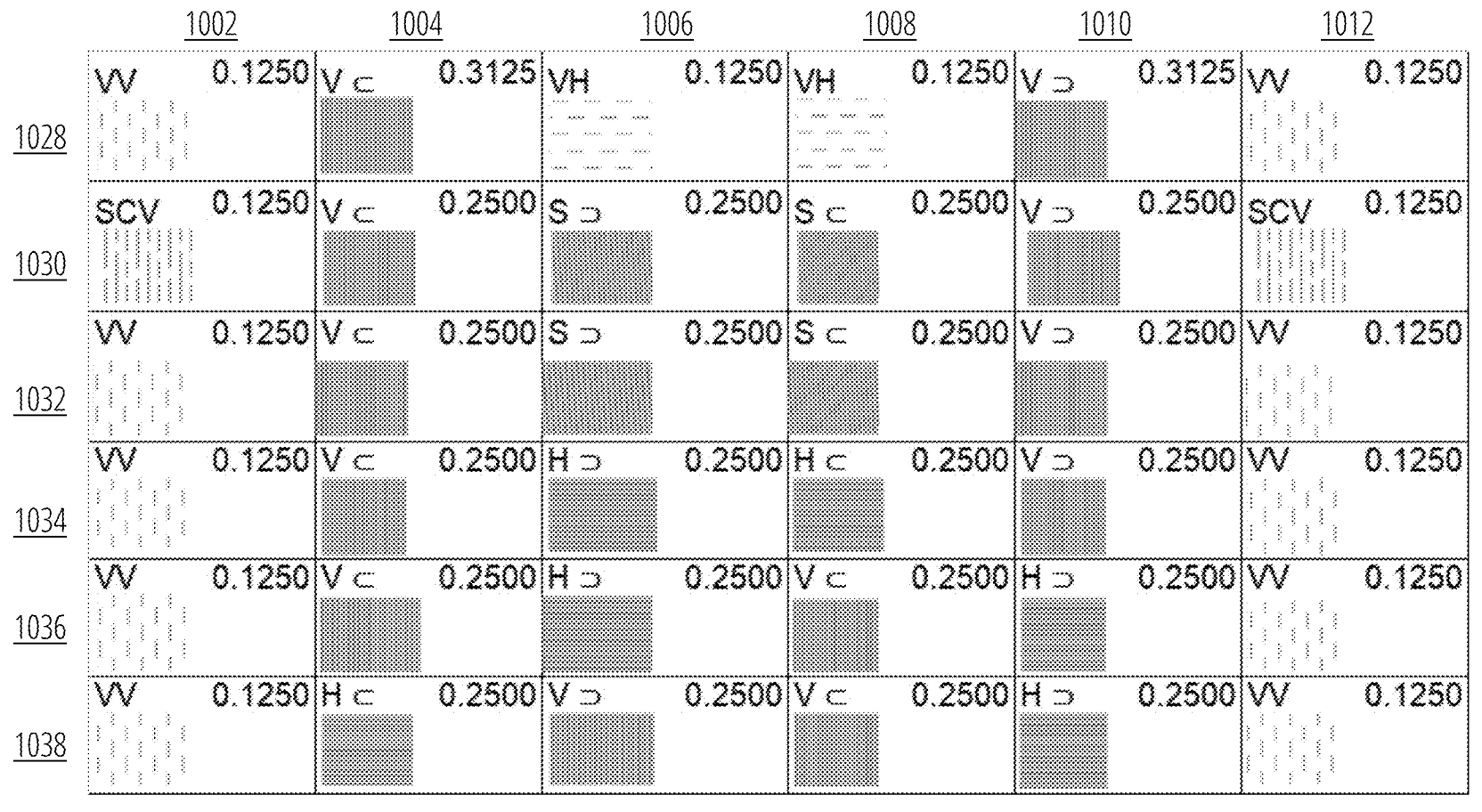

FIG. 10B shows specific representative layups corresponding to different embodiments of structural panel 1000 of FIG. 10A. It shall be appreciated that the present disclosure is not limited the specific layups described below. In embodiments of any of the layups described below, one or both of non-structural layers 1024, 1026 is a barrier layer as defined above. In embodiments of any of the layups described below, one or both of non-structural layers 1024, 1026 is a finish layer as defined above. In embodiments of any of the layups described below, one of non-structural layers 1024, 1026 is a barrier layer and the other of one of non-structural layers 1024, 1026 is a finish layer.

In layup 1028, first structural layer 1002 and sixth structural layer 1012 are both non-bamboo structural layers as defined above (excluding dimensional lumber having thickness greater than or equal to about 0.625 inches), having a vertical grain orientation. Second structural layer 1004 and fifth structural layer 1010 are both bamboo structural layers as defined above formed of a plurality of joined bamboo sections and having a vertical grain orientation, with the hard cortex surfaces of the joined bamboo sections facing away from the neutral plane (which passes between third structural layer 1006 and fourth structural layer 1008). Third structural layer 1006 and fourth structural layer 1008 are both non-bamboo structural layers as defined above (excluding dimensional lumber having thickness greater than or equal to about 0.625 inches), having a horizontal grain orientation. In some embodiments, first structural layer 1002, third structural layer 1006, fourth structural layer 1008, and sixth structural layer 1012 have a common thickness, e.g., 0.125 inches, and second structural layer 1004 and fifth structural layer 1010 have a common thickness, e.g., 0.3125 inches.

In layup 1030, first structural layer 1002 and sixth structural layer 1012 are both bamboo structural layers formed of adhered-together bamboo scrimber having a vertical grain orientation. Second structural layer 1004 and fifth structural layer 1010 are both bamboo structural layers as defined above formed of a plurality of joined bamboo sections and having a vertical grain orientation, with the hard cortex surfaces of the joined bamboo sections facing away from the neutral plane. Third structural layer 1006 and fourth structural layer 1008 are both bamboo structural layers as defined above formed of a plurality of joined bamboo sections and having a skewed grain orientation, with the hard cortex surfaces of the joined bamboo sections facing toward the neutral plane. In some embodiments, first structural layer 1002 and sixth structural layer 1012 have a common thickness, e.g., 0.125 inch, and second structural layer 1004, third structural layer 1006, fourth structural layer 1008, and fifth structural layer 1010 have a common thickness, e.g., 0.25 inch.

In layup 1032 and layup 1034, first structural layer 1002 and sixth structural layer 1012 are both non-bamboo structural layers as defined above (excluding dimensional lumber having thickness greater than or equal to about 0.625 inches), having a vertical grain orientation. Second structural layer 1004 and fifth structural layer 1010 are both bamboo structural layers as defined above formed of a plurality of joined bamboo sections and both having a vertical grain orientation, with the hard cortex surfaces of the joined bamboo sections facing away from the neutral plane. Third structural layer 1006 and fourth structural layer 1008 are both bamboo structural layers as defined above formed of a plurality of joined bamboo sections and both having either a skewed grain orientation or a horizontal grain orientation, with the hard cortex surfaces of the joined bamboo sections facing toward the neutral plane. In some embodiments, first structural layer 1002 and sixth structural layer 1012 have a common thickness, e.g., 0.125 inch, and second structural layer 1004, third structural layer 1006, fourth structural layer 1008, and fifth structural layer 1010 have a common thickness, e.g., 0.25 inch.

In layup 1036, first structural layer 1002 and sixth structural layer 1012 are both non-bamboo structural layers as defined above (excluding dimensional lumber having thickness greater than or equal to about 0.625 inches), having a vertical grain orientation. Second structural layer 1004 and fifth structural layer 1010 are both bamboo structural layers as defined above formed of a plurality of joined bamboo sections, with the hard cortex surfaces of the joined bamboo sections facing away from the neutral plane, and having different grain orientations. For example, in layup 1036, second structural layer 1004 and fifth structural layer 1010 have vertical and horizontal grain orientations, respectively. Third structural layer 1006 and fourth structural layer 1008 are both bamboo structural layers as defined above formed of a plurality of joined bamboo sections, with the hard cortex surfaces of the joined bamboo sections facing toward the neutral plane, and having different grain orientations. For example, in layup 1036, third structural layer 1006 has a horizontal grain orientation and fourth structural layer 1008 has a vertical grain orientation. In some embodiments, first structural layer 1002 and sixth structural layer 1012 have a common thickness, e.g., 0.125 inch, and second structural layer 1004, third structural layer 1006, fourth structural layer 1008, and fifth structural layer 1010 have a common thickness, e.g., 0.25 inch.

In layup 1038, first structural layer 1002 and sixth structural layer 1012 are both non-bamboo structural layers as defined above (excluding dimensional lumber having thickness greater than or equal to about 0.625 inches), having a vertical grain orientation. Second structural layer 1004 and fifth structural layer 1010 are both bamboo structural layers as defined above formed of a plurality of joined bamboo sections, with the hard cortex surfaces of the joined bamboo sections facing away from the neutral plane, and having a horizontal grain orientation. Third structural layer 1006 and fourth structural layer 1008 are both bamboo structural layers as defined above formed of a plurality of joined bamboo sections, with the hard cortex surfaces of the joined bamboo sections facing toward the neutral plane, and having a vertical grain orientation. In some embodiments, first structural layer 1002 and sixth structural layer 1012 have a common thickness, e.g., 0.125 inch, and second structural layer 1004, third structural layer 1006, fourth structural layer 1008, and fifth structural layer 1010 have a common thickness, e.g., 0.25 inch.

Figure 11A:
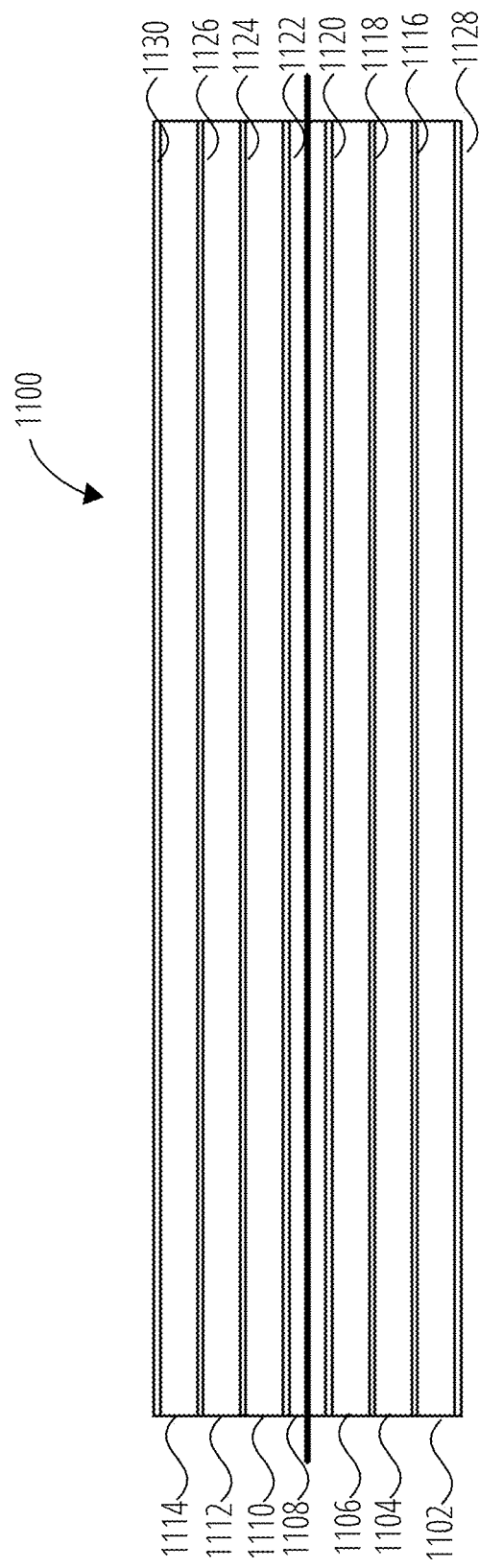
FIG. 11A illustrates a schematic section view of a seven structural layer structural panel according to the present disclosure.

FIG. 11A shows a seven-structural layer structural panel 1100 having a first structural layer 1102, a second structural layer 1104, a third structural layer 1106, a fourth structural layer 1108, a fifth structural layer 1110, a sixth structural layer 1112, and a seventh structural layer 1114, which are adhesively joined together by adhesive layers 1116, 1118, 1120, 1122, 1124, and 1126, and having optional non-structural layers 1128, 1130. As described below, structural panel 1100 may be configured with any of the layups described with respect to FIG. 11B.

FIG. 11B shows specific representative layups corresponding to different embodiments of structural panel 1100 of FIG. 11A. It shall be appreciated that the present disclosure is not limited the specific layups described below. In embodiments of any of the layups described below, one or both of non-structural layers 1128, 1130 is a barrier layer as defined above. In embodiments of any of the layups described below, one or both of non-structural layers 1128, 1130 is a finish layer as defined above. In embodiments of any of the layups described below, one of non-structural layers 1128, 1130 is a barrier layer and the other of one of non-structural layers 1128, 1130 is a finish layer.

In layups 1132-1140, first structural layer 1102 and seventh structural layer 1114 are both bamboo structural layers as defined above formed of a plurality of joined bamboo sections and having a vertical grain orientation, with the hard cortex surfaces of the joined bamboo sections facing away from the neutral plane. Second structural layer 1104, third structural layer 1106, fourth structural layer 1108, fifth structural layer 1110, and sixth structural layer 1112 are non-bamboo structural layers as defined above (excluding dimensional lumber having thickness greater than or equal to about 0.625 inches), having alternating grain orientations. For example, in layups 1132, 1136, 1138, and 1140, second structural layer 1104, fourth structural layer 1108, and sixth structural layer 1112 have a vertical grain orientation, and third structural layer 1106 and fifth structural layer 1110 have a horizontal grain orientation. As another example, in layup 1134, second structural layer 1104, fourth structural layer 1108, and sixth structural layer 1112 have a horizontal grain orientation, and third structural layer 1106 and fifth structural layer 1110 have a vertical grain orientation. In some embodiments, first structural layer 1102 and seventh structural layer 1114 have a common thickness, e.g., 0.25 inches or 0.3125 inches, and second structural layer 1104, third structural layer 1106, fourth structural layer 1108, fifth structural layer 1110, and sixth structural layer 1112 have a common thickness, e.g., 0.125 inches or 0.15 inches. In some embodiments, second structural layer 1104 and seventh structural layer 1114 have a common thickness, e.g., 0.25 inches or 0.3125 inches, second structural layer 1104, third structural layer 1106, fifth structural layer 1110, and sixth structural layer 1112 have a common thickness, e.g., 0.125 inches or 0.10417 inches, and fourth structural layer 1108 has a different thickness, e.g., 0.25 inches or 0.20833 inches.

In layups 1142-1146, first structural layer 1102 and seventh structural layer 1114 are both bamboo structural layers as defined above formed of a plurality of joined bamboo sections and having a vertical grain orientation, with the hard cortex surfaces of the joined bamboo sections facing away from the neutral plane. Second structural layer 1104, third structural layer 1106, fourth structural layer 1108, fifth structural layer 1110, and sixth structural layer 1112 are non-bamboo structural layers comprising dimensional lumber having alternating grain orientations. For example, in layups 1142, 1144, and 1146, second structural layer 1104, fourth structural layer 1108, and sixth structural layer 1112 have a horizontal grain orientation, and third structural layer 1106 and fifth structural layer 1110 have a vertical grain orientation. In some embodiments, first structural layer 1102, second structural layer 1104, sixth structural layer 1112, and seventh structural layer 1114 have a common thickness, e.g., 0.625 inches, third structural layer 1106 and fifth structural layer 1110 have a common thickness, e.g., 1.375 inches, and fourth structural layer 1108 has a different thickness, e.g., 0.625 inches. In some embodiments, first structural layer 1102 and seventh structural layer 1114 have a common thickness, e.g., 0.625 inches or 1.25 inches, and second structural layer 1104, third structural layer 1106, fourth structural layer 1108, fifth structural layer 1110, and sixth structural layer 1112 have a common thickness, e.g., 1.375 inches.

FIG. 11C show additional specific representative layups corresponding to different embodiments of structural panel 1100 of FIG. 11A.

In layup 1148, first structural layer 1102 and seventh structural layer 1114 are both bamboo structural layers as defined above formed of a plurality of joined bamboo sections and having a vertical grain orientation, with the hard cortex surfaces of the joined bamboo sections facing away from the neutral plane. Second structural layer 1104, fourth structural layer 1108, and sixth structural layer 1112 are all non-bamboo structural layers comprising dimensional lumber and having a horizontal grain orientation. Third structural layer 1106 and fifth structural layer 1110 are both bamboo structural layers as defined above formed of a plurality of joined bamboo sections and having a vertical grain orientation, with the hard cortex surfaces of the joined bamboo sections facing toward the neutral plane. The first structural layer 1102, third structural layer 1106, fifth structural layer 1110, and seventh structural layer 1114 have a common thickness, e.g., 1.25 inches. Second structural layer 1104, fourth structural layer 1108, and sixth structural layer 1112 have a common thickness, e.g., 1.375 inches. Advantageously, in the event a fire compromises two outer structural layers on one side of the neutral plane, a five-layer structural panel remains with a bamboo structural layer disposed on both sides of the neutral plane.

In layup 1150, first structural layer 1102 and seventh structural layer 1114 are both bamboo structural layers as defined above formed of a plurality of joined bamboo sections and having a vertical grain orientation, with the hard cortex surfaces of the joined bamboo sections facing away from the neutral plane. Second structural layer 1104, fourth structural layer 1108, and sixth structural layer 1112 are all non-bamboo structural layers (excluding dimensional lumber having thickness greater than or equal to about 0.625 inches) and having a horizontal grain orientation. Third structural layer 1106 and fifth structural layer 1110 are both bamboo structural layers as defined above formed of a plurality of joined bamboo sections and having a vertical grain orientation, with the hard cortex surfaces of the joined bamboo sections facing toward the neutral plane. The first structural layer 1102, third structural layer 1106, fifth structural layer 1110, and seventh structural layer 1114 have a common thickness, e.g., 0.21875 inches. Second structural layer 1104, fourth structural layer 1108, and sixth structural layer 1112 have a common thickness, e.g., 0.125 inches.

In layup 1152, first structural layer 1102 and seventh structural layer 1114 are non-bamboo structural layers (excluding dimensional lumber having thickness greater than or equal to about 0.625 inches) having a vertical grain orientation. Second structural layer 1104 and sixth structural layer 1112 are bamboo structural layers as defined above formed of a plurality of joined bamboo sections and having a vertical grain orientation, with the hard cortex surfaces of the joined bamboo sections facing away from the neutral plane. Third structural layer 1106 and fifth structural layer 1110 are both bamboo structural layers as defined above formed of a plurality of joined bamboo sections and having a skewed grain orientation, with the hard cortex surfaces of the joined bamboo sections facing away from the neutral plane. Fourth structural layer 1108 is a non-bamboo structural layer (excluding dimensional lumber having thickness greater than or equal to about 0.625 inches) having a horizontal grain orientation. In some embodiments, first structural layer 1102, fourth structural layer 1108, seventh structural layer 1114 have a common thickness, e.g., 0.125 inches. In some embodiments, second structural layer 1104, third structural layer 1106, fifth structural layer 1110, and sixth structural layer 1112 have a common thickness, e.g., 0.21875 inches.

In layup 1154, first structural layer 1102 and seventh structural layer 1114 are non-bamboo structural layers (excluding dimensional lumber having thickness greater than or equal to about 0.625 inches) having a vertical grain orientation. Second structural layer 1104 and sixth structural layer 1112 are bamboo structural layers as defined above formed of a plurality of joined bamboo sections and having a vertical grain orientation, with the hard cortex surfaces of the joined bamboo sections facing away from the neutral plane. Third structural layer 1106 and fifth structural layer 1110 are non-bamboo structural layers (excluding dimensional lumber having thickness greater than or equal to about 0.625 inches) having a horizontal grain orientation. Fourth structural layer 1108 is a non-bamboo structural layer (excluding dimensional lumber having thickness greater than or equal to about 0.625 inches) having a vertical grain orientation. In some embodiments, first structural layer 1102, third structural layer 1106, fourth structural layer 1108, fifth structural layer 1110, and seventh structural layer 1114 have a common thickness, e.g., 0.125 inches. In some embodiments, second structural layer 1104 and sixth structural layer 1112 have a common thickness, e.g., 0.3125 inches.

In layup 1156, first structural layer 1102, fourth structural layer 1108, and seventh structural layer 1114 are non-bamboo structural layers (excluding dimensional lumber having thickness greater than or equal to about 0.625 inches) having a horizontal grain orientation. Second structural layer 1104 and sixth structural layer 1112 are bamboo structural layers formed of a plurality of joined bamboo sections and having a vertical grain orientation, with the hard cortex surfaces of the joined bamboo sections facing away from the neutral plane. Third structural layer 1106 and fifth structural layer 1110 are also bamboo structural layers formed of a plurality of joined bamboo sections, but have a skewed grain orientation, with the hard cortex surfaces of the joined bamboo sections facing toward the neutral plane. In some embodiments, first structural layer 1102, fourth structural layer 1108, and seventh structural layer 1114 have a common thickness, e.g., 0.125 inches, and second structural layer 1104, third structural layer 1106, fifth structural layer 1110, and sixth structural layer 1112 have a common thickness, e.g., 0.21875 inches.

In layup 1158, first structural layer 1102, fourth structural layer 1108, and seventh structural layer 1114 are non-bamboo structural layers (excluding dimensional lumber having thickness greater than or equal to about 0.625 inches) having a horizontal grain orientation. Second structural layer 1104 and sixth structural layer 1112 are bamboo structural layers formed of a plurality of joined bamboo sections and having a vertical grain orientation, with the hard cortex surfaces of the joined bamboo sections facing away from the neutral plane. Third structural layer 1106 and fifth structural layer 1110 are also bamboo structural layers formed of a plurality of joined bamboo sections, but have a skewed grain orientation, with the hard cortex surfaces of the joined bamboo sections facing away from the neutral plane. In some embodiments, first structural layer 1102, fourth structural layer 1108, and seventh structural layer 1114 have a common thickness, e.g., 0.125 inches, and second structural layer 1104, third structural layer 1106, fifth structural layer 1110, and sixth structural layer 1112 have a common thickness, e.g., 0.21875 inches.

In layup 1160, first structural layer 1102 and seventh structural layer 1114 are non-bamboo structural layers (excluding dimensional lumber having thickness greater than or equal to about 0.625 inches) having a vertical grain orientation. Second structural layer 1104 and sixth structural layer 1112 are bamboo structural layers formed of a plurality of joined bamboo sections and having a vertical grain orientation, with the hard cortex surfaces of the joined bamboo sections facing away from the neutral plane. Third structural layer 1106 and fifth structural layer 1110 are non-bamboo structural layers (excluding dimensional lumber having thickness greater than or equal to about 0.625 inches) having a horizontal grain orientation. Fourth structural layer 1108 is a bamboo structural layer formed of a plurality of bamboo sections and having a horizontal grain orientation, with the hard cortex surfaces of the joined bamboo sections facing toward the neutral plane. Since the neutral plane passes through fourth structural layer 1108, in some embodiments, approximately half of the joined bamboo sections face a first direction with the hard cortex surface facing toward the neutral plane, and approximately half of the joined bamboo sections face a second direction with the hard cortex surface facing toward the neutral plane.

In layup 1162, first structural layer 1102, fourth structural layer 1108, and seventh structural layer 1114 are non-bamboo structural layers (excluding dimensional lumber having thickness greater than or equal to about 0.625 inches) having a vertical grain orientation. Second structural layer 1104 and sixth structural layer 1112 are bamboo structural layers formed of a plurality of joined bamboo sections and having a vertical grain orientation, with the hard cortex surfaces of the joined bamboo sections facing away from the neutral plane. Third structural layer 1106 and fifth structural layer 1110 are also bamboo structural layers formed of a plurality of joined bamboo sections, but have a horizontal grain orientation, with the hard cortex surfaces of the joined bamboo sections facing toward the neutral plane. In some embodiments, first structural layer 1102, fourth structural layer 1108, and seventh structural layer 1114 have a common thickness, e.g., 0.125 inches, and second structural layer 1104, third structural layer 1106, fifth structural layer 1110, and sixth structural layer 1112 have a common thickness, e.g., 0.21875 inches.

Figures 12A, 12B:
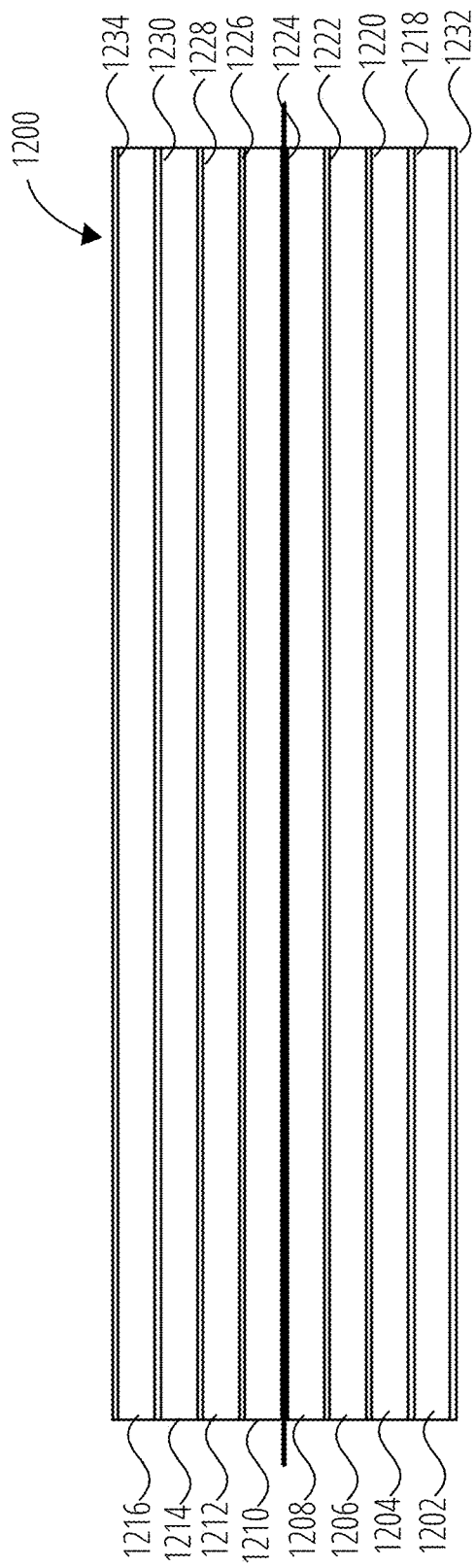
FIG. 12A illustrates a schematic section view of an eight structural layer structural panel according to the present disclosure.
FIG. 12B is a diagram of representative layups of the structural panel of FIG. 12A, according to the present disclosure.

FIG. 12A shows an eight-structural layer structural panel 1200 having a first structural layer 1202, a second structural layer 1204, a third structural layer 1206, a fourth structural layer 1208, a fifth structural layer 1210, a sixth structural layer 1212, a seventh structural layer 1214, and an eighth structural layer 1216, which are adhesively joined together by adhesive layers 1218, 1220, 1222, 1224, 1226, 1228, and 1230, and having optional non-structural layers 1232, 1234. As described below, structural panel 1200 may be configured with any of the layups described with respect to FIG. 12B.

FIG. 12B shows specific representative layups corresponding to different embodiments of structural panel 1200 of FIG. 12A. It shall be appreciated that the present disclosure is not limited the specific layups described below. In embodiments of any of the layups described below, one or both of non-structural layers 1232, 1234 is a barrier layer as defined above. In embodiments of any of the layups described below, one or both of non-structural layers 1232, 1234 is a finish layer as defined above. In embodiments of any of the layups described below, one of non-structural layers 1232, 1234 is a barrier layer and the other of one of non-structural layers 1232, 1234 is a finish layer.

In layup 1236, first structural layer 1202 and eighth structural layer 1216 are non-bamboo structural layers (excluding dimensional lumber having thickness greater than or equal to about 0.625 inches) having a vertical grain orientation. Second structural layer 1204 and seventh structural layer 1214 are bamboo structural layers formed of a plurality of joined bamboo sections and having a vertical grain orientation, with the hard cortex surfaces of the joined bamboo sections facing away from the neutral plane. Third structural layer 1206 and sixth structural layer 1212 are bamboo structural layers formed of a plurality of joined bamboo sections and having a skewed grain orientation, with the hard cortex surfaces of the joined bamboo sections facing away from the neutral plane. Fourth structural layer 1208 and fifth structural layer 1210 are non-bamboo structural layers (excluding dimensional lumber having thickness greater than or equal to about 0.625 inches) having a horizontal grain orientation. In some embodiments, first structural layer 1202, fourth structural layer 1208, fifth structural layer 1210, and eighth structural layer 1216 have a common thickness, e.g., 0.125 inches, and second structural layer 1204, third structural layer 1206, sixth structural layer 1212, and seventh structural layer 1214 have a common thickness, e.g., 0.1875 inches.

In layup 1238, first structural layer 1202, fourth structural layer 1208, fifth structural layer 1210, and eighth structural layer 1216 are non-bamboo structural layers (excluding dimensional lumber having thickness greater than or equal to about 0.625 inches) having a vertical grain orientation. Second structural layer 1204 and seventh structural layer 1214 are bamboo structural layers formed of a plurality of joined bamboo sections and having a vertical grain orientation, with the hard cortex surfaces of the joined bamboo sections facing away from the neutral plane. Third structural layer 1206 and sixth structural layer 1212 are bamboo structural layers formed of a plurality of joined bamboo sections and having a horizontal grain orientation, with the hard cortex surfaces of the joined bamboo sections facing toward the neutral plane. Fourth structural layer 1208 and fifth structural layer 1210 are non-bamboo structural layers (excluding dimensional lumber having thickness greater than or equal to about 0.625 inches) having a horizontal grain orientation. In some embodiments, first structural layer 1202, fourth structural layer 1208, fifth structural layer 1210, and eighth structural layer 1216 have a common thickness, e.g., 0.125 inches, and second structural layer 1204, third structural layer 1206, sixth structural layer 1212, and seventh structural layer 1214 have a common thickness, e.g., 0.1875 inches.

Figure 13A:
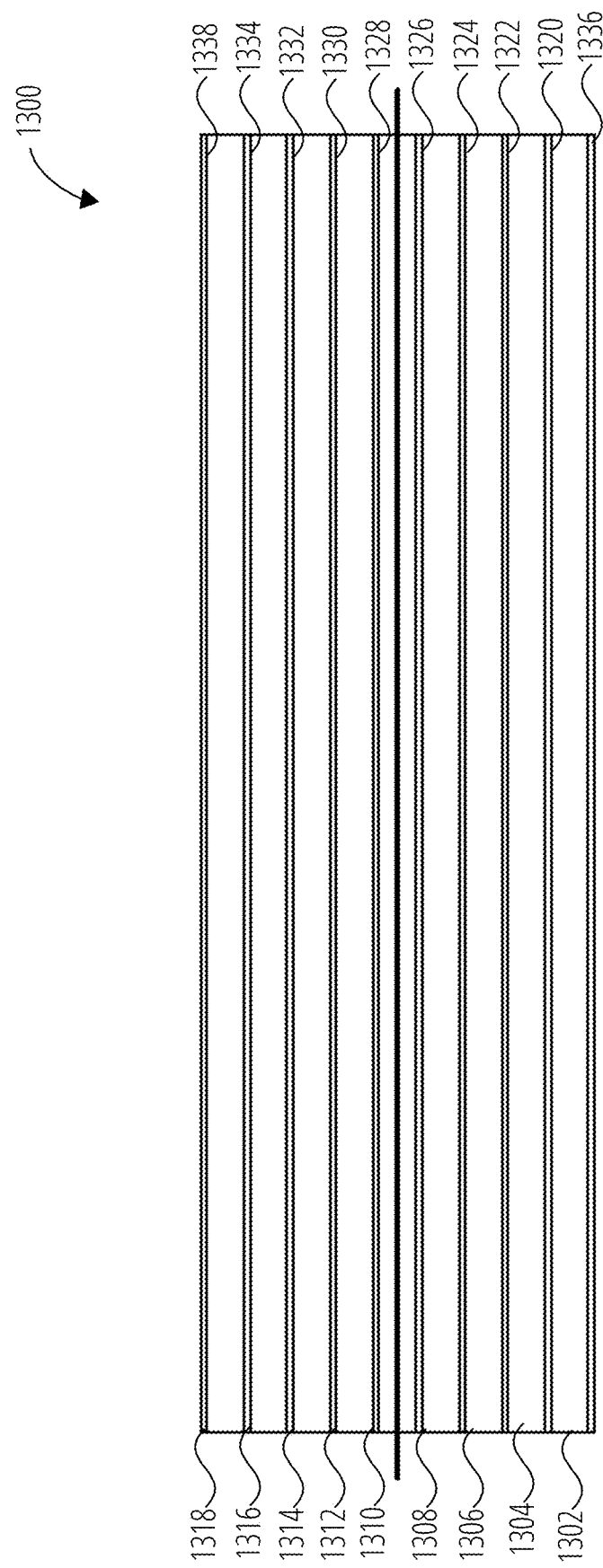
FIG. 13A illustrates a schematic section view of a nine structural layer structural panel according to the present disclosure.

FIG. 13A shows a nine-structural layer structural panel 1300 having a first structural layer 1302, a second structural layer 1304, a third structural layer 1306, a fourth structural layer 1308, a fifth structural layer 1310, a sixth structural layer 1312, a seventh structural layer 1314, an eighth structural layer 1316, and a ninth structural layer 1318 which are adhesively joined together by adhesive layers 1320, 1322, 1324, 1326, 1328, 1330, 1332, and 1334, and having optional non-structural layers 1336, 1338. As described below, structural panel 1300 may be configured with any of the layups described with respect to FIG. 13B.

FIG. 13B shows specific representative layups corresponding to different embodiments of structural panel 1300 of FIG. 13A. It shall be appreciated that the present disclosure is not limited the specific layups described below. In embodiments of any of the layups described below, one or both of non-structural layers 1336, 1338 is a barrier layer as defined above. In embodiments of any of the layups described below, one or both of non-structural layers 1336, 1338 is a finish layer as defined above. In embodiments of any of the layups described below, one of non-structural layers 1336, 1338 is a barrier layer and the other of one of non-structural layers 1336, 1338 is a finish layer.

In layups 1340, 1342, 1344, and 1346, first structural layer 1302 and ninth structural layer 1318 are bamboo structural layers formed of a plurality of joined bamboo sections and having a vertical grain orientation, with the hard cortex surfaces of the joined bamboo sections facing away from the neutral plane. Second structural layer 1304, third structural layer 1306, fourth structural layer 1308, fifth structural layer 1310, sixth structural layer 1312, seventh structural layer 1314, and eighth structural layer 1316 are non-bamboo structural layers (excluding dimensional lumber having thickness greater than or equal to about 0.625 inches) having alternating grain orientations. Restated, second structural layer 1304, fourth structural layer 1308, sixth structural layer 1312, and eighth structural layer 1316 have a vertical grain orientation, and third structural layer 1306, fifth structural layer 1310, and seventh structural layer 1314 have a horizontal grain orientation. In some embodiments, first structural layer 1302 and ninth structural layer 1318 have a common thickness, e.g., 0.25 inches, 0.1875 inches, or 0.3125 inches, and second structural layer 1304, third structural layer 1306, fourth structural layer 1308, fifth structural layer 1310, sixth structural layer 1312, seventh structural layer 1314, and eighth structural layer 1316 have a common thickness, e.g., 0.09 inches, 0.10 inches, 0.11 inches, or 0.125 inches.

In layup 1348, first structural layer 1302 and ninth structural layer 1318 are non-bamboo structural layers (excluding dimensional lumber having thickness greater than or equal to about 0.625 inches) having a horizontal grain orientation. Second structural layer 1304 and eighth structural layer 1316 are bamboo structural layers formed of a plurality of joined bamboo sections and having a vertical grain orientation, with the hard cortex surfaces of the joined bamboo sections facing away from the neutral plane. Third structural layer 1306, fifth structural layer 1310, and seventh structural layer 1314 are non-bamboo structural layers (excluding dimensional lumber having thickness greater than or equal to about 0.625 inches) having a horizontal grain orientation. Fourth structural layer 1308 and sixth structural layer 1312 are also non-bamboo structural layers (excluding dimensional lumber having thickness greater than or equal to about 0.625 inches), but with a vertical grain orientation. In some embodiments, first structural layer 1302 and ninth structural layer 1318 have a common thickness, e.g., 0.0625 inches, second structural layer 1304, fifth structural layer 1310, and eighth structural layer 1316 have a common thickness, e.g., 0.25 inches, and third structural layer 1306, fourth structural layer 1308, sixth structural layer 1312, and seventh structural layer 1314 have a common thickness, e.g., 0.125 inches.

In layup 1350, first structural layer 1302 and ninth structural layer 1318 are bamboo structural layers formed of a plurality of joined bamboo sections and having a vertical grain orientation, with the hard cortex surfaces of the joined bamboo sections facing away from the neutral plane. Second structural layer 1304, fourth structural layer 1308, sixth structural layer 1312, and eighth structural layer 1316 are non-bamboo structural layers comprising dimensional lumber and having a horizontal grain orientation. Third structural layer 1306, fifth structural layer 1310, and seventh structural layer 1314 are also non-bamboo structural layers comprising dimensional lumber, but with a vertical grain orientation. In some embodiments, first structural layer 1302 and ninth structural layer 1318 have a common thickness, e.g., 1.25 inches, and second structural layer 1304, third structural layer 1306, fourth structural layer 1308, fifth structural layer 1310, sixth structural layer 1312, seventh structural layer 1314, and eighth structural layer 1316 have a common thickness, e.g., 1.375 inches.

Thus, the present disclosure provides numerous bamboo-hybrid structural panels comprising a plurality of bamboo structural layers spaced apart from the neutral plane. Additional representative layups are provided herewith as an Appendix to the present disclosure.

Structural Sections

Any of the structural panels provided herein can be integrated into structural sections, including wall sections, floor sections, roof sections, and additional structural sections. Advantageously, incorporation of one or more such innovative structural panels into a structural section contributes to unexpected and unobvious performance improvements over known structural section, as described below with respect to FIG. 20A-FIG. 22B. A plurality of the structural sections may be positioned adjacently (e.g., with half lap connections) to form a complete wall, floor, or ceiling of a structure.

FIG. 14A-FIG. 17A provide representative structural sections. Some structural sections include one of the structural panels above; while some structural sections include two or more of the structural panels described above (which may be the same or different). Some structural sections include at least one blocking section, header, and/or footer disposed between structural panels, wherein the blocking section is formed engineered lumber, engineered bamboo, or dimensional lumber such as southern yellow pine, spruce pine fir, douglas fir, whitewood, or the like. Alike terms used to describe different structural sections have alike meanings unless specified otherwise. Features of any of the structural sections provided herein may be combined to produce additional structural sections.

Figures 14A, 14B:
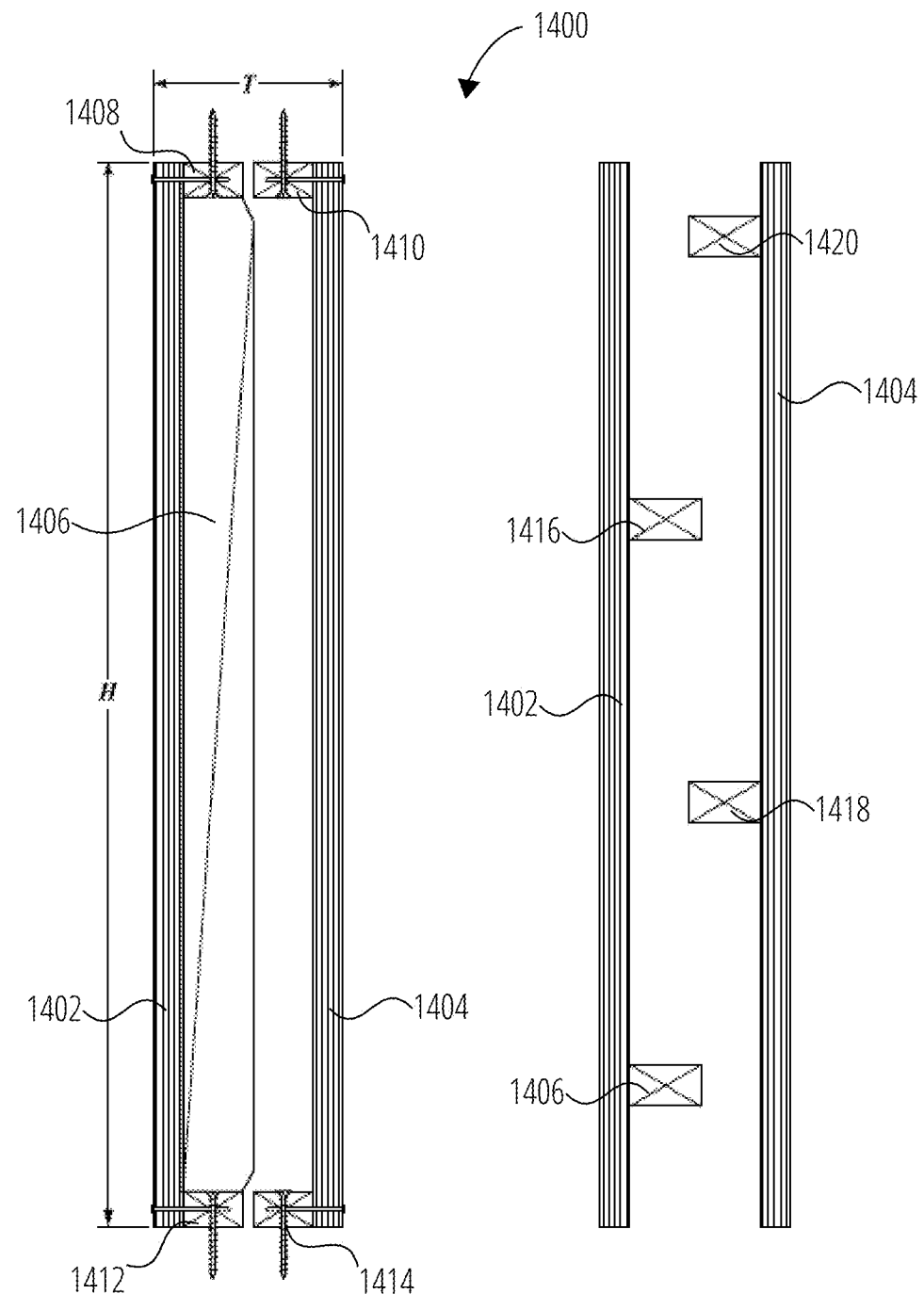
FIG. 14A illustrates an elevation view of a structural section incorporating at least one structural panel, according to the present disclosure.
FIG. 14B illustrates a plan view of the structural section of FIG. 14A.

FIG. 14A and FIG. 14B show elevation and plan views, respectively, of a representative structural section 1400, e.g., a wall section. Although structural section 1400 is characterized as a wall section to facilitate understanding, in some embodiments, structural section 1400 is a roof section, a floor section, or other structural section.

Structural section 1400 has a height H, which corresponds to a length dimension L of the structural panels described above. Structural section 1400 is formed of two spaced apart structural panels 1402, 1404, which form a cavity therebetween and respectively correspond to an exterior-facing structural panel and an interior-facing structural panel. Structural section 1400 has a thickness T, which in some embodiments is 4 inches to 24 inches, 4-12 inches, 4-8 inches, 6-12 inches, 6-10 inches, 6-8 inches, 6 inches, 8 inches, 10 inches, 12 inches, 14 inches, 16 inches, and 18 inches.

At least one of structural panels 1402, 1404 is a structural panel of the present disclosure, including but not limited to the specific layups introduced in FIG. 8A-FIG. 13B. Accordingly, in some embodiments, structural panel 1402 and structural panel 1404 are both structural panels having a common layup of the present disclosure. In some embodiments, structural panel 1402 has a layup provided in the present disclosure, and structural panel 1404 has a different layup provided in the present disclosure. In still other embodiments, one of structural panel 1402 or structural panel 1404 has a layup as provided in the present disclosure, and the other or structural panel 1402 or structural panel 1404 has a different layup which is not provided in the present disclosure.

Headers 1408, 1410 are fastened to structural panels 1402, 1404, respectively, and extend therefrom into the cavity. Headers help contain the cavity formed by the structural panels and provide structure to attach the structural panels 1402, 1404 to other elements of the building structure, e.g., framing, joists, roof sections, etc. In some embodiments, headers 1408, 1410 are formed from dimensional lumber. In the illustrated embodiment, header 1408, header 1410 do not touch each other. Advantageously, this reduces transmission of acoustic energy between structural panel 1402 and structural panel 1404.

Similarly, footers 1412, 1414 are fastened to structural panels 1402, 1404, respectively, and extend therefrom into the cavity. Footers 1412, 1414 may be fastened to the foundation of a building first, thereby providing structure to which the structural panels 1402, 1404 may be fastened. In some embodiments, headers 1408, 1410 are formed from dimensional lumber. In the illustrated embodiment, footers 1412, 1414 do not touch each other in order to reduce transmission of acoustic energy.

Blocking sections 1406, 1418, 1416, and 1420 are joined to one of structural panels 1402, 1404, respectively, extending therefrom into the cavity. Each blocking section imparts additional stiffness and strength to the overall structural section 1400, and may be joined to one of the structural panels 1402, 1404 with a fastener, adhesive, or other joining structure. As shown in FIG. 14A, each blocking section extends from the header to the footer, i.e., full-height blocking. As shown in the plan view of FIG. 14B, blocking sections 1406, 1416 are fastened to structural panel 1402 (e.g., at 24 inch spacing), whereas blocking sections 1418, 1420 are fastened to structural panel 1404 (e.g., at 24 inch spacing). When the two structural panels are placed together, the blocking sections are staggered so as not to contact each other or the opposite structural panel. In some embodiments, the blocking sections are formed of LVL, dimensional lumber, bamboo, or other rigid material.

Figures 15A, 15B:
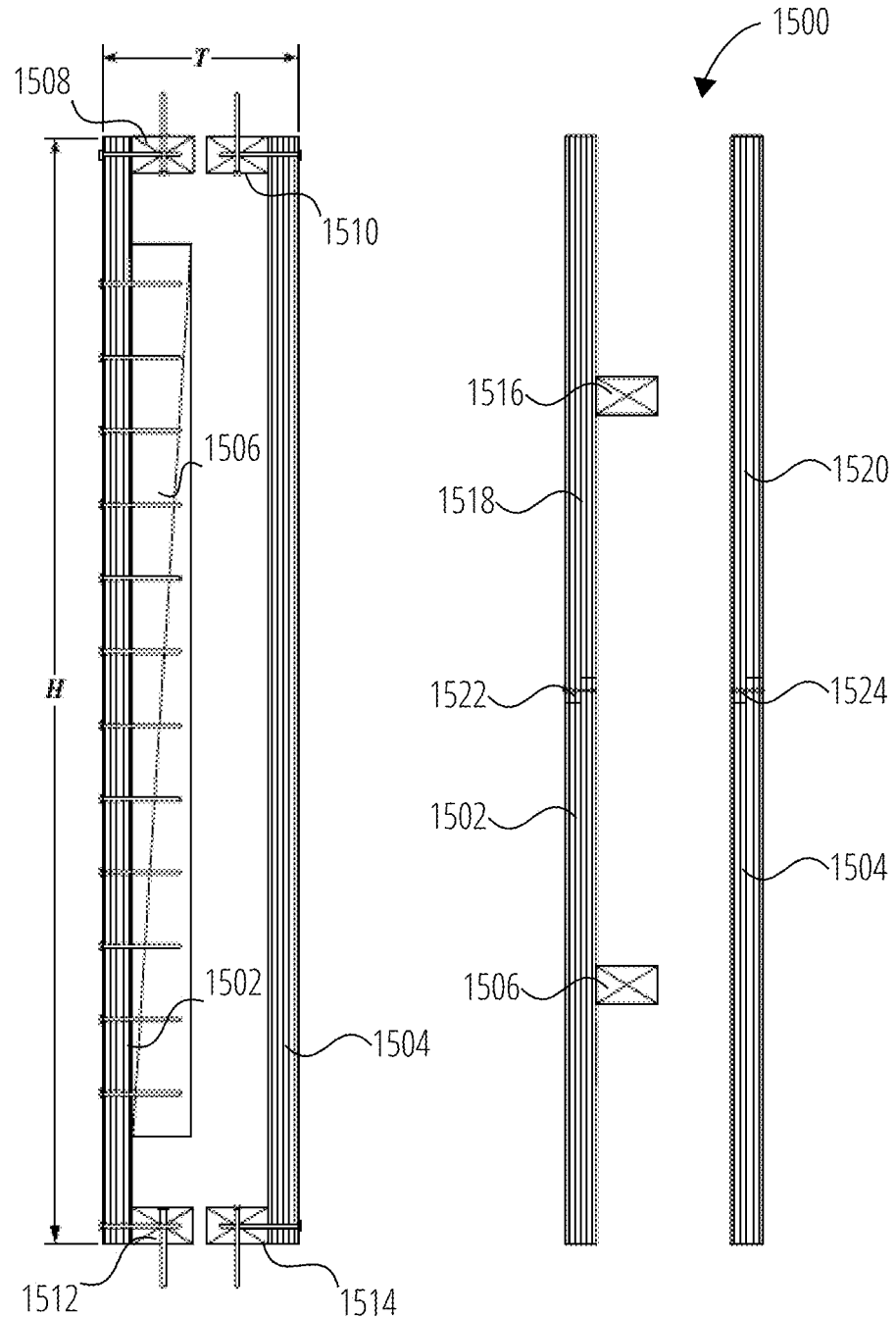
FIG. 15A illustrates an elevation view of another structural section incorporating at least one structural panel, according to the present disclosure.
FIG. 15B illustrates a plan view of the structural section of FIG. 15A.

FIG. 15A and FIG. 15B show elevation and plan views, respectively, of another representative structural panel 1500 comprising four structural panels 1502, 1504, 1518, 1520, any one or more of which may have any of the layups provided herein. As shown, a first side of structural panel 1500 includes structural panel 1502 and structural panel 1518 joined at half lap joint 1522, and a second side of structural panel 1500 includes structural panel 1504 and structural panel 1520 joined at half lap joint 1524. Any of the structural sections described herein may have a plurality of structural panels joined at a joint, such as a half lap joint and/or with one or more fasteners. The headers 1508, 1510 and footers 1512, 1514 are as described above with respect to FIG. 14A and FIG. 14B.

One difference is that blocking section 1506 is a partial height blocking section, i.e., does not extend from the headers to the footers. Restated, blocking section 1506 has a height that is less that the overall height of the structural panel 1500. In some embodiments, blocking section 1506 has a partial height, e.g., 30%-90% of the overall height of the structural panel 1500, e.g., 40%, 50%, 60%, 70, 80%, or 85%. Advantageously, the partial blocking height saves material and weight without significantly compromising structural performance of the structural panel 1500.

Another difference is that the blocking section 1506 is fastened to structural panel 1502 along with blocking section 1516 (e.g., at 60 inch spacing), but structural panel 1504 does not have any blocking sections fastened thereto. Advantageously, this arrangement adds stiffness to one structural panel (e.g., the structural panel corresponding to the exterior wall), without adding unnecessary weight or cost to the other structural panel (e.g., the interior wall).

Figure 16A:
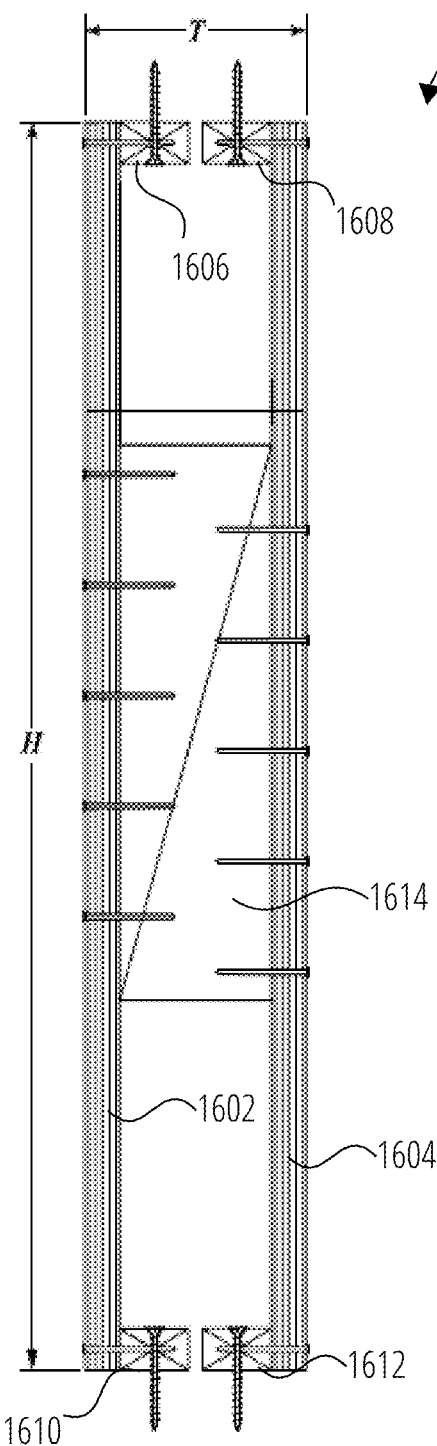
FIG. 16A illustrates an elevation view of another structural section incorporating at least one structural panel, according to the present disclosure.
Figure 16B:
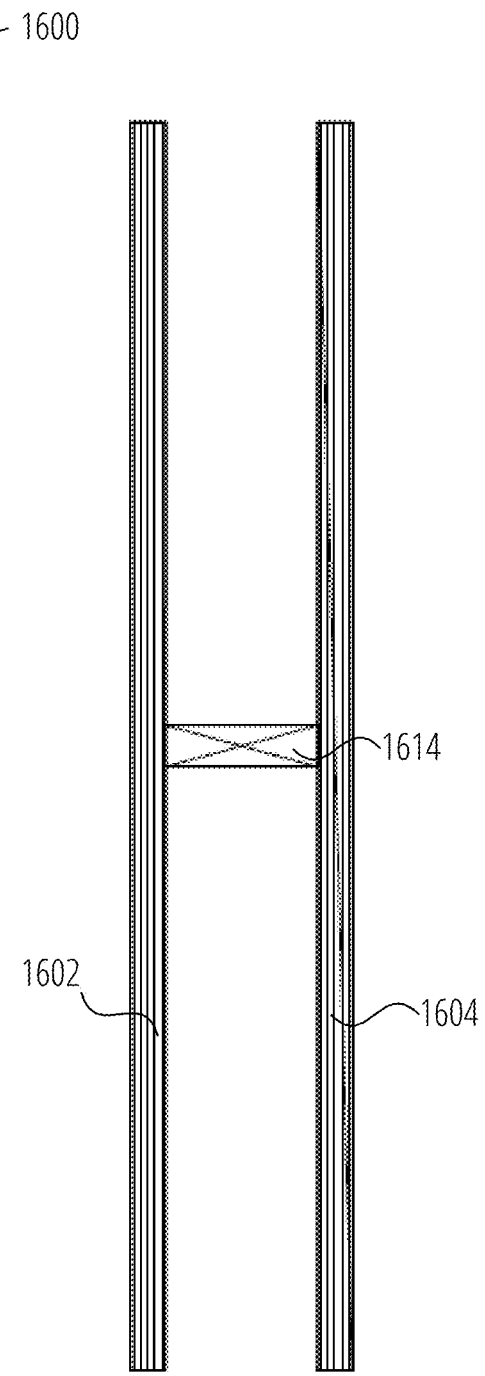
FIG. 16B illustrates a plan view of the structural section of FIG. 16A.

FIG. 16A and FIG. 16B show elevation and plan views, respectively, of another representative structural section 1600 comprising two structural panels 1602, 1604, one or both of which may have any of the layups provided herein. The headers 1606, 1608 and footers 1610, 1612 are as described above with respect to FIG. 14A and FIG. 14B.

One difference of structural section 1600 is that it comprises a single blocking section 1614 (instead of a plurality), which is fastened to both structural panel 1602 and structural panel 1604, and which has a partial height (i.e., it does not extend from the headers to the footers). Advantageously, fastening the blocking section 1614 to both structural panels 1602, 1604 imparts additional stiffness to the structural section 1600. In some embodiments, blocking section 1614 has a height which is 30%-90% of the overall height of the structural section 1600, e.g., 40%, 50%, 60%, or 70%. Advantageously, the partial height of the blocking section 1614, and the singular blocking section 1614, save material and cost.

Figures 17A, 17B:
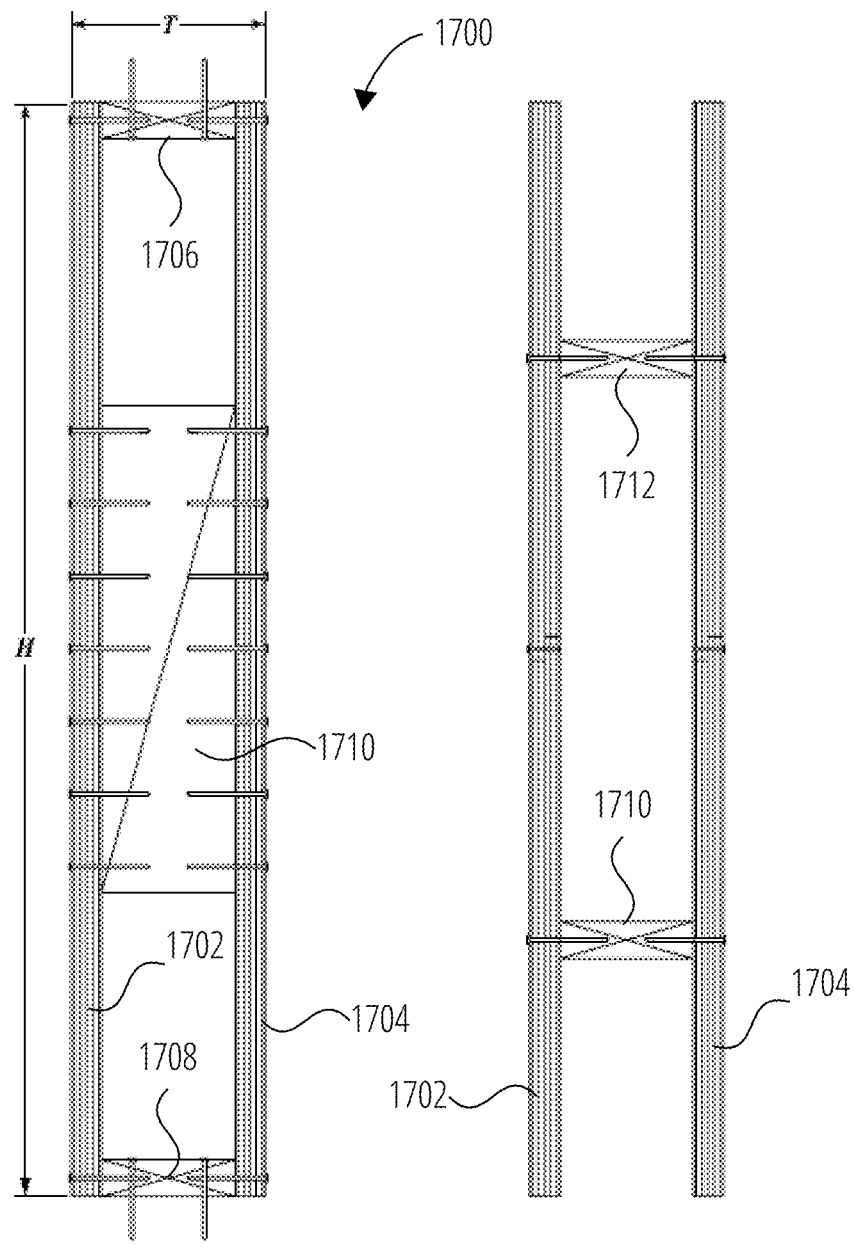
FIG. 17A illustrates an elevation view of another structural section incorporating at least one structural panel, according to the present disclosure.
FIG. 17B illustrates a plan view of the structural section of FIG. 17A.

FIG. 17A and FIG. 17B show elevation and plan views, respectively, of another representative structural section 1700 comprising two structural panels 1702, 1704, one or both of which may have any of the layups provided herein. Blocking section 1710 is as described above with respect to FIG. 16A and FIG. 16B, except that structural section 1700 includes two such blocking sections 1710, e.g., at eight foot spacing. One other difference of structural section 1700 relative to structural section 1600 is that it comprises a header 1706 and a footer 1708, each of which is fastened to both structural panel 1702 and structural panel 1704 (e.g., with two or more nails). Advantageously, this configuration provides improved fire resistance.

Figure 26:
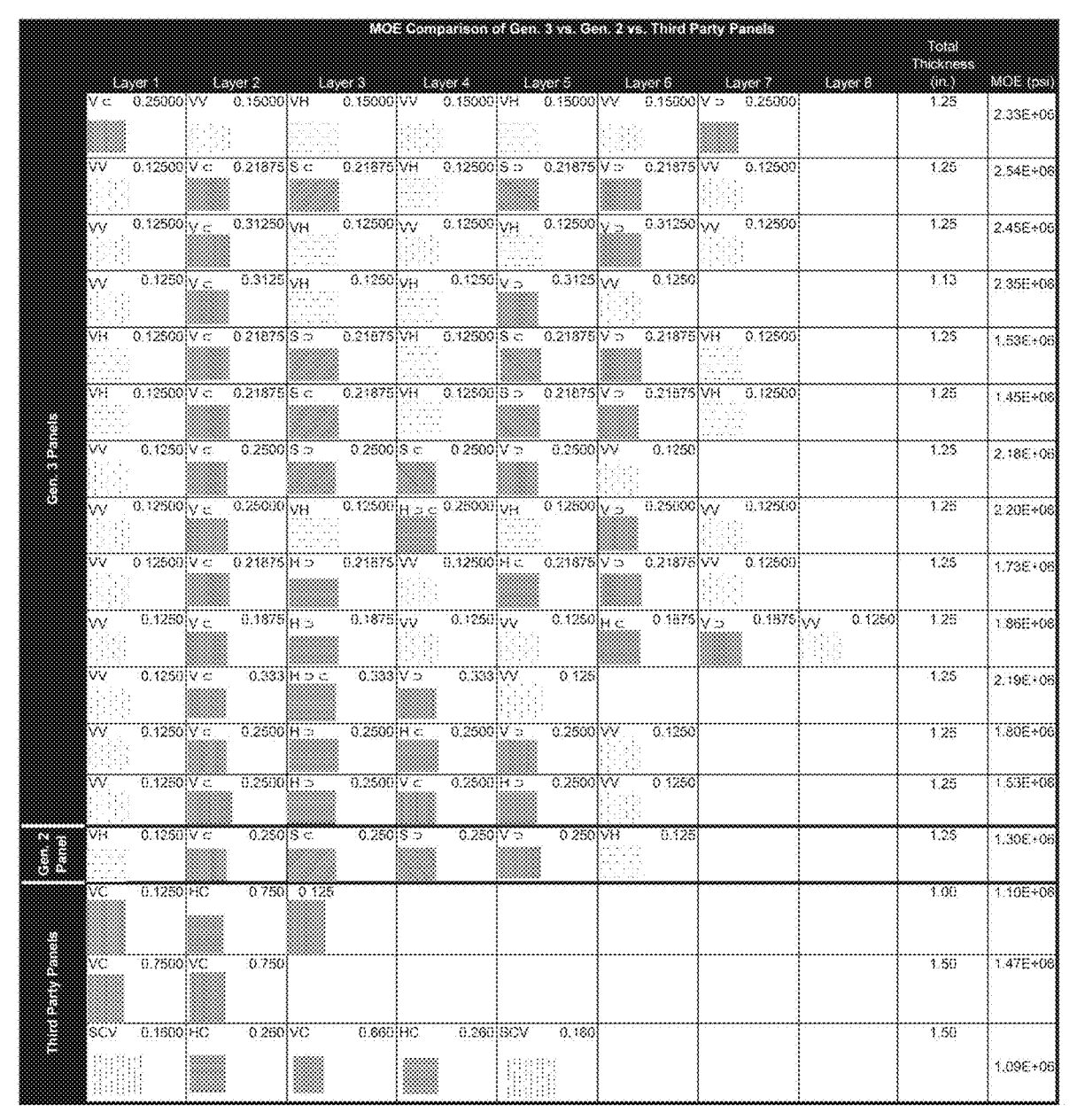

Structural Panel Performance
Gen. 3 Structural Panel Improvements over Gen. 2 Bamboo Hybrid Structural Panels FIG. 26 is a chart comparing Modulus of Elasticity (MOE, in psi) of Gen. 2 bamboo hybrid structural panels, third party structural panels, and representative structural panels of the present disclosure. Note that the three main strength characteristics of structural sections constructed with at least two structural panels (transverse bending strength, transverse bending stiffness, vertical compressive buckling) are all functions of structural panel MOE, and therefore structural sections comprising one or more of the Gen. 3 bamboo-hybrid structural panels described herein exhibit performance improvements over equivalent structural panels comprising Gen. 2 structural panels or third party structural panels. It is further noted that the performance of single-panel structural sections is largely a function of Modulus of Rupture (MOR, expressed in psi herein). Because MOR generally correlates with MOE, high-MOE structural panels generally indicate high MOR, which correlates to high bending strength for single panel structural sections constructed from such layups.

As compared to the Gen. 2.0 and third party panels, the representative Gen. 3 structural panels are significantly stiffer and/or provide comparable stiffness at reduced thickness. This translates to better vertical compressive capacity and transverse stiffness. In addition to greater MOE as compared to the Gen. 2 and third party structural panels, the Gen. 3 panels shown above generally have at least one of the following additional advantages: greater panel to panel half lap connection strength; greater top and bottom connection strength; greater whole panel dimensional stability; greater half lap dimensional stability; can be manufactured to different thicknesses and lengths for more raw material availability; lower cost of materials to manufacture; and easier to manufacture and assemble layers. The advantages of the Gen. 3 structural panels of the present disclosure are at least partially due to having at least a plurality of bamboo structural layers spaced apart on opposite sides of the neutral plane.

FIG. 18A-FIG. 25 compare performance of structural panels of the present disclosure (and structural sections comprising said structural panels) with Gen. 2 and other structural panels/structural sections. In FIG. 18A-FIG. 25, the term "3.4" indicates a Gen. 3 layup as described herein, such as layups 1132, 1136, 1138, and layup 1140. Restated, the term "3.4" generally indicates a Gen. 3 bamboo-hybrid structural panels of the present disclosure having two bamboo structural layers with a vertical grain orientation spaced apart on opposite sides of the neutral plane by at least two non-bamboo structural layers.

Figure 18A:
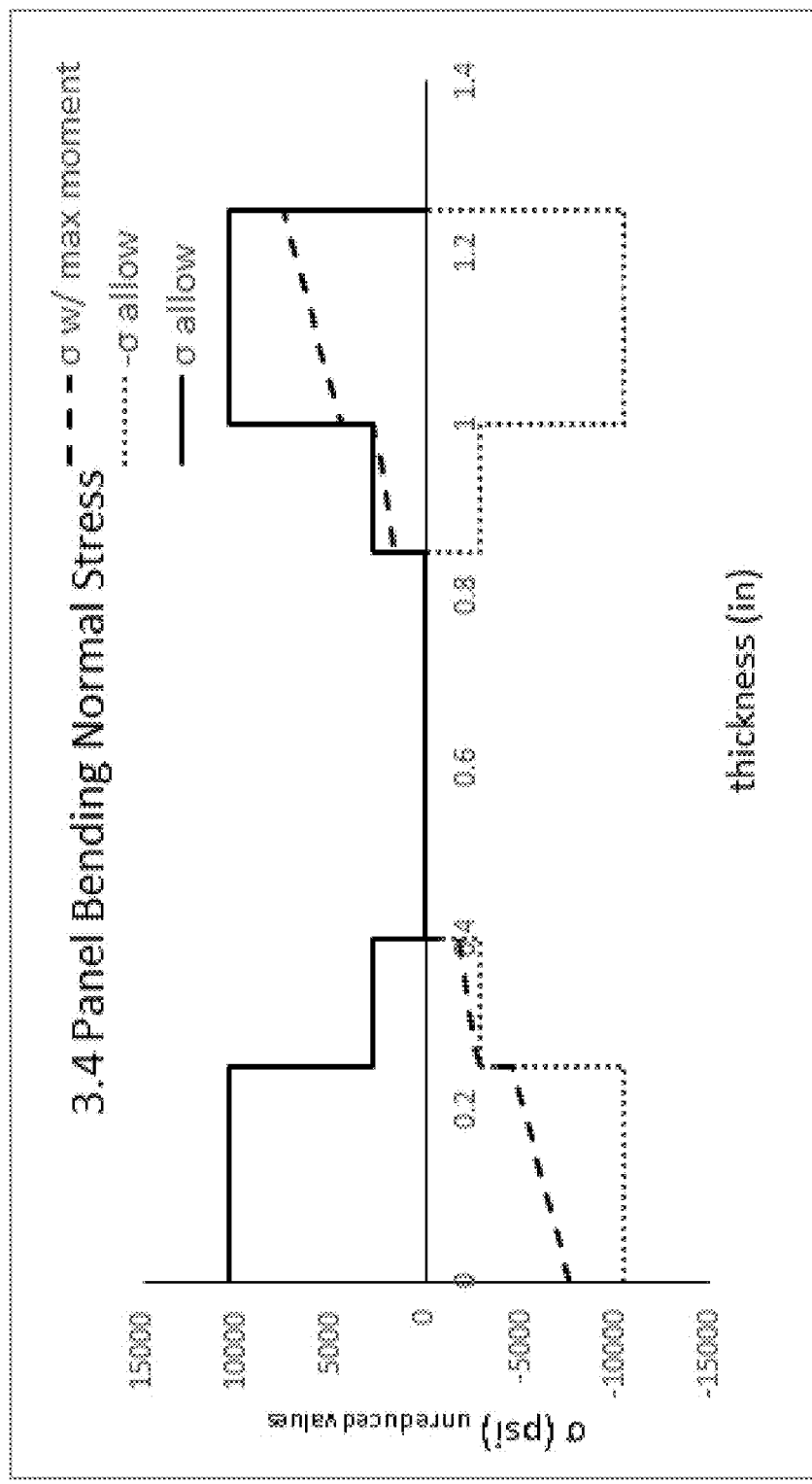
FIG. 18A is a chart showing bending normal stress of a structural panel according to the present disclosure.
Figure 18B:
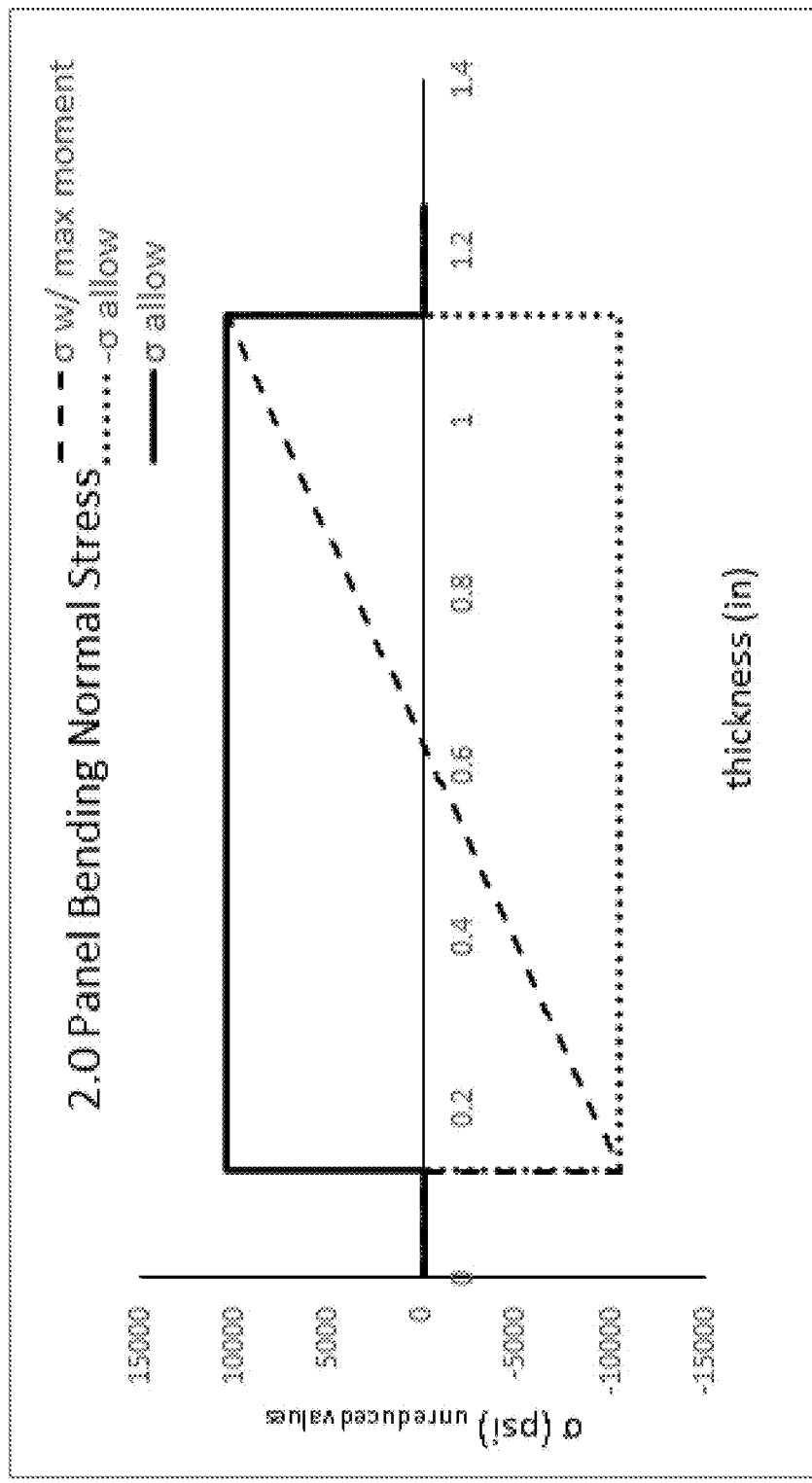
FIG. 18B is a chart showing bending normal stress of a known structural panel.

FIG. 18A shows bending normal stress across a Gen. 3 bamboo hybrid structural panel such as layup 1132. FIG. 18A is generally applicable to Gen. 3 bamboo-hybrid panels of the present disclosure having two bamboo structural layers with a vertical grain orientation spaced apart from the neutral plane by at least two non-bamboo structural layers having a vertical grain orientation. FIG. 18B shows bending normal stress across a Gen. 2 structural panel having the layup shown in Table 1 above. When comparing the panels, layup 1132 adds higher strength and higher stiffness bamboo further away from the panel's neutral plane, increasing both panel stiffness and bending strength.

Panel normal stress at max moment represents how the bending stress is distributed in the structural panel. The Gen. 2 panel (shown in FIG. 18B) has horizontal veneer in the outer 0.125 inches of each face, which has virtually no bending capacity, and therefore max stress is reached closer to the neutral axis, resulting in less bending capacity. By comparison, layup 1132 (of which FIG. 18A is representative) has near maximum stress at the face, allowing for higher bending capacity. The inner layers of layup 1132 can be changed to allow the inner layers and outer layers to reach maximum bending stress at the same bending moment, which allows less expensive, lower strength material to be used in the center with no reduction in bending strength in the structural panel.

This improved bending stress distribution is useful in standalone structural panels and in structural sections constructed from one or more structural panels, for example wall sections with increased composite action between the panels and blocking, or solid assemblies without cavities, which include solid wall sections, floor sections, or roof sections, where the panel will be the strength or stiffness limiting component.

Figure 19A:
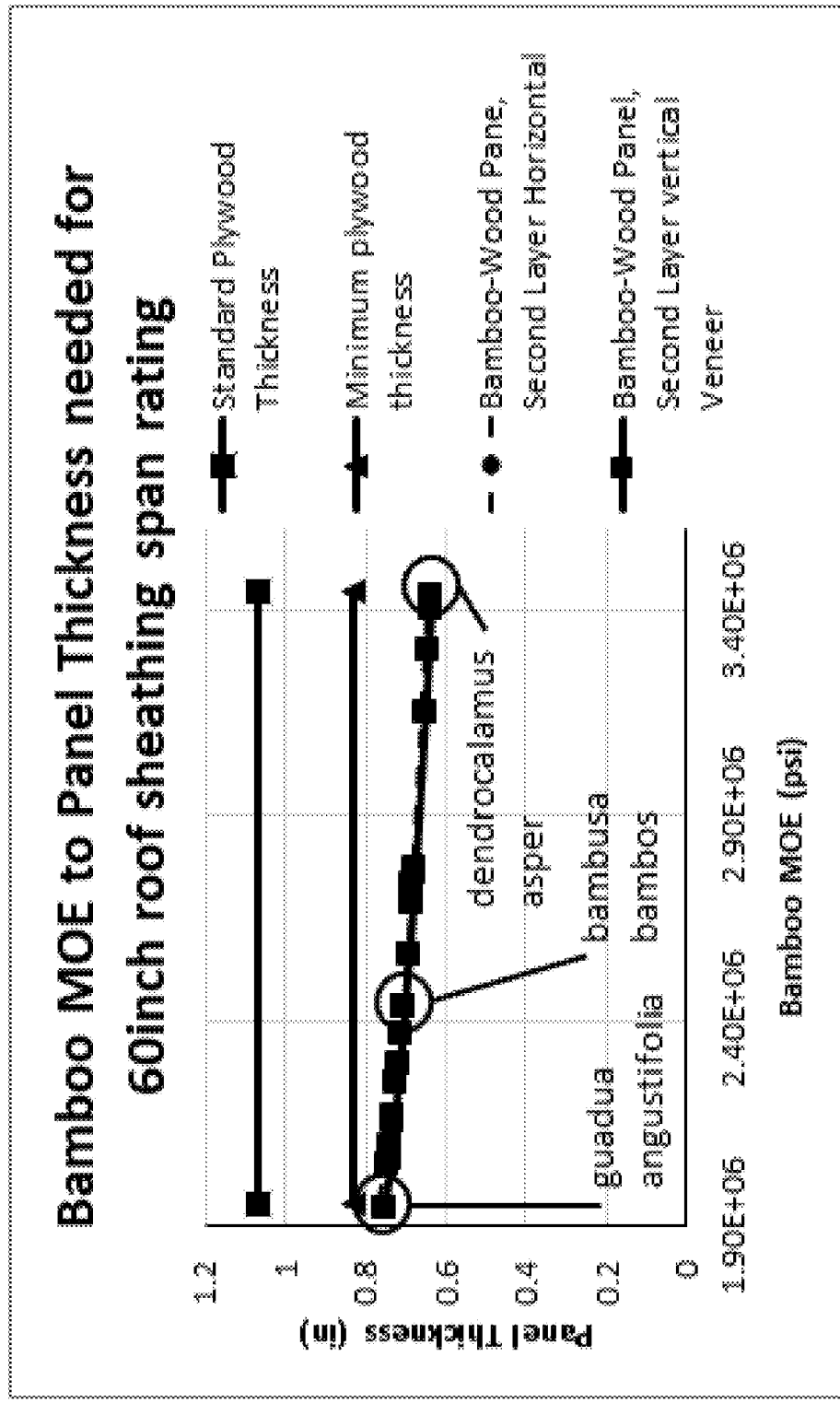
FIG. 19A is a chart comparing bamboo MOE to panel thickness for a 60 inch roof span.
Figure 19B:
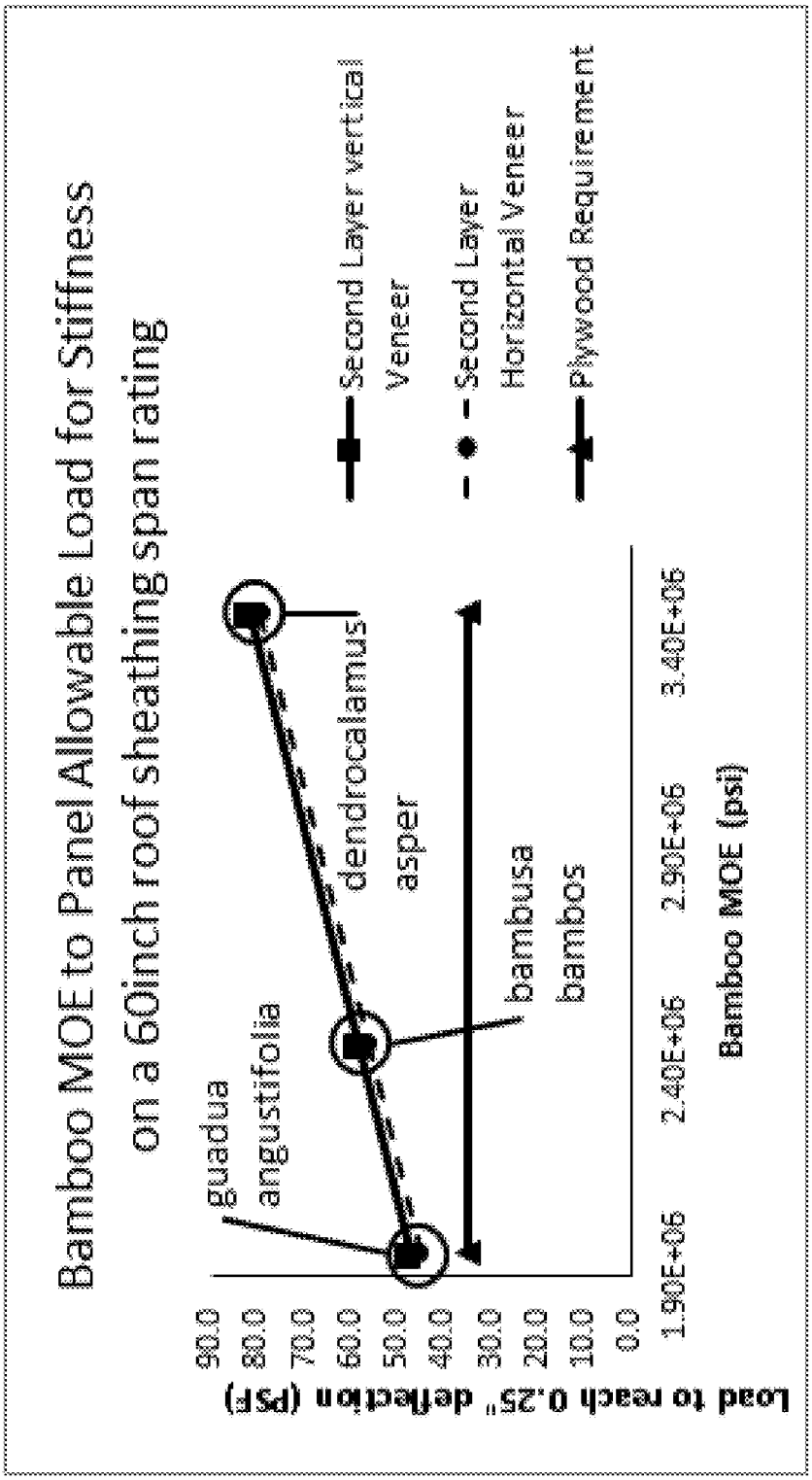
FIG. 19B is a chart comparing bamboo MOE to panel allowable load for a 60 inch roof span.
Figure 19C:
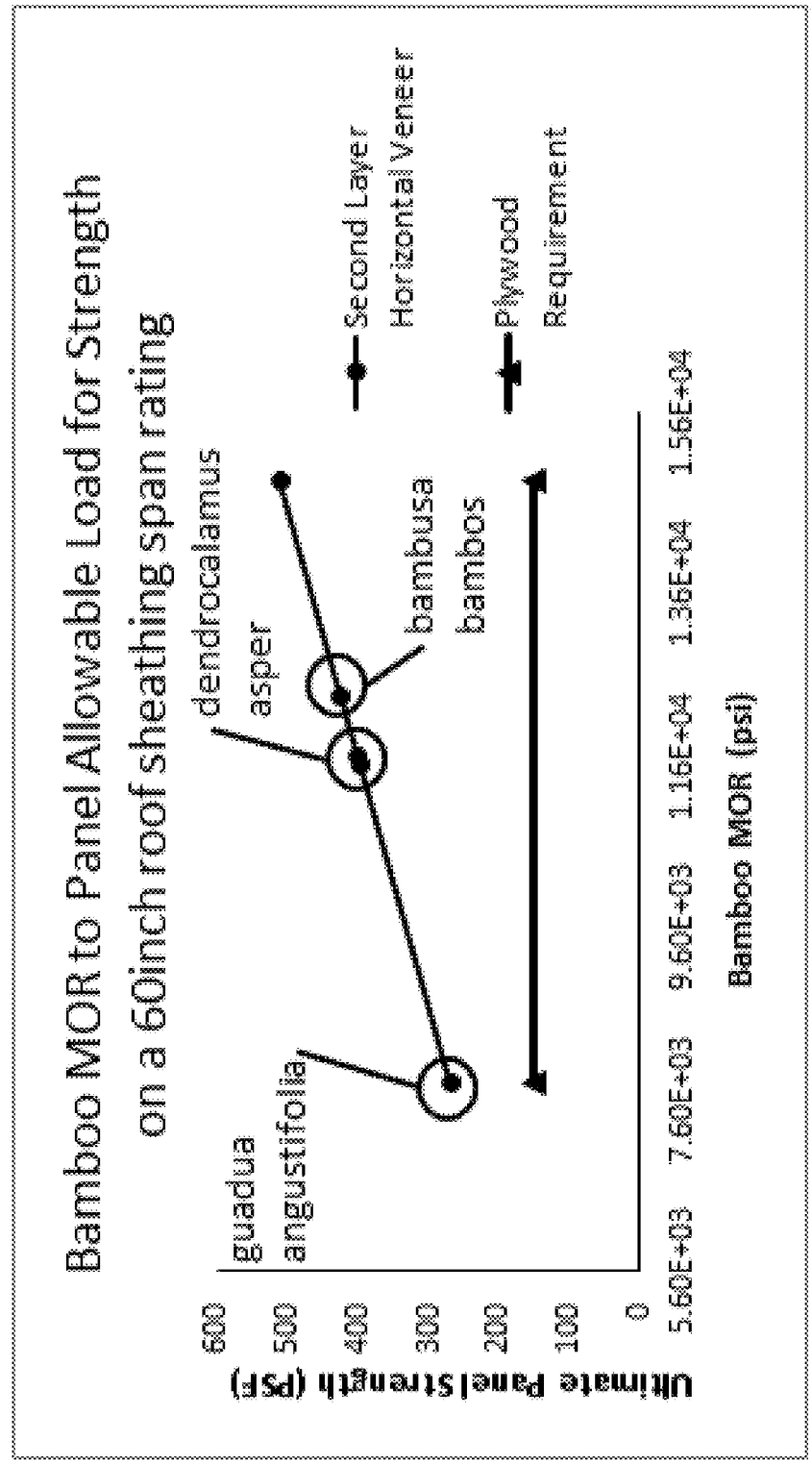
FIG. 19C is a chart comparing bamboo modulus of rupture (MOR) to panel allowable load for a 60 inch roof span.

FIG. 19A-FIG. 19C compare the performance of bamboo-hybrid structural panels of the present disclosure with plywood panels. In particular, FIG. 19A compares MOE to panel thickness for plywood panels and for structural panels of the present disclosure such as layups 924, 926, and 928. FIG. 19B compares MOE to panel allowable load. FIG. 19C compares MOR to panel allowable load.

Plywood needed for 60" spans and that has useable allowable deflection loads is 1.125 inches thick. The Structural Plywood Voluntary Product Standard PS 1-09 only has prescriptive thickness and layer requirements up to span ratings of 48 inches. 60 inch span ratings for roof loads require structural testing, and the standards for 60 inch span ratings on floor loads are not provided. Bending requirements for a 60 inch span rating include 0.25" of deflection at 35 PSF distributed load and an ultimate load capacity higher than 150 PSF.

Most plywood providers do not make 10 foot sheathing, and those who do make 10 foot plywood most do not make 60 inch roof span-rated sheathing. For those who do make it, they are usually 1.125 inches nominal, 1.069 inches minimum thickness, but can be as thin as 0.875 inches nominal, 0.831 inches minimum thickness. Some structural panels of the present disclosure (e.g., structural panels having outermost bamboo structural layers formed of joined bamboo sections with a vertical grain orientation spaced apart from the neutral plane by at least one non-bamboo structural layer) can meet the same requirements with as little as 0.634 inches of thickness, i.e., 76% the thickness of the thinnest possible plywood. And structural panels of the present disclosure having 0.875 inches nominal thickness can reach loads 233% of the loads possible with 0.875 inch nominal plywood. These improvements are possible because of the higher bamboo bending strength and MOE being put on the faces of the panel. Roof loads are often higher than 35 PSF, especially in snow regions or with mechanical units on the roof, so having a higher possible distributed roof load is useful.

High diaphragm shear buildings require blocking under plywood edges. By comparison, structural panels of the present disclosure can utilize half laps for shear capacity to eliminate some or all blocking. Because bamboo is often denser than wood, higher fastener strength can be expected, leading to even higher shear loads.

Holes in conventional sheathing for plumbing, electrical, or HVAC generally needs to be reinforced with blocking spanning between framing members. However, the superior structural properties of the structural panels of the present disclosure enable elimination of these blocks, or a locally-reinforced cut, or a less-reinforced cut. There could be minimum hole sizes with no added reinforcement.

Gen. 3 Structural Panel Improvements over Cross Laminated Timber (CLT)

CLT has a minimum of 3-ply thicknesses, generally 4.125 inches. Advantageously, the structural panels of the present disclosure can be made with much smaller thicknesses than CLT, and with better stiffness and strength to thickness ratios. For a 10 foot span, a structural panel of the present disclosure could be made with 47% of the thickness of standard 3-ply CLT size, and for a 96 inch span a structural panel of the present disclosure could be made with 42% of the thickness of a standard 3-ply CLT size.

Structural Section Performance

Figure 20A:
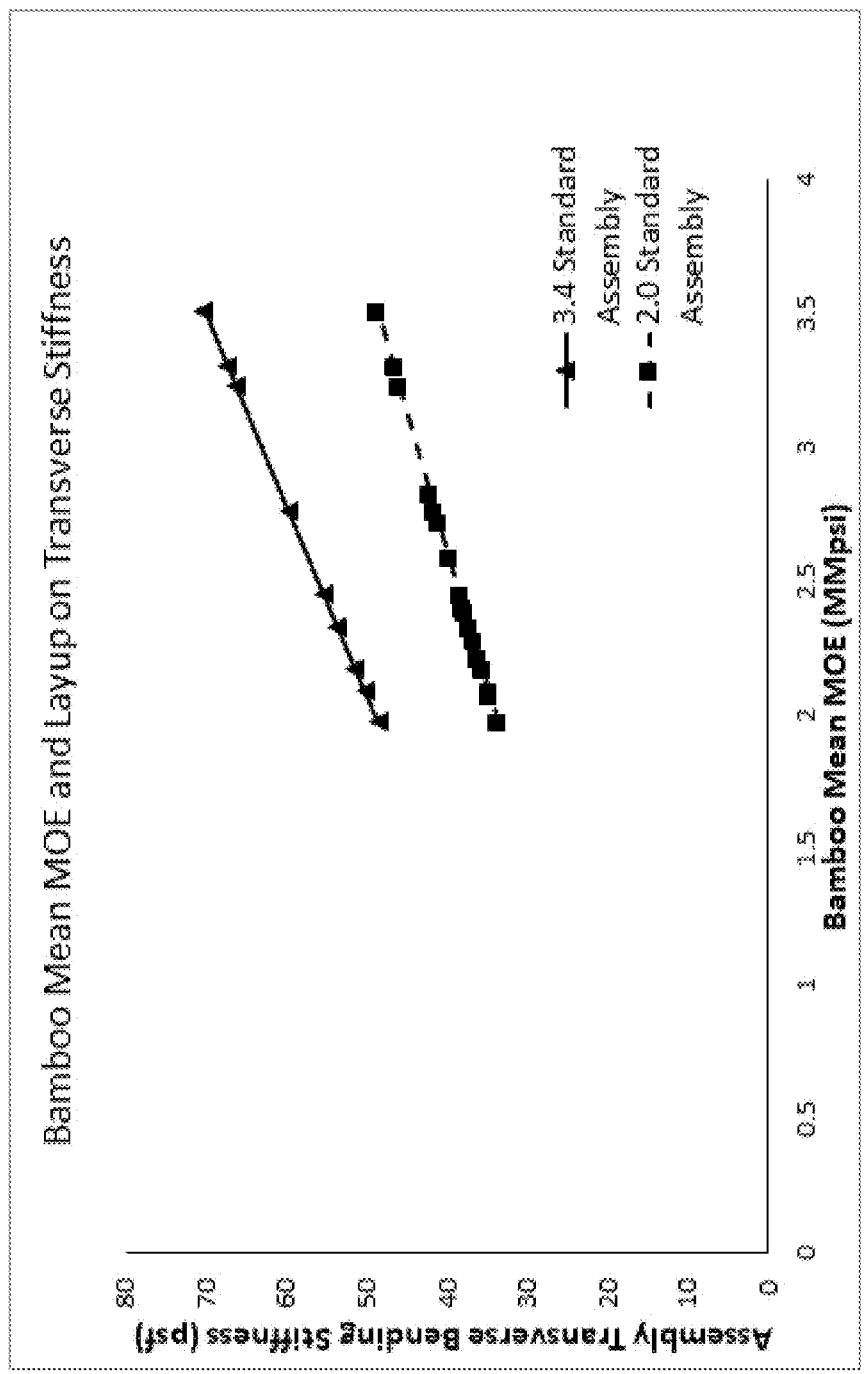
FIG. 20A is a chart comparing bamboo mean modulus of elasticity (MOE) to structural section transverse stiffness.
Figure 20B:
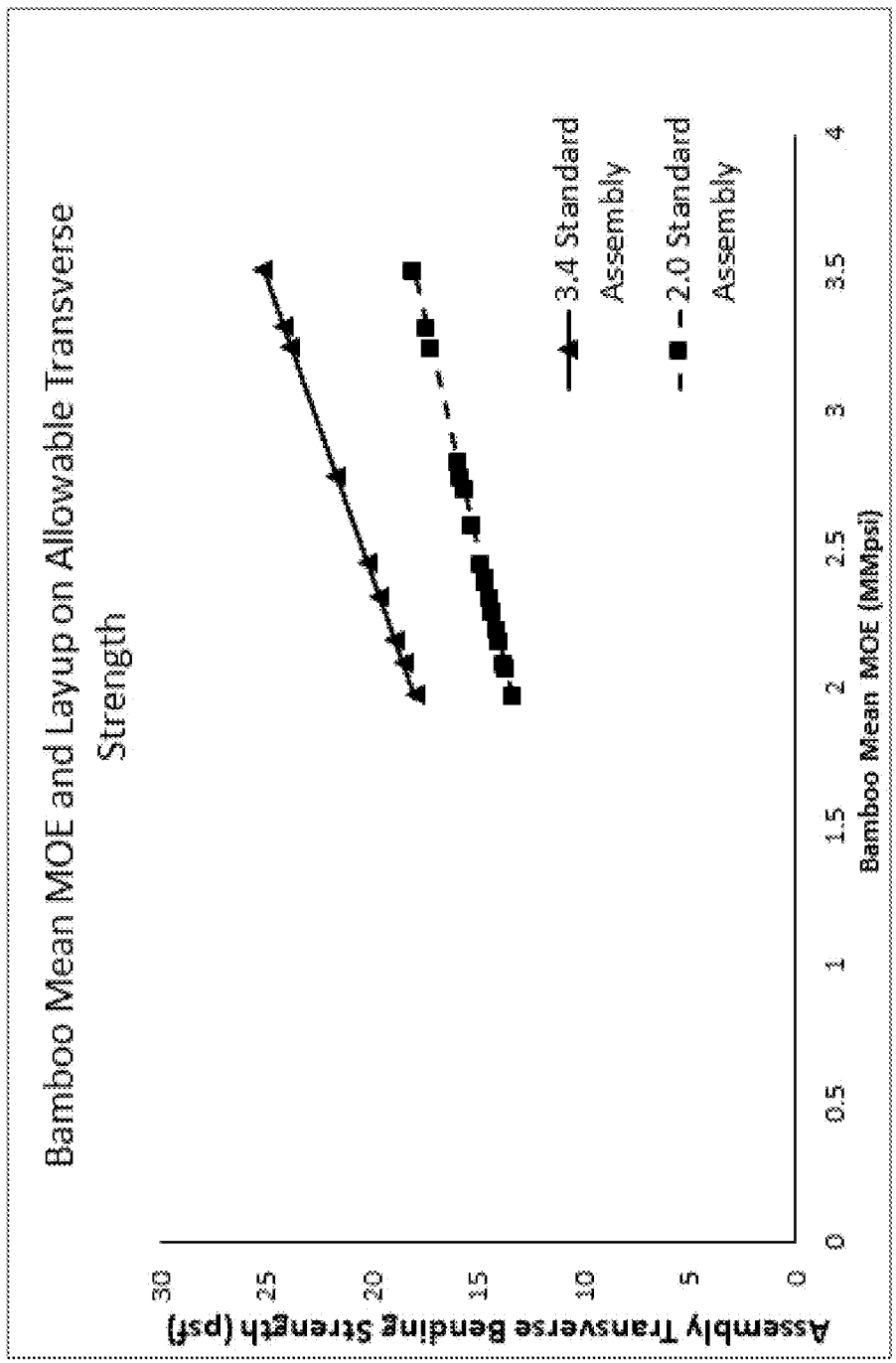
FIG. 20B is a chart comparing bamboo mean MOE to structural section transverse strength.
Figure 20C:
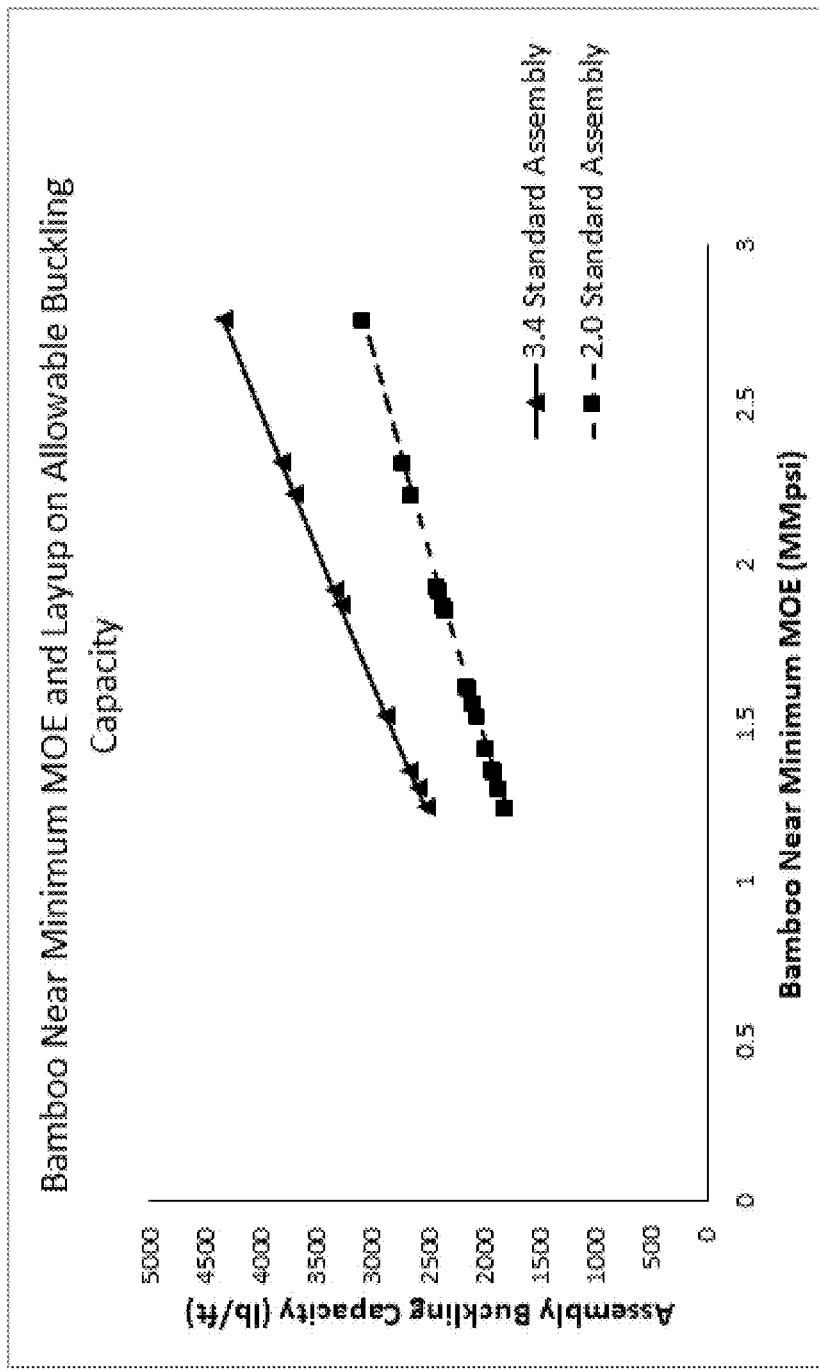
FIG. 20C is a chart comparing bamboo mean MOE to wall assembly allowable buckling capacity.

FIG. 20A-FIG. 20C compare performance of structural sections made with two Gen. 3 bamboo hybrid structural panels of the present disclosure (e.g., as shown in FIG. 14A-FIG. 17B) with alike structural sections made with two Gen. 2 bamboo-hybrid structural panels such as the layup shown in Table 1 above. In FIG. 20A-FIG. 20C, the term "3.4" indicates a Gen. 3 layup as described herein, such as layups 1132, 1136, 1138, and layup 1140. Restated, the results shown in FIG. 20A-FIG. 20C are generally applicable to Gen. 3 bamboo-hybrid panels of the present disclosure having two bamboo structural layers with a vertical grain orientation spaced apart from the neutral plane by at least two non-bamboo structural layers having a vertical grain orientation disposed directly inside the two bamboo structural layers. Similar layups wherein the two bamboo structural layers are spaced apart on opposite sides of the neutral plane by at least two non-bamboo structural layers having a horizontal grain orientation would exhibit similar advantages over structural sections made with Gen. 2.0 structural panels.

As shown, structural sections made with two Gen. 3 panels provide significantly higher transverse bending stiffness, transverse bending strength, buckling capacity for a given MOE as compared to structural sections made with two Gen. 2 panels.

Figure 21A:
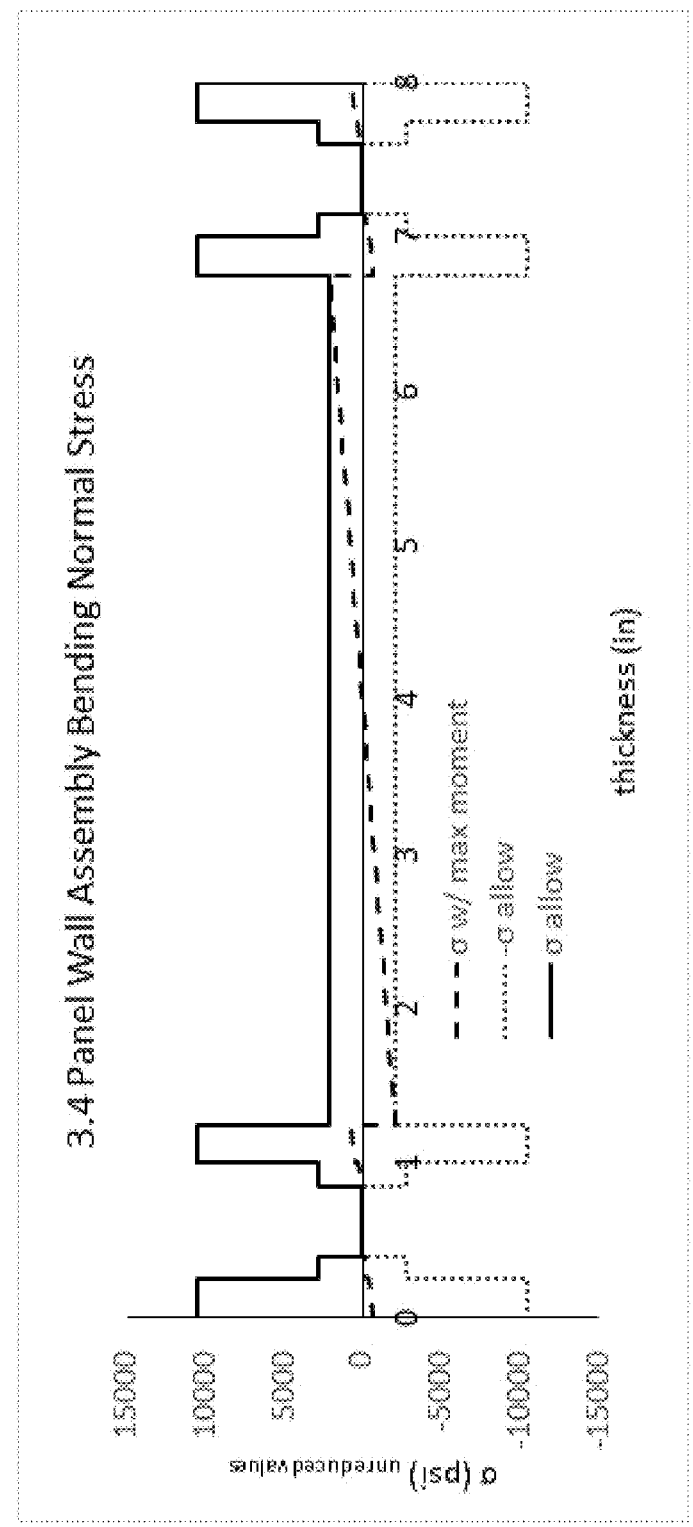
FIG. 21A is a chart showing bending normal stress of a structural section having two structural panels of the present disclosure.
Figure 21B:
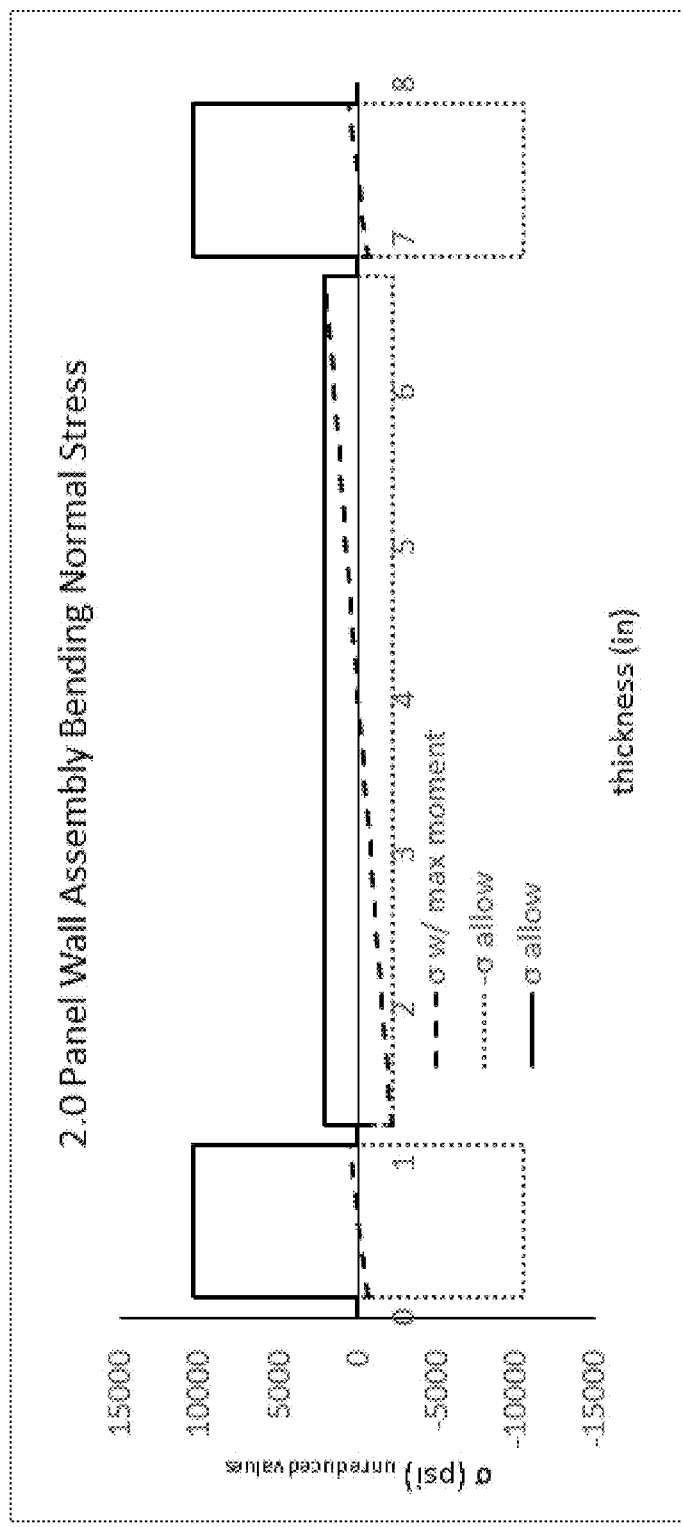
FIG. 21B is a chart showing bending normal stress of a structural section having two known structural panels.

FIG. 21A shows bending normal stress of an eight inch structural section comprising two bamboo hybrid structural panels such as layup 1132 spaced apart by an eight foot blocking section with 50% height 2×6 blocking on a 96" tall panel, with 0.131"×3.25" nails at 6 inches on center. FIG. 21B shows bending normal stress of an alike structural section comprising two Gen. 2 structural panels having a layup as shown above in Table 1. As shown in FIG. 21B, the blocking between the two Gen. 2 structural panels is the strength limiting factor. The structural panel bending strength is much stronger than the blocking between the two structural panels, as can be seen in FIG. 21A and FIG. 21B. Therefore, the stress in the center region reaches its limit before the structural panels.

Advantageously, structural section bending strength is increased by the structural panel stiffness to blocking stiffness ratio. By increasing the structural panel stiffness, a larger percent of the bending load and stresses are seen by the panels, and less stress is seen by the blocking at the same transverse force. For example, switching from the Gen. 2 structural panel to layup 1132 in a structural section results in a 38% increase in transverse bending strength and a 46% increase in transverse bending stiffness.

Figure 22A:
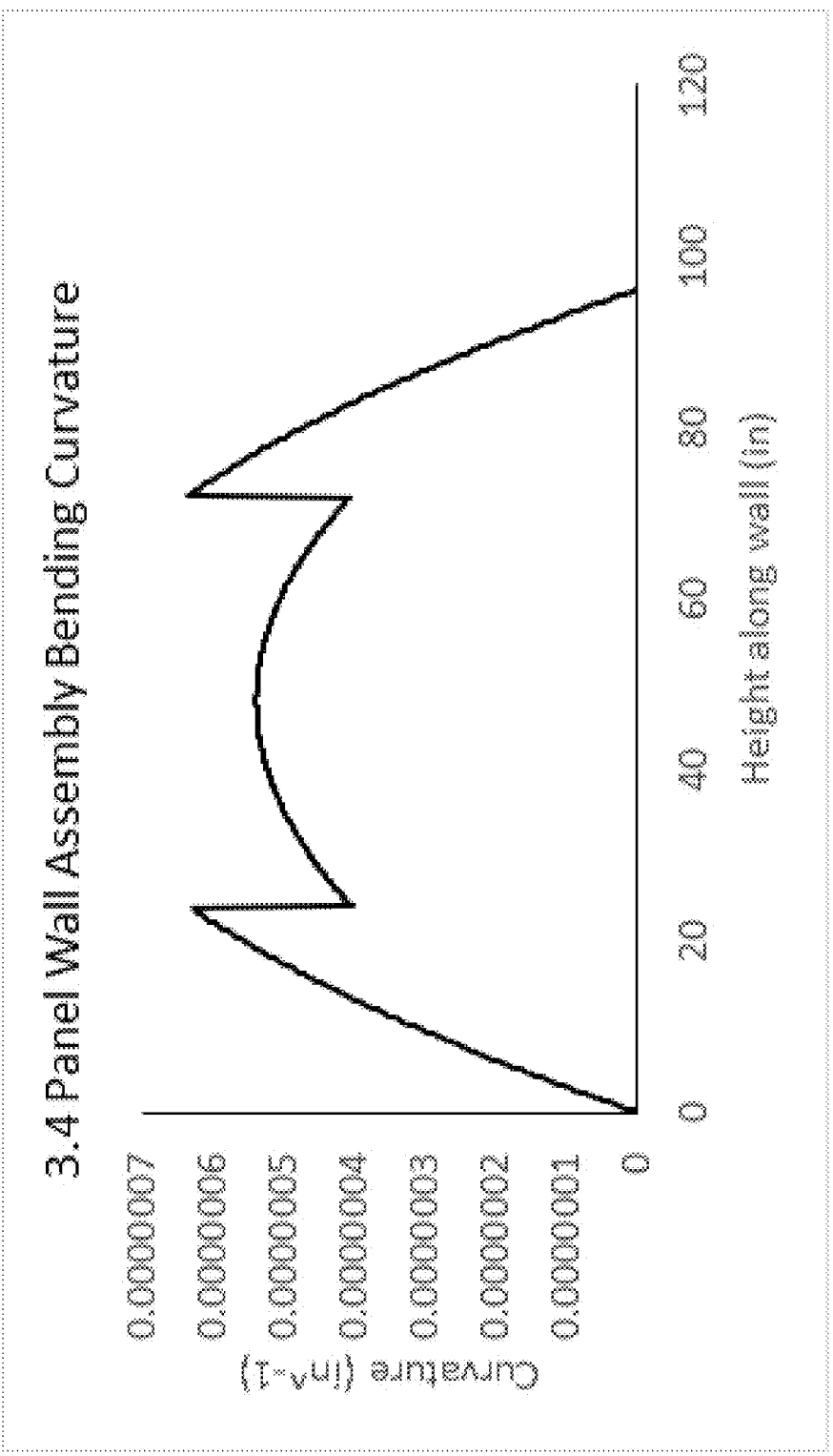
FIG. 22A is a chart showing bending curvature of a structural section having two structural panels of the present disclosure.
Figure 22B:
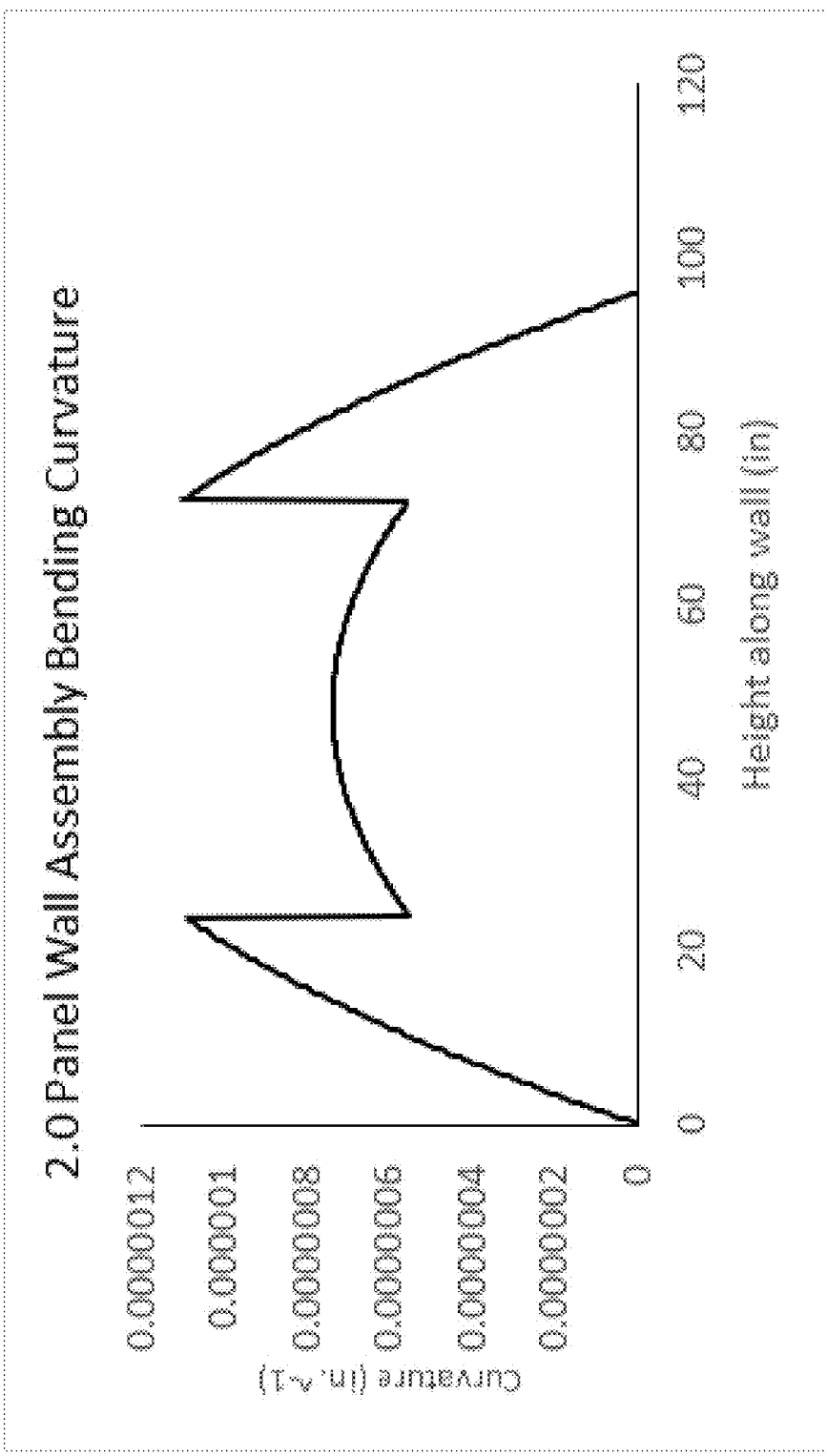
FIG. 22B is a chart showing bending curvature of a structural section having two known structural panels.

FIG. 22A shows bending curvature along the structural section modeled by FIG. 21A. FIG. 22B shows bending curvature along the alike structural section of FIG. 21B comprising two Gen. 2 panels.

Comparing FIG. 22A and FIG. 22B, it can be seen that the stiffness across the height of the structural section is more consistent in FIG. 22A, with a less pronounced jump at the edge of the center blocking. There is less curvature at above/below the blocking, and more curvature at the center of the structural section.

The performance advantages of the Gen. 3 structural panels and structural sections of the present disclosure shown in FIG. 18A-FIG. 22A result at least in part from having the two bamboo structural layers spaced apart from the neutral plane by at least one non-bamboo layer, and orienting the outer bamboo structural layers with the hard cortex surface of the bamboo facing away from the neutral plane, to push the denser, higher MOE and the higher MOR side of the bamboo sections away from the neutral plane, to increase the bending stiffness and bending strength of the structural panel. Additionally, the soft pith surfaces of the bamboo sections have larger dimensional changes than the hard cortex surfaces, and therefore having the bamboo hard cortex surfaces facing away from the neutral plane also ensures that if there are moisture content changes in the panel, it will shrink symmetrically and not be as prone to warping, which could cause both structural and cosmetic issues.

Similar improvements result in different wall heights (e.g., 10 foot wall sections), fasteners/connectors, connector spacing, block lengths, block spacing, block properties, glued rather than fastened blocks, blocks attached to a single panel rather than both panels, and other iterations of revised parts in the assembly.

Figure 23:
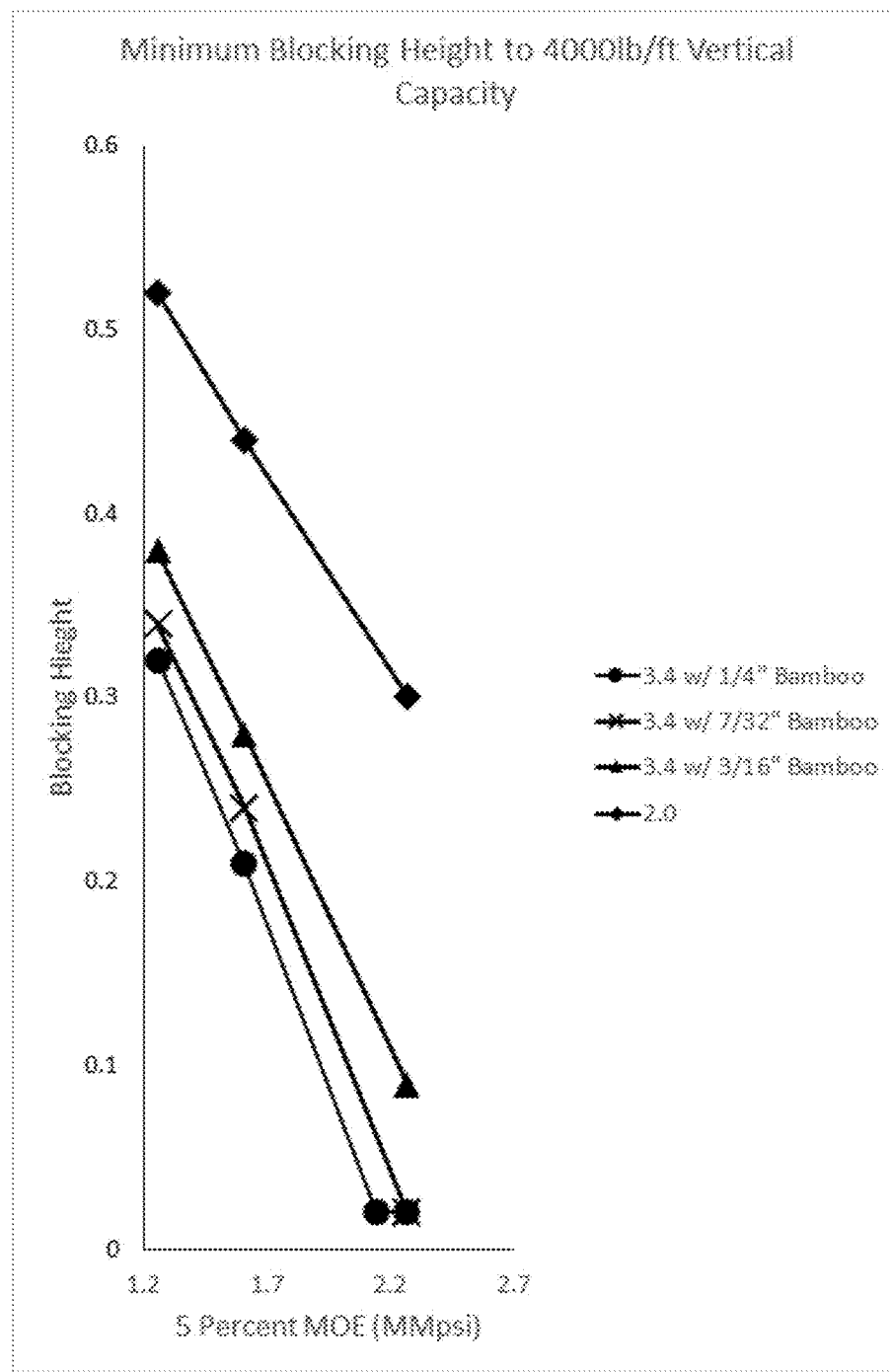
FIG. 23 is a chart showing minimum blocking height in a structural section to achieve a 4000 lb/ft vertical capacity.
Figure 24:
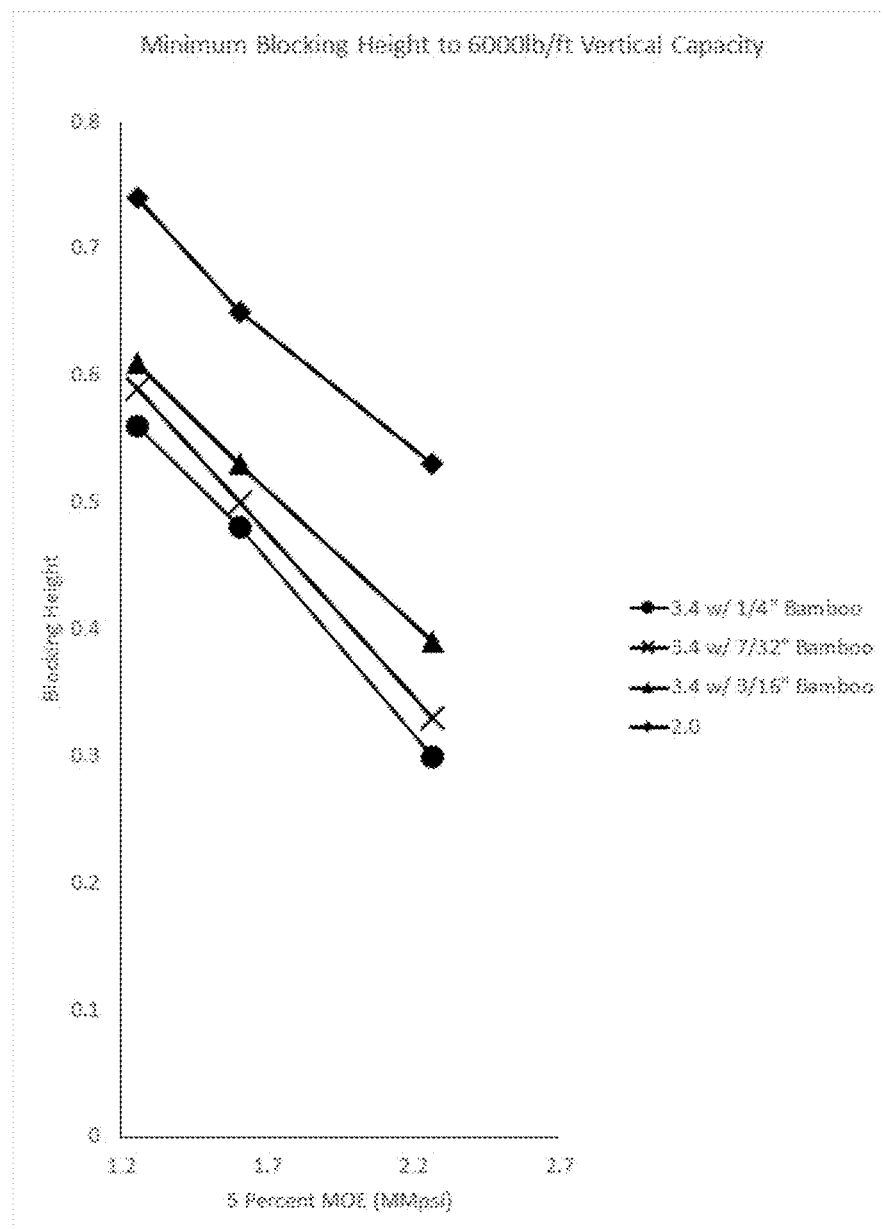
FIG. 24 is a chart showing minimum blocking height in a structural section to achieve a 6000 lb/ft vertical capacity.
Figure 25:
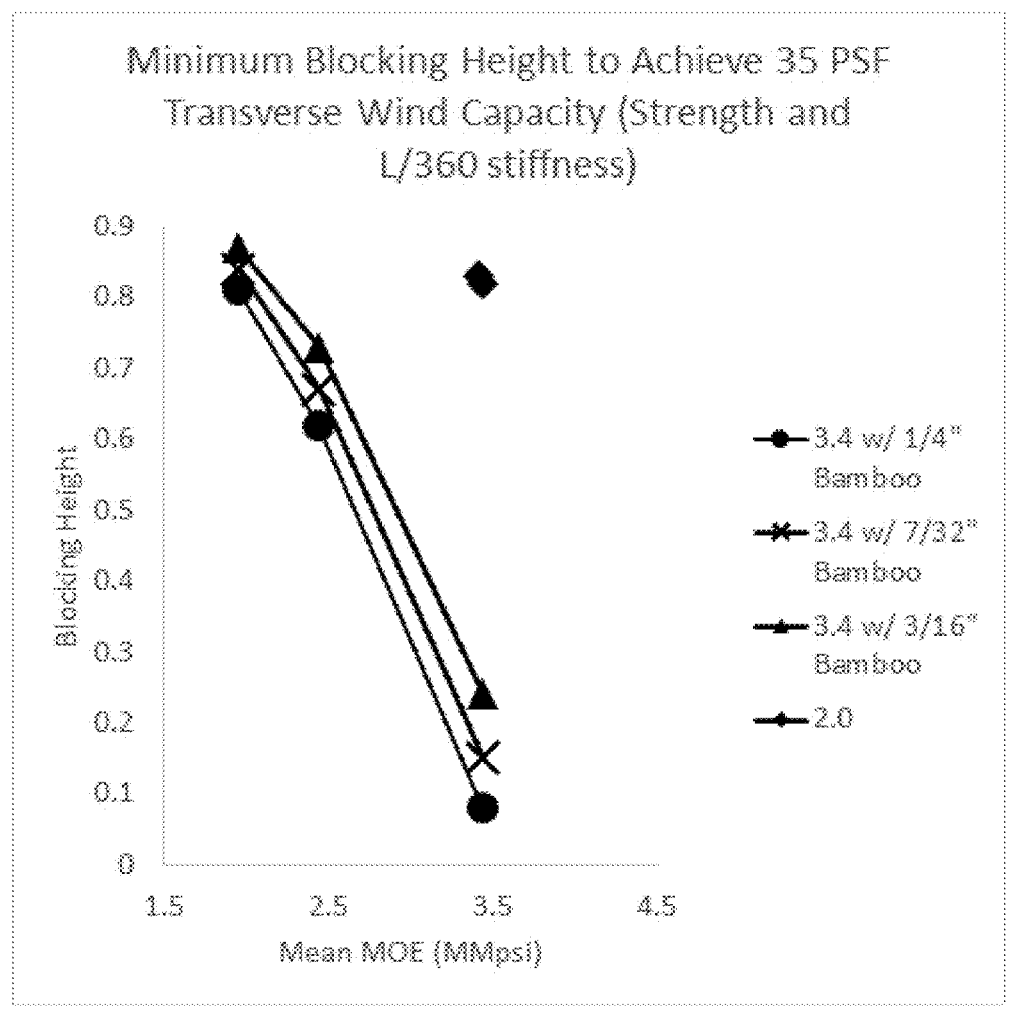
FIG. 25 is a chart showing minimum blocking height in a structural section to achieve a 35 psf transverse wind capacity.

FIG. 23-FIG. 25 show additional benefits of structural sections comprising Gen. 3 structural panels of the present disclosure. As shown, structural sections comprising Gen. 3 panels achieve comparable vertical compressive capacities with reduced blocking heights, as compared to structural sections comprising Gen. 2 panels.

Structural sections constructed from Gen. 3 panels having an overall thickness greater than or equal to 1.25 inches offer advantages over existing structural sections. Thick wood members and walls are considered mass timber and can be designed with different building code implications for fire resistance. Such mass timber can rely on a char layer for fire resistance where some of the thickness is considered sacrificial, where it forms a char layer protecting the wood beneath. Bamboo also forms char under fire conditions which helps protect the inner material. Mass timber can be used in Type IV construction (Heavy Timber), where light frame wood construction cannot be used in. The International Building Code has various thickness requirements for different uses in Mass timber, including a minimum 4 inch thick wall for interior walls and partitions, and 6 inches for exterior walls.

Such a structural section is similar to the floor diaphragm design and comparison to CLT panels, they are both based on the stiffness of the panel and the MOE of the bamboo. A version of this wall could include at least one Gen. 3 structural panel having one, two, and three layers of 2× wood (a sacrificial char layer) on the face of the panel over the bamboo to act as a sacrificial fire layer preserving the bamboo to retain high strength and stiffness after burning for the required fire protection time. Such a structural panel could therefore have a panel thickness between 2.0 and 12 inches, e.g., between 5.5 and 11.5 inches, inclusive.

The present application may also reference quantities and numbers. Unless specifically stated, such quantities and numbers are not to be considered restrictive, but representative of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Generally, the embodiments disclosed herein are non-limiting, and the inventors contemplate that other embodiments within the scope of this disclosure may include structures and functionalities from more than one specific embodiment shown in the figures and described in the specification.

In the foregoing description, specific details are set forth to provide a thorough understanding of exemplary embodiments of the present disclosure. It will be apparent to one skilled in the art, however, that the embodiments disclosed herein may be practiced without embodying all the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "vertical," "horizontal," "front," "rear," "left," "right," "top," and "bottom," etc. These references, and other similar references in the present application, are intended to assist in helping describe and understand the particular embodiment (such as when the embodiment is positioned for use) and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value. The term "based upon" means "based at least partially upon."

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

What is claimed is:

1. A structural panel having a plurality of adhered layers, the structural panel comprising:
   a plurality of bamboo layers, each comprising a plurality of joined bamboo sections; and
   at least one non-bamboo layer disposed between bamboo layers of the plurality of bamboo layers,
   wherein at least two bamboo layers of the plurality of bamboo layers are spaced apart on opposite sides of a neutral plane extending through the structural panel and parallel to the plurality of bamboo layers.

2. The structural panel of claim 1, wherein the plurality of bamboo layers comprises a first outer bamboo layer and a second outer bamboo layer that are spaced apart from the neutral plane, the first outer bamboo layer forming a first outermost wall surface of the structural panel, the second outer bamboo layer forming a second outermost wall surface of the structural panel.

3. The structural panel of claim 2, wherein each of the plurality of joined bamboo sections of each of the first outer bamboo layer and the second outer bamboo layer comprises at least one of a plurality of joined bamboo strips or joined bamboo esterilla sections, wherein the joined bamboo strips or joined bamboo sections are joined with an adhesive.

4. The structural panel of claim 1 wherein the at least one non-bamboo layer comprises a first non-bamboo layer having a first grain orientation and a second non-bamboo layer having a second grain orientation, perpendicular to the first grain orientation.

5. The structural panel of claim 4, wherein the at least one non-bamboo layer comprises a third non-bamboo layer having the first grain orientation and disposed on an opposite side of the second non-bamboo layer from the first non-bamboo layer.

6. The structural panel of claim 5, wherein the at least one non-bamboo layer comprises a fourth non-bamboo layer and a fifth non-bamboo layer, both having the first grain orientation spaced apart from each other by the first non-bamboo layer, the second non-bamboo layer, and the third non-bamboo layer.

7. The structural panel of claim 1, wherein the first outer bamboo layer comprises a barrier layer configured to form the first outermost wall surface of the structural panel.

8. The structural panel of claim 1, wherein each of the at least two bamboo layers that are spaced apart from the neutral plane are spaced apart from the neutral plane by at least 0.075 inches.

9. The structural panel of claim 1, further comprising at least one sacrificial char layer forming an outermost surface of the structural panel, wherein the at least one sacrificial char layer is a distinct layer from the plurality of bamboo layers and the plurality of non-bamboo layers, and is formed from a wood material.

10. The structural panel of claim 1, further comprising:
a first sacrificial char layer forming a first outermost surface of the structural panel; and
a second sacrificial char layer forming a second outermost surface of the structural panel, the second outermost surface being disposed on an opposite side of the neutral plane from the first outermost surface,
wherein the first and second sacrificial char layers are distinct layers from the plurality of bamboo layers and the plurality of non-bamboo layers, and are formed from a wood material.

11. The structural panel of claim 1, wherein at least one bamboo layer of the plurality is a slurry-treated bamboo layer treated with a slurry comprising an adhesive matrix and a substrate material reinforcement.

12. A structural panel, comprising:
a plurality of consecutive layers adhered to each other, the plurality of consecutive layers comprising, in order:
a first outer bamboo layer forming a first outermost wall surface of the structural panel and comprising a first plurality of joined bamboo sections;
a first non-bamboo layer;
a second non-bamboo layer;
a third non-bamboo layer;
a fourth non-bamboo layer;
a fifth non-bamboo layer; and
a second outer bamboo layer forming a second outermost wall surface of the structural panel and comprising a second plurality of joined bamboo sections,
wherein each section of the first plurality of joined bamboo sections and each section of the second plurality of joined bamboo sections has a hard side and a soft side, and
wherein the first outer bamboo layer and the second outer bamboo layer are positioned such that the hard sides of the first plurality of joined bamboo sections face away from the hard sides of the second plurality of joined bamboo sections.

13. The structural panel of claim 12, wherein:
the first and second outer bamboo layers have a common bamboo grain orientation;
the first, third, and fifth non-bamboo layers have a first non-bamboo grain orientation; and
the second and fourth non-bamboo layers have a second non-bamboo grain orientation, perpendicular to the first non-bamboo grain orientation.

14. The structural panel of claim 12, wherein the first outer bamboo layer comprises a barrier layer configured to form the first outermost wall surface of the structural panel.

15. The structural panel of claim 12, further comprising a second structural panel.

16. The structural panel of claim 15, further comprising at least one blocking section comprising a blocking member of blocking material joined with at least one of the first structural panel or the second structural panel.

17. The structural panel of claim 16, wherein the blocking section comprises a plurality of spaced-apart blocking members.

18. The structural panel of claim 17, wherein at least some blocking members are joined with the first structural panel and at least some of the second blocking members are joined with the second structural panel.

19. The structural panel of claim 17, wherein at least some blocking members are joined with both the first structural panel and the second structural panel.

* * * * *